(12) United States Patent
Woods

(10) Patent No.: US 11,343,487 B2
(45) Date of Patent: May 24, 2022

(54) TRACKABLE GLASSES SYSTEM FOR PERSPECTIVE VIEWS OF A DISPLAY

(71) Applicant: David Woods, Alexandria, VA (US)

(72) Inventor: David Woods, Alexandria, VA (US)

( * ) Notice: Subject to any disclaimer, the term of this patent is extended or adjusted under 35 U.S.C. 154(b) by 0 days.

(21) Appl. No.: 16/865,623

(22) Filed: May 4, 2020

(65) Prior Publication Data

US 2020/0267379 A1 Aug. 20, 2020

Related U.S. Application Data

(63) Continuation of application No. 15/992,062, filed on May 29, 2018, now Pat. No. 10,652,525, which is a
(Continued)

(51) Int. Cl.
*H04N 13/334* (2018.01)
*H04N 13/117* (2018.01)
(Continued)

(52) U.S. Cl.
CPC ......... *H04N 13/334* (2018.05); *H04N 13/117* (2018.05); *H04N 13/337* (2018.05);
(Continued)

(58) Field of Classification Search
CPC .. H04N 13/334; H04N 13/337; H04N 13/376; H04N 13/117; H04N 13/341; H04N 13/378
See application file for complete search history.

(56) References Cited

U.S. PATENT DOCUMENTS 5,642,442 A * 6/1997 Morton ................ G06K 9/2018
382/168
6,064,354 A 5/2000 Deluca
(Continued)

FOREIGN PATENT DOCUMENTS

| EP | 2528337 A1 | 11/2012 |
|---|---|---|
| WO | WO-2010134411 | 11/2010 |
| WO | WO-2012044272 | 4/2012 |

OTHER PUBLICATIONS

Author: Wikipedia Title: "Light field Camera" https://en.wikipedia.org/wiki/Light-field_camera Retrieved Aug. 29, 2017.
(Continued)

*Primary Examiner* — Jonathan R Messmore

(57) ABSTRACT

Embodiments allow a viewer of a display to see images. The images viewed by the glasses may be based on the orientation of the glasses, so that the images correspond to the user's viewpoint. Different images may be presented to left and right eyes for 3D stereoscopic viewing. The position and orientation of the glasses may be tracked by analyzing images from one or more cameras observing the glasses. Glasses may have distinct geometric shapes or features, such as circular lenses, rims, regions around the lenses, to facilitate tracking. One or more regions of the glasses may be illuminated by self-contained or reflected light, to facilitate tracking under various ambient lighting conditions. The lenses of the glasses may have selective barriers such as anaglyph filters, polarizing filters, and shutters, to select images from the display.

17 Claims, 48 Drawing Sheets

Related U.S. Application Data continuation-in-part of application No. 15/883,277, filed on Jan. 30, 2018, now Pat. No. 10,469,834, which is a continuation of application No. 14/547,555, filed on Nov. 19, 2014, now Pat. No. 9,883,173, said application No. 15/992,062 is a continuation-in-part of application No. 15/461,391, filed on Mar. 16, 2017, now Pat. No. 9,986,228, and a continuation-in-part of application No. 14/106,766, filed on Dec. 15, 2013, now Pat. No. 10,116,914.

(60) Provisional application No. 62/446,524, filed on Jan. 15, 2017, provisional application No. 62/435,831, filed on Dec. 18, 2016, provisional application No. 62/414,676, filed on Oct. 29, 2016, provisional application No. 62/414,678, filed on Oct. 29, 2016, provisional application No. 62/393,083, filed on Sep. 11, 2016, provisional application No. 62/360,296, filed on Jul. 8, 2016, provisional application No. 62/354,787, filed on Jun. 26, 2016, provisional application No. 62/312,937, filed on Mar. 24, 2016, provisional application No. 62/035,477, filed on Aug. 10, 2014, provisional application No. 61/934,806, filed on Feb. 2, 2014, provisional application No. 61/920,755, filed on Dec. 25, 2013, provisional application No. 61/900,982, filed on Nov. 6, 2013, provisional application No. 61/897,983, filed on Oct. 31, 2013.

(51) Int. Cl.
H04N 13/341 (2018.01)
H04N 13/376 (2018.01)
H04N 13/378 (2018.01)
H04N 13/337 (2018.01)
H04N 13/30 (2018.01)

(52) U.S. Cl.
CPC ......... H04N 13/341 (2018.05); H04N 13/376 (2018.05); H04N 13/378 (2018.05); H04N 2013/403 (2018.05); H04N 2213/008 (2013.01)

(56) References Cited

U.S. PATENT DOCUMENTS

| | | | |
|---|---|---|---|
| 6,304,286 B1 | 10/2001 | Shirai | |
| 6,633,655 B1 | 10/2003 | Hong | |
| 8,330,881 B2 | 12/2012 | Krijin et al. | |
| 8,482,511 B2 | 7/2013 | Goris et al. | |
| 8,717,360 B2 | 5/2014 | Vesely | |
| 8,717,423 B2 | 5/2014 | Vesely | |
| 8,922,628 B2 | 12/2014 | Bond | |
| 8,942,427 B2 | 1/2015 | Lee | |
| 9,244,285 B2 | 1/2016 | Chen et al. | |
| 9,311,771 B2 | 4/2016 | Kelly | |
| 9,355,488 B2 | 5/2016 | Goris et al. | |
| 9,380,295 B2 | 6/2016 | Dolim | |
| 2007/0252832 A1* | 11/2007 | Ratai | H04N 13/366 345/427 |
| 2008/0297593 A1 | 12/2008 | Debevec | |
| 2010/0007582 A1* | 1/2010 | Zalewski | H04N 13/383 345/8 |
| 2010/0103516 A1 | 4/2010 | McKnight | |
| 2010/0149182 A1 | 6/2010 | Butler | |
| 2010/0188489 A1 | 7/2010 | Mashitani et al. | |
| 2010/0328613 A1* | 12/2010 | Bartol | G02B 30/35 353/8 |
| 2011/0128555 A1 | 6/2011 | Rotschild | |
| 2011/0157264 A1 | 6/2011 | Seshadri | |
| 2011/0157325 A1* | 6/2011 | Tanaka | H04N 13/398 348/51 |
| 2011/0181706 A1 | 7/2011 | Harrold et al. | |
| 2011/0316881 A1 | 12/2011 | Yoshifuji et al. | |
| 2012/0038635 A1* | 2/2012 | Stamate | H04N 13/376 345/419 |
| 2012/0092466 A1* | 4/2012 | Choi | H04N 13/373 348/51 |
| 2012/0120060 A1 | 5/2012 | Noda | |
| 2012/0162214 A1 | 6/2012 | Chavez | |
| 2012/0182407 A1 | 7/2012 | Yoshida | |
| 2012/0313930 A1 | 12/2012 | Yun | |
| 2013/0069933 A1 | 3/2013 | Smithwick | |
| 2013/0128011 A1 | 5/2013 | Chavez | |
| 2013/0201416 A1* | 8/2013 | Kim | G02B 27/0093 349/15 |
| 2013/0235169 A1* | 9/2013 | Kato | G02B 27/01 348/53 |
| 2013/0342813 A1* | 12/2013 | Wang | H04N 13/332 353/7 |
| 2014/0146148 A1 | 5/2014 | Maciocci | |
| 2014/0184588 A1 | 7/2014 | Cheng | |
| 2014/0240338 A1* | 8/2014 | Patino | G06F 3/012 345/589 |
| 2014/0240474 A1* | 8/2014 | Kondo | H04N 13/398 348/56 |
| 2014/0267403 A1 | 9/2014 | Maciocci | |
| 2014/0320614 A1 | 10/2014 | Gaudreau | |
| 2015/0020031 A1 | 1/2015 | Dokor et al. | |
| 2015/0124063 A1 | 5/2015 | Woods | |
| 2015/0143976 A1 | 5/2015 | Katto | |
| 2015/0161476 A1 | 6/2015 | Kurz | |
| 2016/0007012 A1 | 1/2016 | Jacobs et al. | |
| 2016/0182877 A1 | 6/2016 | Deluca | |
| 2016/0293113 A1 | 10/2016 | Yoo | |

OTHER PUBLICATIONS

Author: Chavez et al. Title: "Tech Specs zSpace for Education" https://cdn.zspace.com/collateral/brochures/zSpace300TechSpecs_081816.pdf.
(Continued) Retrieved Aug. 29, 2017.
Authors: Li, Jiang, et al. Aug. 29, 2017 "Depth-VR: 3D world jumping out of your screen" https://www.kickstarter.com/projects/ncf/depth-vr-3d-.
(Continued) jumping-out-of- -your-screen.
Authors: Yoo, Han Published Jan. 6, 2015 "Viewing Distance-Based Perceived Error Control for Local Backlight Dimming" Journal of Display.
(Continued)Technology (vol. 11, Is. 3, Mar. 2015).
International Search Report and Written Opinion, received in PCT/US2017/024151, dated Jun. 5, 2017, 14 pages.

* cited by examiner

TRACKABLE GLASSES SYSTEM FOR PERSPECTIVE VIEWS OF A DISPLAY

This application is a continuation of U.S. Utility patent application Ser. No. 15/992,062 filed 29 May 2018.

U.S. Utility patent application Ser. No. 15/992,062 is a continuation-in-part of U.S. Utility patent application Ser. No. 15/461,391, filed 16 Mar. 2017, issued as U.S. Pat. No. 9,986,228, which claims the benefit of U.S. Provisional Patent Application 62/312,937, filed 24 Mar. 2016, and of U.S. Provisional Patent Application 62/354,787, filed 26 Jun. 2016, and of U.S. Provisional Patent Application 62/360,296, filed 8 Jul. 2016, and of U.S. Provisional Patent Application 62/393,083, filed 11 Sep. 2016, and of U.S. Provisional Patent Application 62/414,676, filed 29 Oct. 2016, and of U.S. Provisional Patent Application 62/414,678, filed 29 Oct. 2016, and of U.S. Provisional Patent Application 62/435,831, filed 18 Dec. 2016, and of U.S. Provisional Patent Application 62/446,524, filed 15 Jan. 2017, the specifications of which are hereby incorporated herein by reference.

U.S. Utility patent application Ser. No. 15/992,062 is also a continuation-in-part of U.S. Utility patent application Ser. No. 15/883,277, filed 30 Jan. 2018, which is a continuation of U.S. Utility patent application Ser. No. 14/547,555, filed 19 Nov. 2014, issued as U.S. Pat. No. 9,883,173, which claims the benefit of U.S. Provisional Patent Application 62/035,477, filed 10 Aug. 2014, and of U.S. Provisional Patent Application 61/934,806, filed 2 Feb. 2014, and of U.S. Provisional Patent Application 61/920,755, filed 25 Dec. 2013, the specifications of which are hereby incorporated herein by reference.

U.S. Utility patent application Ser. No. 15/992,062 is also a continuation-in-part of U.S. Utility patent application Ser. No. 14/106,766, filed 15 Dec. 2013, which claims the benefit of U.S. Provisional Patent Application 61/897,983, filed 31 Oct. 2013 and U.S. Provisional Patent Application 61/900,982, filed 6 Nov. 2013, the specifications of which are hereby incorporated herein by reference.

BACKGROUND OF THE INVENTION

Field of the Invention

One or more embodiments of the invention are related to the field of optical systems for producing views of a display, such as for example stereoscopic views or views that vary based on a user's location. One or more embodiments are also related to the field of tracking systems for heads or eyes. More particularly, but not by way of limitation, one or more embodiments of the invention enable a quad view display system.

Description of the Related Art

There are various methods known in the art for creating a 3D stereoscopic image. Most commonly these include, but are not limited to shutter glasses, passively polarized glasses, and anaglyph glasses. The stereoscopic image may present on a flat panel, projection or other display medium. These glasses discriminate between first and second images and coordinate with the display medium to present the corresponding image to the correct eye. In this way, a stereoscopic image or a dual view image may be presented.

In addition to or instead of presenting different images to different eyes of a single user, in many situations it is useful to present different images to different users. While shutter glasses may be used for this purpose, the speed of the shutter lenses and the speed of switching the display panel limits the number of concurrent users. There is a need for a system that supports a larger number of views of a single shared display.

In many situations, it is also useful or necessary to track the position and orientation of each user's head or eyes, for example to present an image to that user that corresponds to the user's viewpoint. Systems that are used to track the eyes in order to produce 3D stereoscopic images vary, but there are no inexpensive methods currently in use. Examples of tracking systems known in the art include the ZSpace system, the TrackIR system by Naturalpoint, and the Microsoft Kinect system. Each of these devices has limitations.

ZSpace employs a tablet with two custom cameras that track glasses with 5 tracking blobs on the glasses. A version of this method is described in US 2013/0128011. The devices are expensive; at the time of this writing the minimum order is ten units at a price between $22,000 to $47,000. This is cost prohibitive for the average user.

The TrackIR made by Naturalpoint employs infrared (IR) lights mounted on headgear. The least expensive version is currently sold for about $200. The IR lights are difficult to attach correctly and the system is difficult to employ correctly.

The Microsoft Kinect employs a method of structured light where patterns of IR light are shined on an object and the changes in the pattern due to the shape of the object are used to determine the 3D structure and location of the object. These systems may employ one or more sources of light and one or more cameras for viewing. The Kinect has the ability to face track, but results are unreliable. The current software is not optimized for when glasses are worn and it loses tracking easily. In addition, the cost is around $200 for a Kinect.

Most modern computers already come equipped with a camera at no extra cost. Those that do not may be equipped with an inexpensive camera that transfers data via the USB port. A user would prefer to use the camera that came with their computer rather than purchase an expensive accessory in order to create real world 3D stereoscopy. However, these inexpensive cameras do not have depth sensing.

A series of markers or blobs on the glasses may be used to mark locations on the glasses. The distance between the blobs as measured by camera angle may not yield accurate information because the head may be turned from the camera in several axes. This changes the distance between the blobs as seen by the camera. For example, turning the head to either side by thirty degrees could result in a fifty percent error in the distance between two blobs located horizontally from one another. This results in a corresponding error in tracking location.

US 2010/0103516 describes a head tracking system employing reflective blobs that fails to take into account the error associated with turning the head along various axes. It describes changing the polarization of these blobs by means of a retarder. The fact that these reflective blobs may have their polarization altered has no bearing on this error.

Various methods have been proposed to track eyewear, most involving markers or blobs on a surface. The shape of these systems varies with the angular relationship of the surface to the camera(s). This makes it difficult to track said eyewear accurately with inexpensive cameras.

Therefore, it would be highly desirable to have a system and/or method that uses one or more inexpensive cameras to track the head or the eyes, and that also negates the error due to tilting or turning of the head.

Another current problem involves manipulation of the 3D stereoscopic imagery. Z-space currently employs a pointer that is tracked and provides a 3D line that is drawn from the tip of the pointer by the software and is employed to manipulate stereoscopic images. The pointer does not produce a beam, but rather the beam is presented as a 3D stereoscopic image that gives the impression of being generated from the pointer. This requires a complex system of two precisely positioned cameras to precisely track the pointer. Thus, it cannot be used on current common systems that have only one camera. In addition, one hand is used to hold the tablet device and the other is used to manipulate the pointing device. This leaves no hands free to manipulate other controls. It would be desirable to have a method of pointing and of manipulating imagery that requires only a single camera, and that does not require a separate pointing device.

For at least the limitations described above there is a need for a quad view display system.

BRIEF SUMMARY OF THE INVENTION

One or more embodiments described in the specification are related to a quad view display system. Embodiments of the invention may include glasses that select one or more views generated from a display that may be shared among multiple users. Each user, and in one or more embodiments each eye of each user, may see a different image from the display. In one or more embodiments, the system may track the position and orientation of the glasses, for example so that the image or images viewed by each user reflects the user's viewpoint. Tracking may for example use a camera that locates the glasses and determines the glasses' orientation and position. Calculation of orientation and position may for example use image analysis based on known features of the glasses, such as the round shapes of lenses or frames, or other distinguishing features. In one or more embodiments calculation of orientation and position may analyze features of the user's face or of any other objects on or near the user's head, instead of or in addition to analyzing features of the glasses.

One or more embodiments of the invention relate to eyewear with lenses that selectively permit images to be received by one eye but not the other. The eyewear or glasses may be employed in stereoscopic display systems and also dual view systems where one observer sees a different image than another. Prior art methods include shutter glasses, passively polarized glasses, or anaglyph glasses. One or more embodiments of the invention may combine prior methods of stereoscopic or dual view glasses in order to increase the number of images that may be discriminated by the lenses. This allows dual view stereoscopic imagery as well as multiple views beyond mere dual view.

For example, one or more embodiments may incorporate two or more eyeglasses, each worn by a corresponding user. Each of these eyeglasses may contain a pair of lenses. The users may view a shared display. The display may emit multiple images for each frame of a video stream. The glasses and the display may be configured so that only selected images from these multiple images reach each user, or each eye of each user. This may be achieved by associating multiple characteristics with each image emitted from the display, and by configuring the lenses of the eyeglasses to select images having a specific combination of characteristics. For example, lenses may include two or more selective barriers, each of which only allows images to pass through the barrier if the image characteristics match the characteristic associated with the barrier. Characteristics may include for example, without limitation, a range of colors, a light polarization, or a time slice during which an image is emitted from the shared display. The corresponding barriers associated with a lens may include for example, without limitation, an anaglyph filter that transmits only light in a specific range of colors, a polarized filter that transmits only light having a specific polarization, and a shutter lens that is open to transmit light only during a specific time slice.

One or more embodiments may use glasses that combine two or more selective barriers for each lens. For example, these two barriers may include combinations such as an anaglyph filter combined with a polarized filter, an anaglyph filter combined with a shutter lens, or a polarized filter combined with a shutter lens. One or more embodiments use lenses with three (or more) barriers, such as barriers that include an anaglyph filter, a polarized filter, and a shutter lens.

Glasses with various combinations of selective barriers may be used to provide different views to each user. For example, one or more embodiments may use four or more eyeglasses, and may provide different views to each of the eyeglasses by varying the barriers associated with each eyeglasses. In one or more embodiments, the left lens of one or more of the eyeglasses may have different selective barriers from the right lens, thereby providing stereo vision with different left eye images and right eye images selected from a stereoscopic image pair.

An illustrative embodiment that uses combinations of selective barriers is a quad view system with a single shared monitor viewed by two (or more) users. The monitor may for example emit four (or more) images, each with a unique combination of polarization and time slice. Two (or more) users may view the monitor with glasses that have lenses to select one of the four images for each eye. Two users may therefore each view a different stereoscopic image from the same monitor. For example, lenses may have a polarization filter at or near the front side of the lens, and a shutter filter at or near the back side. One or more embodiments may use circular polarization, which for example provides viewing that is not distorted when a user rotates his or her head. For circularly polarized and time sliced images, an illustrative lens may use a wave retarder in the polarization filter to select the correct circularly polarized image (and block other polarizations) and convert it to a linear polarization. The shutter filter may for example use liquid crystals to selectively twist the linear polarization to a different orientation during the correct time slice, followed by a final linear polarizer to block images without the appropriate linear orientation.

One or more embodiments of the invention may allow use of polarized lenses with the displays employed in automobiles and aircraft, for example by adding a wave plate to the displays. A wave plate may for example convert linearly polarized light emitted by these displays into circularly polarized or elliptically polarized light, thereby allowing use of polarized lenses to view the displays.

One or more embodiments of the invention may incorporate tracking of glasses. This tracking may for example use an image analysis system to analyze images of the glasses, which may for example be captured by a camera. The image analysis system may calculate the position and orientation of the glasses from the camera images, or from other sensor data. The system may include at least one sensor. The sensor or sensors may be coupled to the display device in a known position and orientation with reference to the display device. The sensors may be employed at a fixed location in relation to the display but need not be co-located with the display. The system may include object recognition software techniques also known as computer vision. At least one processing unit may be employed to process the data. At least one of the sensors may detect light received from any portion of the glasses.

In one or more embodiments, the sensors may include a stereo camera, and the system may analyze stereo images captured by the stereo camera to determine the distance to a tracked object. In one or more embodiments, the sensors may include a plenoptic camera, and the system may analyze light field images captured by the plenoptic camera to determine the distance to a tracked object. One or more embodiments may incorporate distance sensors on the eyeglasses that measure the distance from the glasses to the shared display (or to any other reference point or reference object), and transmit this measured distance to the image analysis system.

Glasses may include a surface including at least one circular geometric shape. The geometric object may be a circle or globe. The geometric object may be other objects besides the circle and is not intended to be limited in this regard. Multiple blobs or objects may also be employed. Patterns of light and dark contrast may be reversed between pairs of glasses or between lenses on the same pair of glasses. Different glasses, different lenses of the same glasses, or both, may have distinctive features so that each can be recognized and tracked based on its visual appearance.

The system may include a processor coupled to at least one of the sensors. The processor may assess, during use, a referenced position of the geometric object. It may calculate the three-dimensional position and orientation of the object from its two-dimensional projection. In addition, when the geometric object is a circle or globe, the processor may assess the length of a major and/or minor axis of the geometric object. The length of the major or minor axis may be assessed by numbers of pixels in the field of view or by the angle in relation to the field of view. The length of major and/or minor axes may be used to aid in assessing the location and/or orientation of the geometric object in relation to the camera. Furthermore, the major and minor axes location, direction and size when taken in combination may be used to assess the location of the eyes.

This is an additional improvement over prior art, which merely discusses tracking the surface that is tracked and fails to account for the fact that the eyes may be a centimeter or more behind the surface in various angular directions.

The processor may determine the position of the geometric objects or the eyes behind them with reference to the display. The image processor may generate, during use, one or more images corresponding to a viewpoint related to the position/orientation of the glasses or of the eyes with respect to the display. In one or more embodiments, the image processor may generate a stereoscopic pair of images corresponding to the left and right lens positions and orientations or to the positions and orientations of the left and right eyes.

The surface of the eyeglasses may include at least one reflector. For example, without limitation, the rim of the lenses may include a reflective material. The surface may also include an electroluminescent panel. Any portion of the glasses may emit light; for example the rims of the lenses may emit light. The light received from the geometric object on the surface may be reflected or emitted light when the geometric object(s) of the surface are detected substantially in proximity to the display device during use. The emitted light may come from an electroluminescent panel. One or more embodiments may include a light source that illuminates the eyeglasses. The light source may be for example, without limitation, an infrared or ultraviolet light source; the reflective portions of the glasses may reflect the infrared or ultraviolet light received from the light source. In one or more embodiments, the light source may be coupled to a sensor that detects the level of ambient light, and it may be configured to turn on only when this level of ambient light is below a threshold.

In one or more embodiments, the shared display may transmit multiple images corresponding to the tracked positions and orientations of multiple glasses, or to the tracked positions and orientations of the left and right eyes of the users (for stereo images). The images may be configured so that each of the eyeglasses (or each lens) receives only the images corresponding to the viewpoint associated with the tracked position and orientation of the corresponding glasses, lens, or eye.

The system may include additional tracking blobs located on the glasses in a different plane than the original circular or noncircular pattern. In this way tilt, roll, and yaw information may be obtained. From the tilt, yaw, and roll information a 3D pointer beam may be created using stereoscopic images from the display panel. Thus, the glasses themselves may be used as a pointing device. When the created pointer beam intersects with an object, interaction may be made to occur. Additionally, the pointer beam may be combined with other inputs from a keyboard, mouse, game pad, track ball, or other input device to enhance and increase the interaction with 3D stereoscopic objects. For example, one button may be used to grab the object. Depending on context a button may be used for firing a stereoscopic gun that hovers in front of the glasses. These are just a few examples and there are many more possibilities, so the examples are not intended to be limiting in any way.

A beam may be created in 3D from the central portion of the glasses that extends in a perpendicular direction from the glasses. The beam itself may be created from the display image in such a way as to appear to the user as though the origination point is approximately the center of the front plate of the glasses frame. Additional lines and a pointer spot may also be drawn in 3D from the image display device. These additional lines may help the user to get a good feel for the direction of the pointer. The distance from the display of the glasses previously described in the instant invention may be found using the methods described herein. For the pointer to operate correctly in addition to the distance, the angular tilt of the glasses must be known. For purposes of discussion there are three angles of rotation for the head and since the glasses are attached to the head, for the glasses themselves. If we consider the Z-axis to be extending forward from the head, the Y-axis as up and down, and the X-axis as to the left and right of the head then we can describe the rotations of the head as follows: There is rotation of the head from shoulder to shoulder about the Z-axis. This may be referred to as "roll." There is rotation of the head from left to right, as one would see when an individual is indicating "no" by head movement. This is rotation about the Y-axis and may also be referred to as "yaw." Finally, there is a nodding up and down of the head as a "yes" response might look. This is rotation about the X-axis and may also be referred to as "tilt." To enable the tilt, yaw and roll axis to be determined additional tracking points out of the plane of the original tracked circles (or other shapes) may be employed. By comparing the midpoints between these additional tracked objects with the coordinates of the circles information regarding the tilt, roll, and yaw may be deduced. By employing the pitch, roll, and yaw data combined with distance a line from the center and perpendicular to the front plane of the glasses may be constructed using the 3D imaging display panel that is visible to the user. When this line drawn from the plane of the glasses intersects with the location of a 3D stereoscopic image drawn from the same display interaction may be made to occur. In a similar fashion, there may be placed a drawn 3D object in front of the glasses. This 3D object may be made to look like and represent many different objects, including for example, without limitation, an airplane, a bird or other flying animal or insect, a gun, and a projectile firing object. This list is meant to give an idea of the possibilities, but is not to meant as limiting the object that may be presented in front of the glasses.

In addition, the created object in front of the glasses may be used as a calibration tool. By using keyboard commands, adjustments to the location of the object may be made thus providing feedback to the computing device regarding the location of the 3D object and hence the glasses. In addition, the 3D object created in relation to the glasses may be compared with the location of one or more 3D objects created in relation to the display panel to enhance calibration.

Finally, it should be noted that in multi-view systems any stereoscopic object created by the processor for display in 3D may be seen at the correct position based upon the individual user's point of view. For example, a beam projecting outward from the front pane of a first user's glasses would be drawn differently for the second user. In this manner, the second viewer sees the 3D beam in the same location, projecting outward in front of the first user's glasses as well. This helps in a teaching environment when the beam is used as a pointer.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

Figure 1:
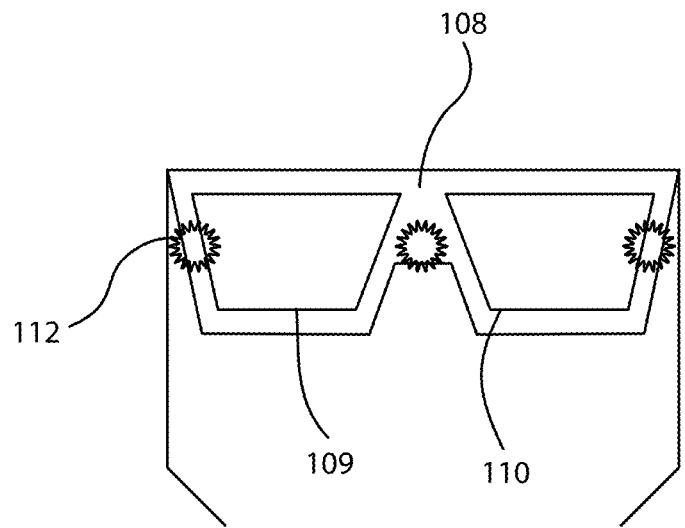
FIG. 1 is a schematic diagram illustrating prior art shutter glasses.
Figure 1:
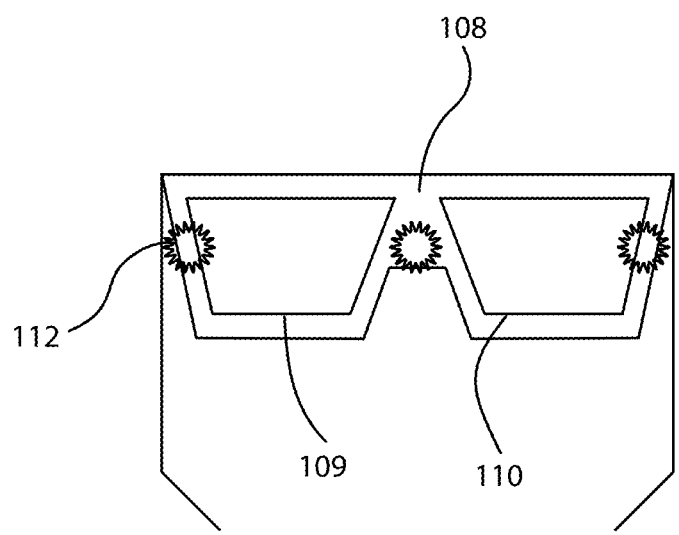

A quad view display system will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Glossary

Unless defined otherwise, all technical and scientific terms used herein have the same meaning as commonly understood by one of ordinary skill in the art.

The term "geometric object" as used herein generally refers to a sensor-detected signal (e.g., reflection) that may be recognized by object recognition software. The geometric object may be circular, but is not limited to a circularly shaped object.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component. The term "emitter" as used herein generally refers to a device that projects a signal (e.g., light, infrared light, etc.). The emitter may be active (i.e., the signal originates from the emitter) or the emitter may be passive (i.e., the signal originates from somewhere other than the emitter and is, for example, reflected off the emitter).

The term "eyepoint" as used herein generally refers to the physical viewpoint of a single eye or a pair of eyes. A viewpoint above may correspond to the eyepoint of a person. For example, a person's eyepoint in the physical space has a corresponding viewpoint in the virtual space.

The term "head tracking" as used herein generally refers to tracking the position/orientation of the head in a volume. This allows the user to "look around" a virtual reality environment simply by moving the head without the need for a separate controller to change the angle of the imagery.

The term "position/orientation" as used herein generally refers to position/orientation in at least 2 degrees of freedom (e.g., one dimension position and one dimension orientation . . . X, rotation). Position/orientation may be relative or absolute, as desired. Position/orientation may also include yaw, pitch, and roll information, e.g., when defining the orientation of a viewpoint.

The term "referenced" as used herein generally refers to a known and/or calculated (e.g., to a processor) precise position/orientation relation of a first object(s) (e.g., a sensor) to a second object(s) (e.g., a display device). The relationship, in some embodiments, may be predetermined in that the relationship is fixed (e.g. physically fixed as in using precision spatial mounts) such that the relationship is not adjustable after initial assembly (e.g., wherein the first object and the second object are assembled together as part of a single device). The relationship, in some embodiments, may be determined, during use, through a process (e. g., an initialization process, which may include a calibration and/or measurement process) which determines a precise spatial position/orientation relation of the first object(s) (e. g., a sensor) to the second object(s) (e.g., a display device).

The term "sensor" as used herein generally refers to a converter that measures a physical quantity and converts it into a signal which can be read by an observer or by an instrument. Sensors may include cameras, photo detectors, electronic sensors, CMOS or CCD sensors, etc.

The term "viewpoint" as used herein generally has the full extent of its ordinary meaning in the field of computer graphics/cameras. For example, the term "viewpoint" may refer to a single point of view (e. g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint. The term "virtual viewpoint" refers to a viewpoint from within a virtual representation or 3D scene.

Glasses that Provide Multiple Views

With reference now to FIG. 1 of the drawings, there is shown an illustration of prior art glasses (item 108) which employs liquid crystal shutters. Each shutter (items 109 and 110) opens and closes in synchronization with first and second image presentation on a display panel to ensure correlation with the correct eye.

Figure 2:
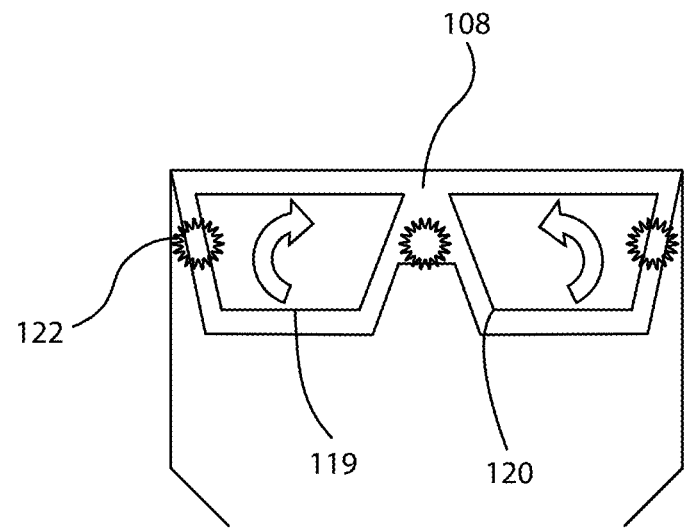
FIG. 2 is a schematic diagram illustrating prior art passively polarized glasses and also prior art anaglyph glasses.
Figure 2:
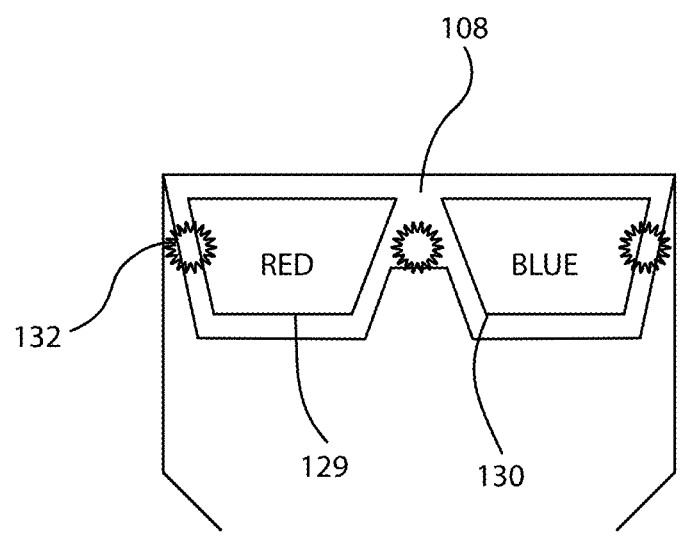

With reference now to FIG. 2 of the drawings, there is shown an illustration of prior art glasses (item 108) which employ passively polarized lenses (items 119 and 120). Said passively polarized lenses are coordinated with circularly or elliptically presented images on a display panel. This ensures correlation with the correct eye. The third method of prior art in this field employs anaglyph or colored lenses (items 129 and 130) designed to filter light based upon color. Again, this is used to ensure correlation with the correct eye.

Figure 3:
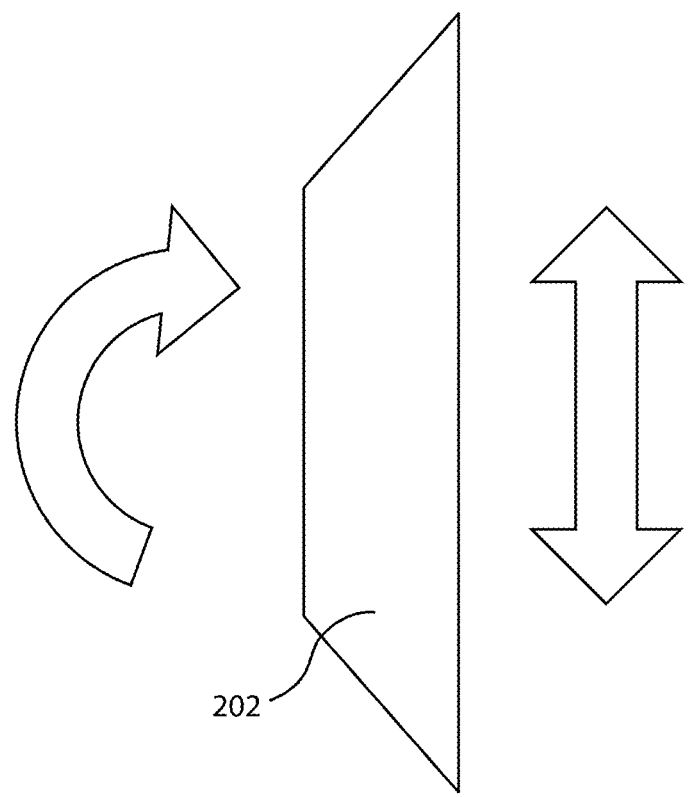
FIG. 3 is a schematic diagram illustrating a wave plate.

With reference now to FIG. 3 of the drawings, there is shown an illustration of a wave plate (item 202). Light coming from one side of the wave plate is circularly polarized and the light coming from other side is linearly polarized. Examples of this would be quarter or half wave plates. The degree of circularity is determined by the thickness of the polarizing media and other thicknesses may produce similar results.

Figure 4:
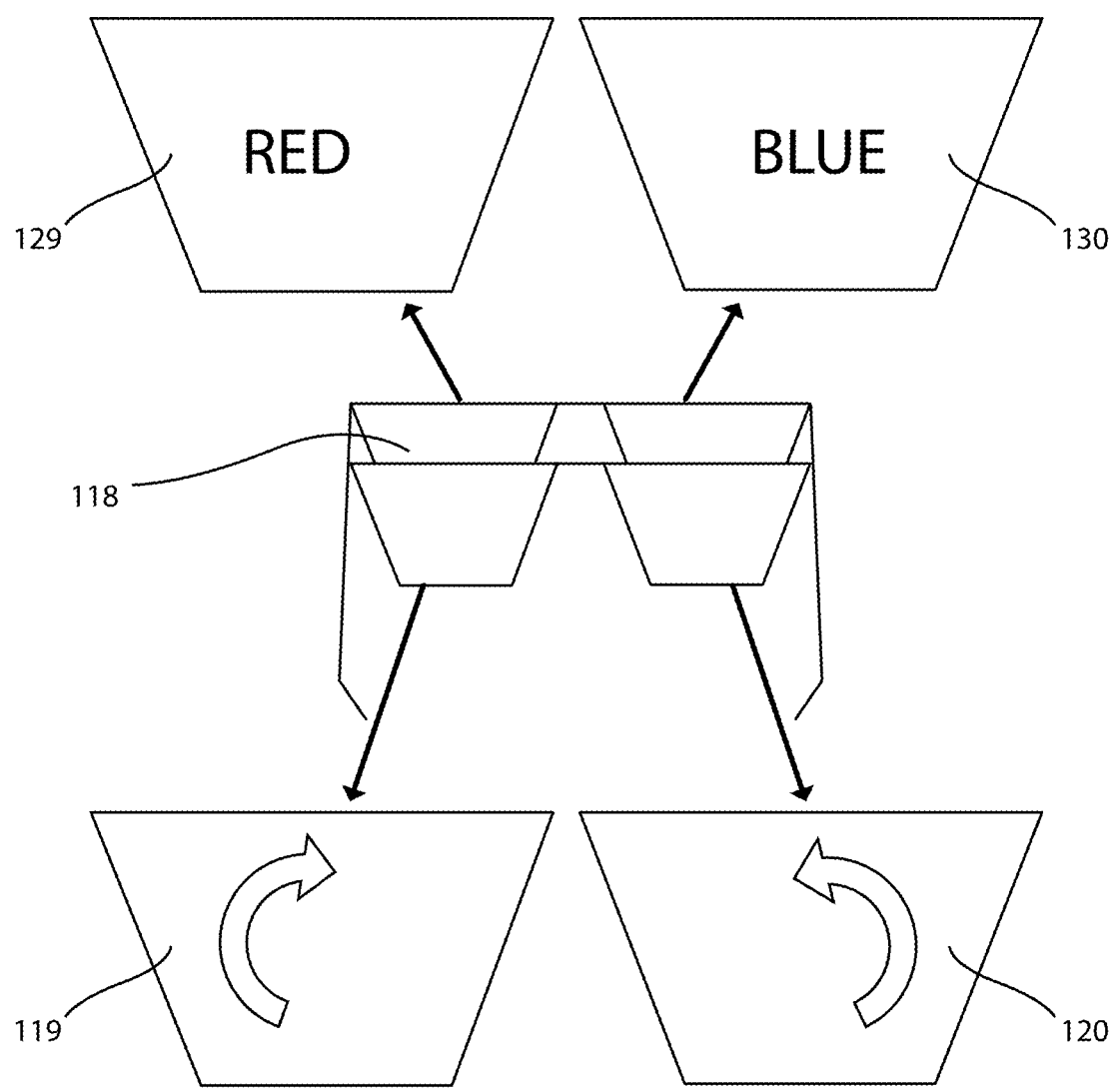
FIG. 4 is a schematic diagram illustrating glasses employing both anaglyph and passively polarized lenses.

With reference now to FIG. 4 of the drawings, there is shown an illustration of glasses (item 118) that combine the two methods of anaglyph lenses (items 129 and 130) and passively polarized lenses (items 119 and 120). The order of lenses from front to back is interchangeable as is the direction of polarization. Glasses may be customized to provide for stereoscopy, dual view stereoscopy, quad view imagery or one stereoscopic and two non-stereoscopic views.

Figure 5:
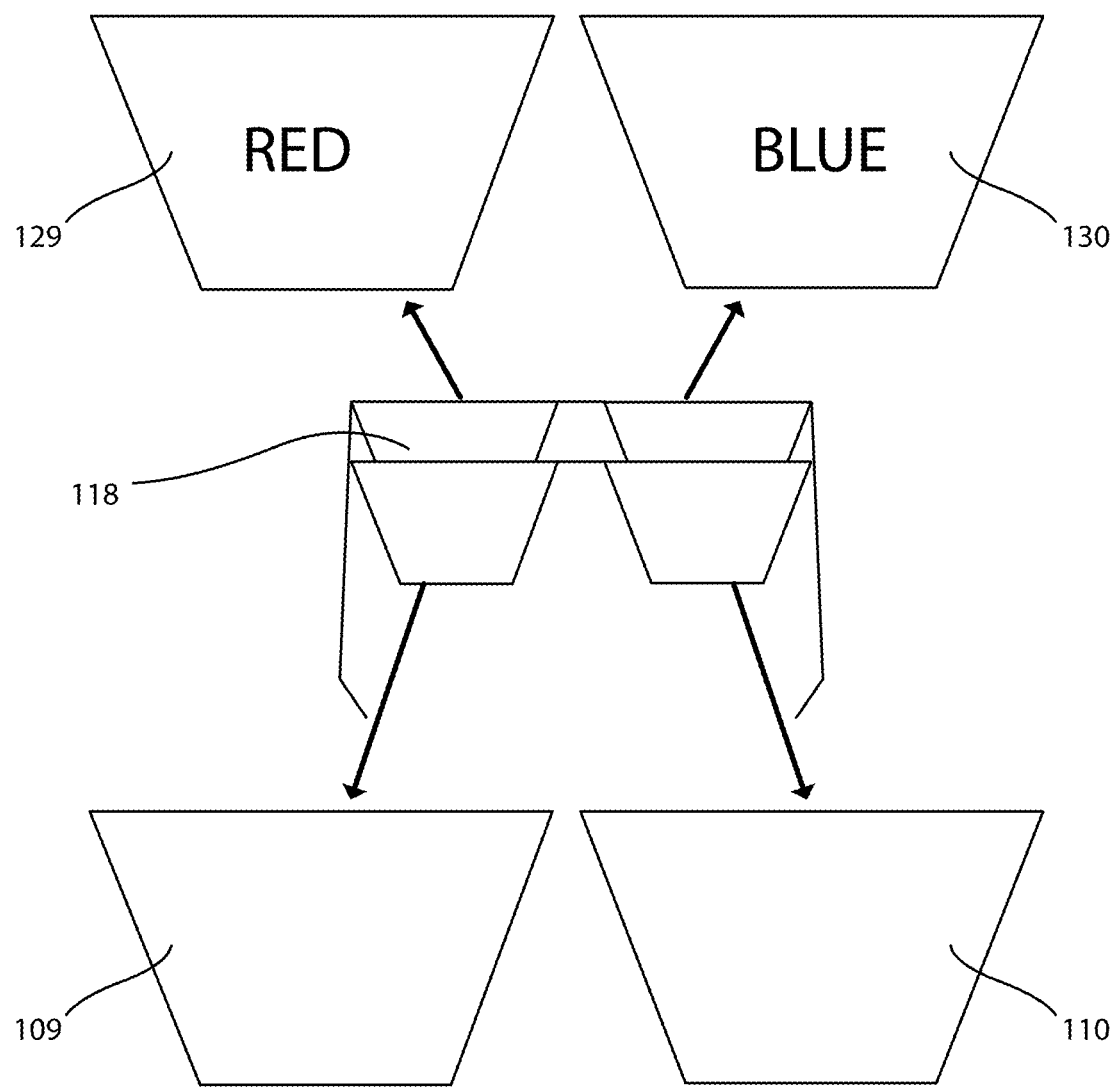
FIG. 5 is a schematic diagram illustrating glasses employing both anaglyph and shutter lenses.

With reference now to FIG. 5 of the drawings, there is shown an illustration of glasses (item 118) that combine the two methods of anaglyph lenses (items 129 and 130) and shutter lenses (items 109 and 110). The order of lenses from front to back is interchangeable.

Figure 6:
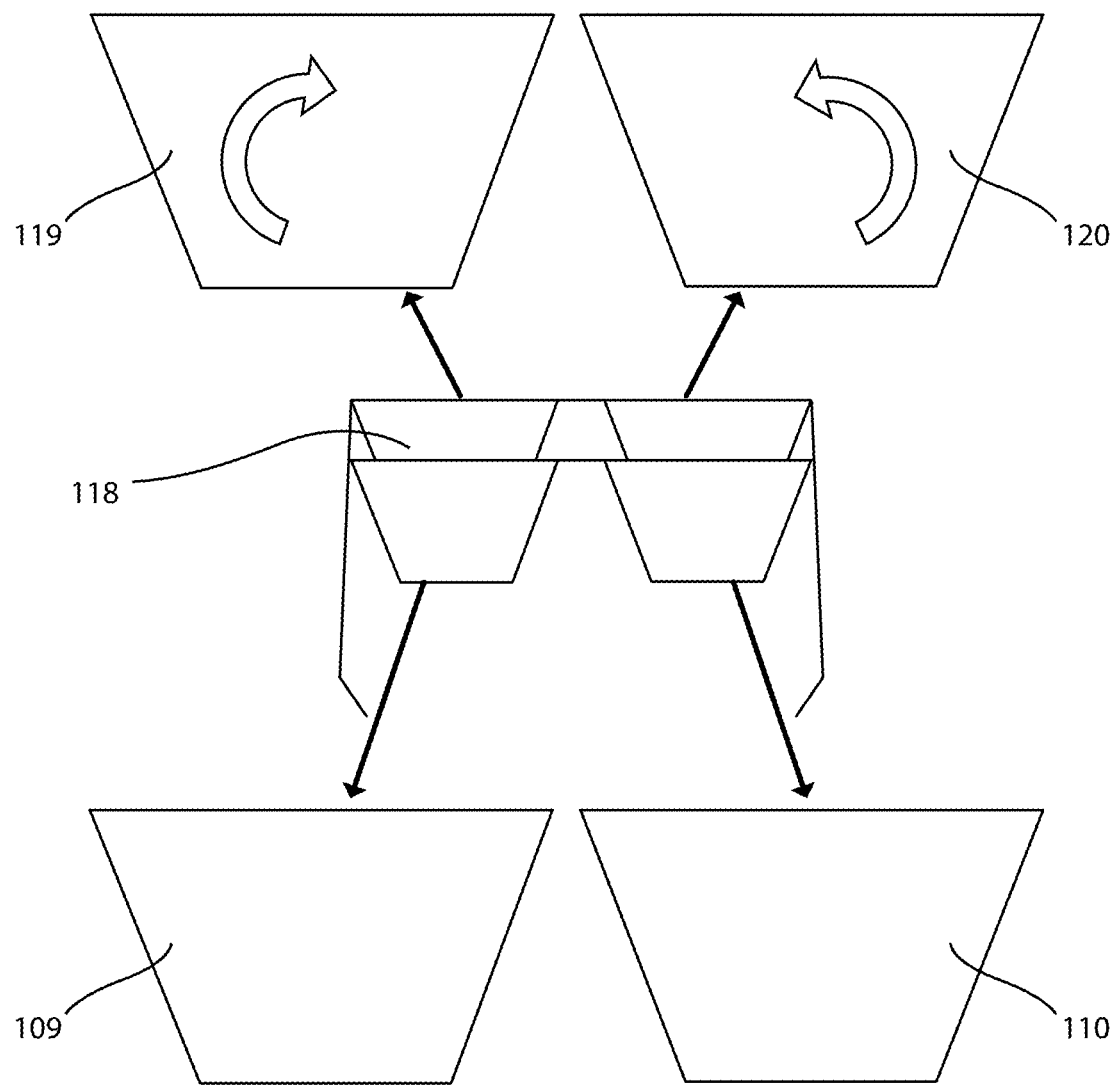
FIG. 6 is a schematic diagram illustrating glasses employing both passively polarized and shutter lenses.

With reference now to FIG. 6 of the drawings, there is shown an illustration of glasses (item 118) that combine the two methods of passively polarized lenses (items 119 and 120) and shutter lenses (items 109 and 110). The order of lenses from front to back is not interchangeable as the passively polarized lenses must be closest to the display panel.

Figure 7:
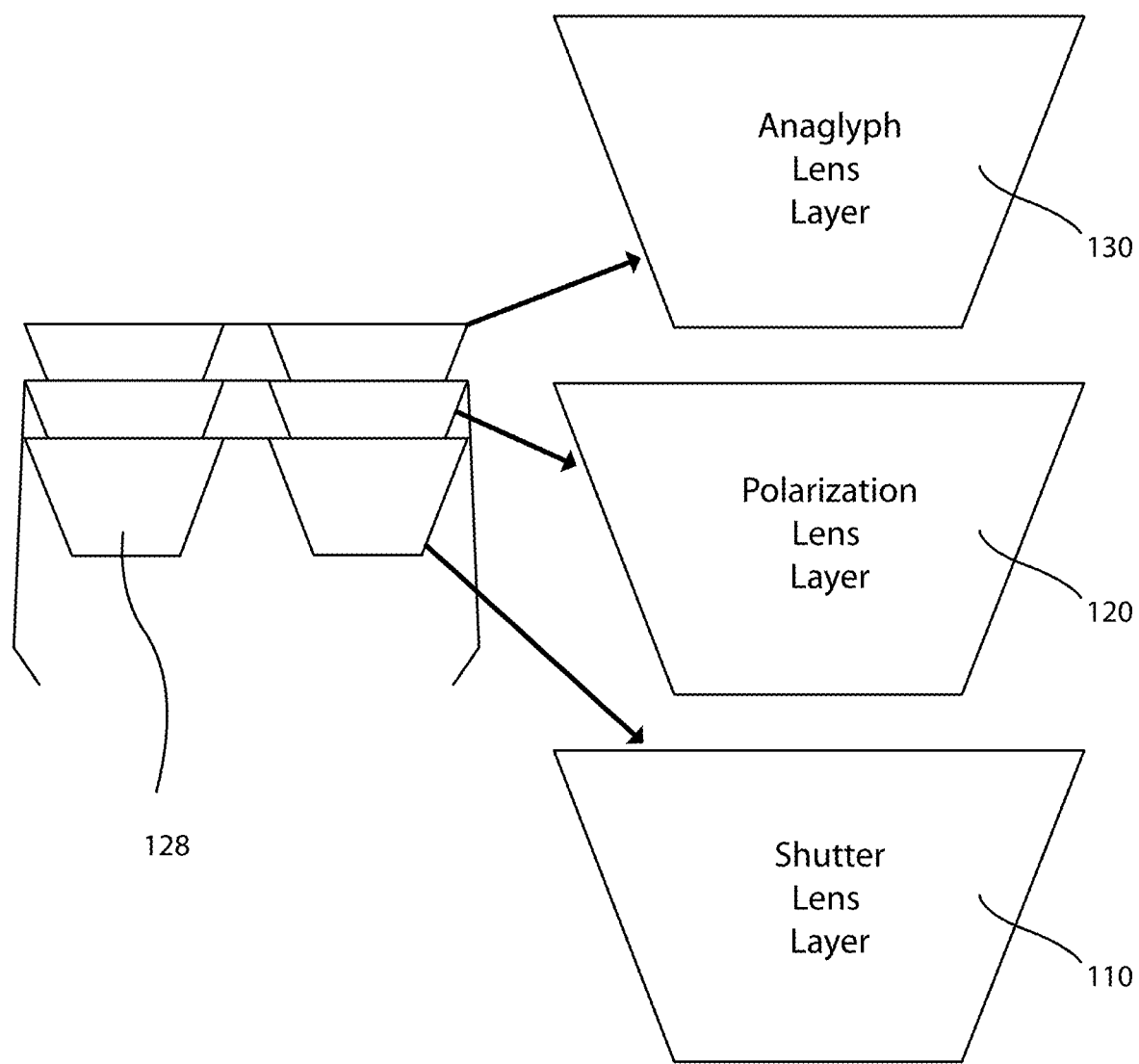
FIG. 7 is a schematic diagram illustrating glasses employing anaglyph, passively polarized, and shutter lenses.

With reference now to FIG. 7 of the drawings, there is shown an illustration of glasses (item 128) that combine three methods: shutter lenses (item 110), passively polarized lenses (item 120) and anaglyph lenses (item 130). The order of lenses from front to back is interchangeable with the exception that the passively polarized lenses must be nearer to the display panel than the shutter lenses.

Figure 8:
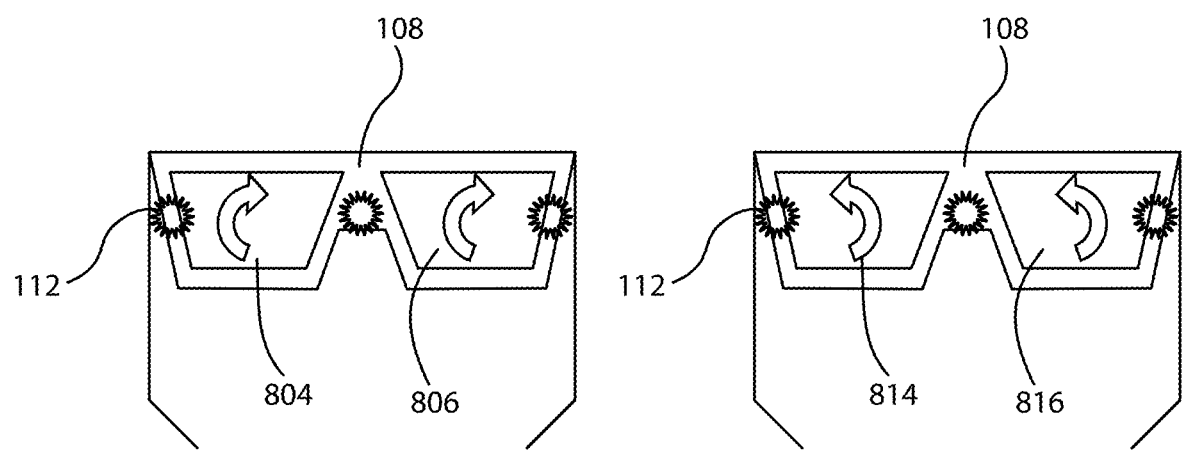
FIG. 8 is a schematic diagram illustrating glasses employing both passively polarized and shutter lenses.

With reference now to FIG. 8 of the drawings, there is shown an illustration of glasses (item 108) that combine passively polarized lenses and shutter lenses in a combination that could be used for quad view of four different images by four users. By opening and closing the shutters (items 804 and 806) together and shutters (items 814 and 816) together in opposition of pairs we obtain dual view. When this is combined with paired passively polarized lenses we obtain quad view. In this way four people each with their own set of individualized glasses would receive a different view. This would be especially useful in game playing. Many games such as bridge require four players with each having private knowledge.

Figure 9A:
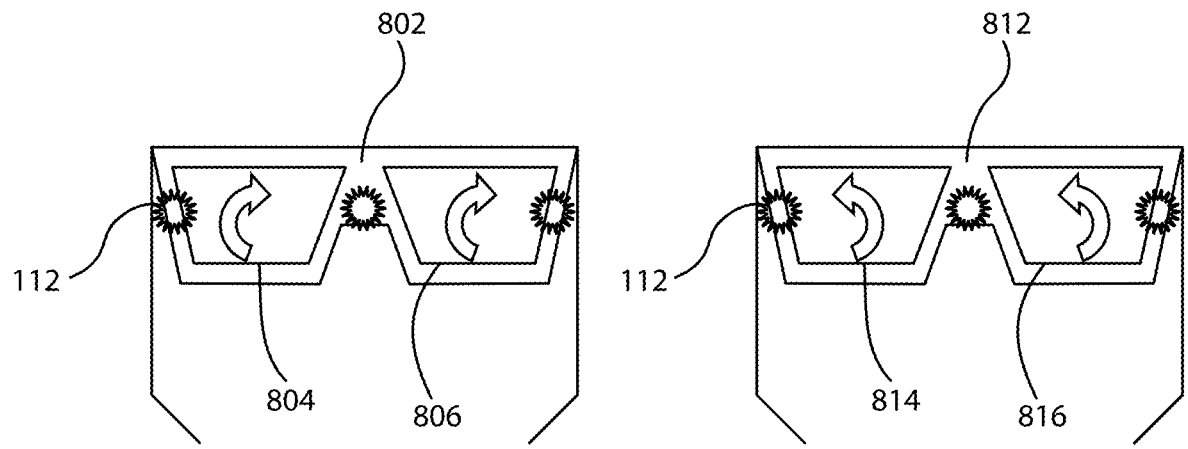
FIGS. 9A and 9B are schematic diagrams illustrating glasses employing both passively polarized and shutter lenses.
Figure 9B:
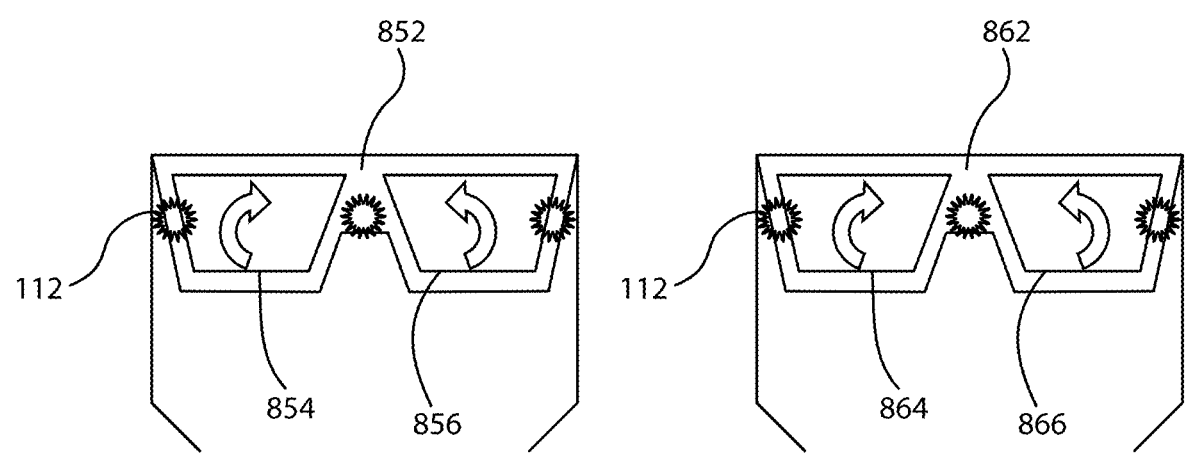

With reference now to FIGS. 9A and 9B of the drawings, there is shown illustrations of glasses (items 802, 812, 852, and 862) that combine passively polarized lenses and shutter lenses in different combinations for different effects.

For all of the different glasses in the present invention it is understood that by varying the combination of lenses multiple imagery or stereoscopic effects may be produced and the different combinations are limited only by one's imagination. All combinations of anaglyph, shutter and passively polarized lenses are considered to be within the scope of this invention. Some combinations will enable more stereoscopic images to be seen while others may be employed which afford less stereoscopic images and more non-stereoscopic images to be seen. In this way the placement and types of lenses are flexible depending on the needs and wants of the user.

Figure 10:
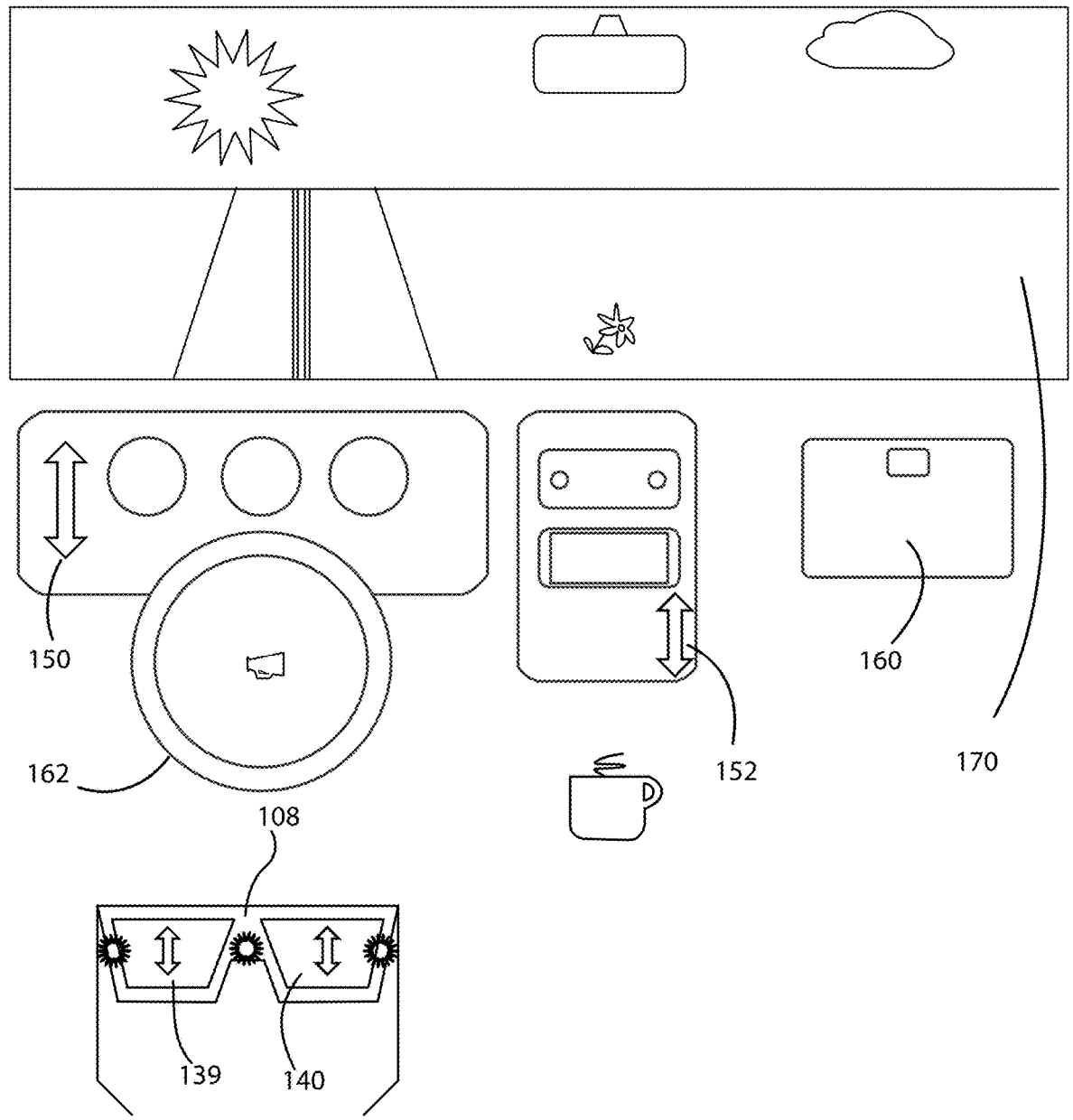
FIG. 10 is a schematic diagram illustrating prior art displays in an automobile that emit linearly polarized light.

With reference now to FIG. 10 of the drawings, there is shown an illustration of prior art liquid crystal displays which are presently employed in automobiles, airplanes, and transportation in general. Liquid crystal displays employ a front surface of linear polarizing material to selectively block light based upon the twist of polarization; therefore, the light is emitted with linear polarization. The interior of an automobile is shown for illustration with item 170 representing the windscreen, item 162 the steering wheel, and item 160 the glove box. Items 150 and 152 illustrate liquid crystal displays that emit linearly polarized light. This polarized light may or may not pass through the polarized lenses (items 139 and 140) of a driver's glasses (item 108) depending on the angular orientation. Prior art display panels in automobiles and airplanes make use of liquid crystal display technology or other technology which employs a linear polarizer on the front or viewing panel. This is used to block unwanted light from reaching the viewer. However, this technology makes it difficult for users of linearly polarized glasses to see the display properly. One result of this is commercial pilots do not make use of polarized glasses when flying aircraft. This presents a problem for people who use polarized glasses. As the plane of polarization from these glasses is rotated with respect to the displays various amounts of the linear polarized light will reach the eye. It is for this reason aviator sunglasses are of the non-polarized variety. Polarized lenses are more effective at reducing glare; however, they interfere with the display polarization as mentioned.

Figure 11:
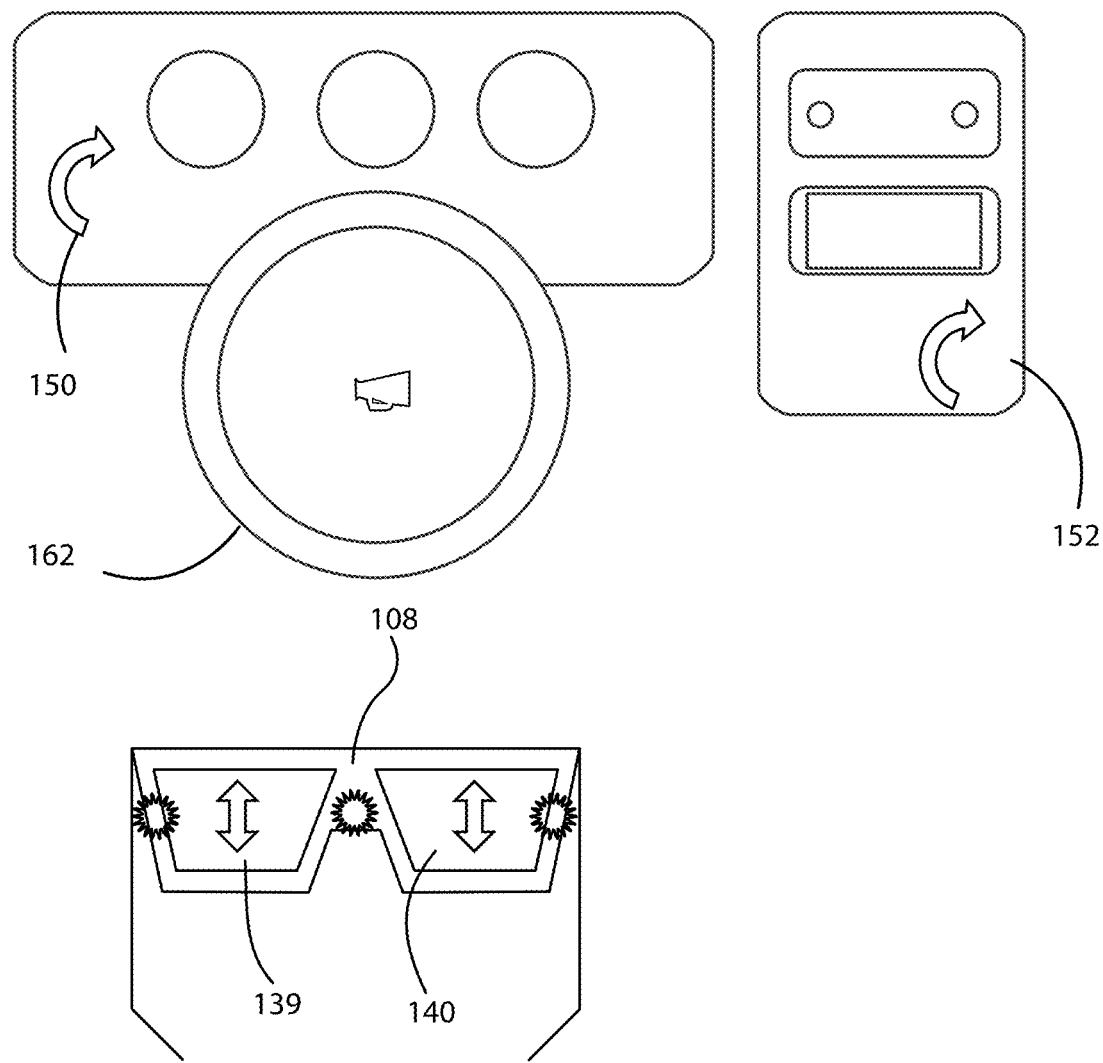
FIG. 11 is a schematic diagram illustrating automobile displays that emit circularly or elliptically polarized light.

With reference now to FIG. 11 of the drawings, there is shown an illustration of an automobile employing a wave plate for the front surface of its displays (items 150 and 152). This wave plate may be the only polarized front surface as one side accepts linearly polarized light while emitting circularly or elliptically polarized light from the other surface. Alternatively, a thin sheet of wave plate may be applied over an existing display to change the linearly polarized light into circular or elliptically polarized light.

The light leaving the display panel is now circularly or elliptically polarized and thus passes through linearly polarized lenses of eyewear regardless of the angle. In this way aviators, automobile drivers, etc., may now use glare-reducing lenses in their eyewear without fear of losing visual sight of their instrumentation. This makes for safer transportation.

There are other display technologies that employ liquid crystal displays and emit linearly polarized light. Said displays may be converted to emit elliptically or circularly polarized light by the methods described in the present invention. Hence, all screens for automotive, aviation or transportation use, which employ a front surface of circularly or elliptically polarized light or light other than linear polarized light, shall be considered within the scope of the present invention.

Figure 12:
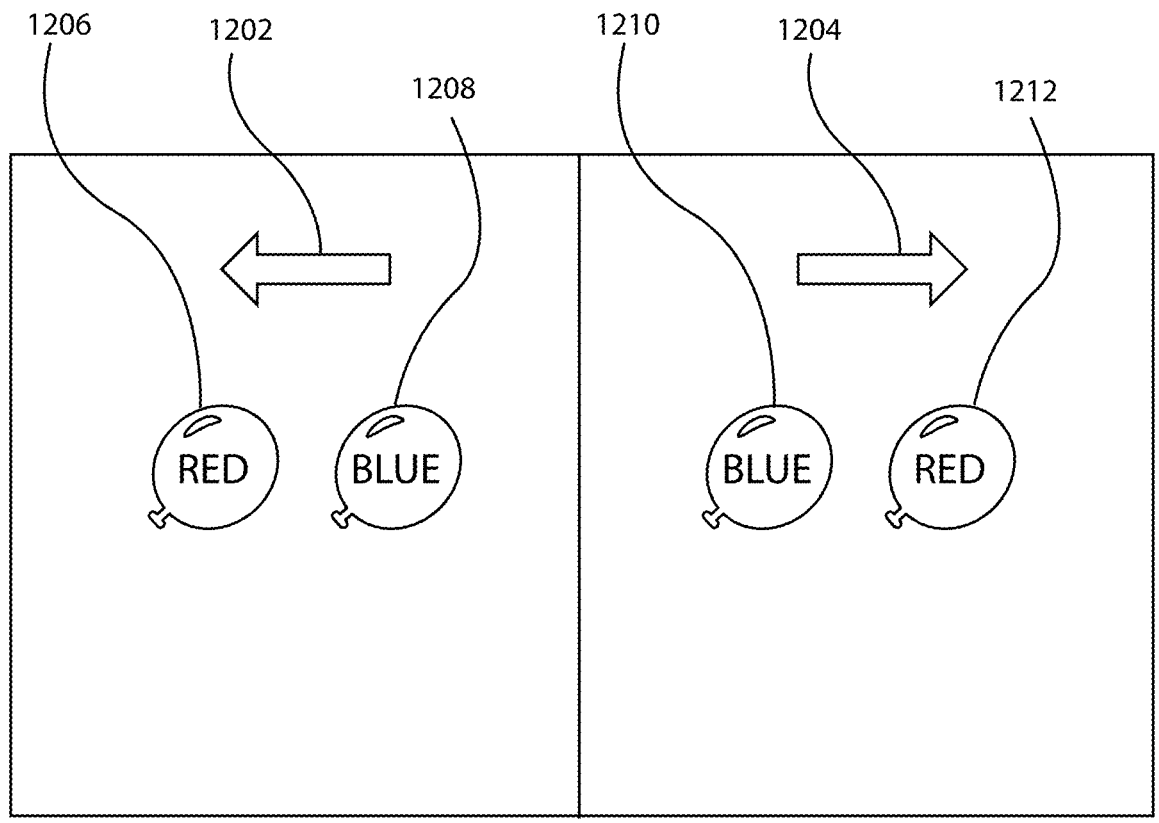
FIG. 12 is a schematic diagram illustrating a display signal arrangement which uses both side by side and anaglyph methods in combination.

FIG. 12 is an illustration of an embodiment of the display mode which employs two methods of stereo mode. The split screen format is currently in use in most 3D displays of the present time. In this display mode a first and second images are displayed on left and right halves of a signal sent to the display unit. The display unit usually will have a 3D display mode which splits the halves and displays the first or second images in full screen width to the left and right eyes in a coordinated manner so as to produce a stereoscopic effect. There are two common means for accomplishing this. The first employs shutter glasses where the first and second images are displayed with a time differential. The left and right shutter glasses open alternately in sequence so the coordinated image reaches the proper eye. The second method employs passively polarized glasses where the left and right eyes have opposite polarization. The first and second images are displayed with opposite polarization so the coordinated image is able to pass through the proper lens to achieve 3D stereo effect. A third method of employs parallax barriers to achieve auto stereoscopy.

In the embodiment illustrated in FIG. 12, the arrows (items 1202 and 1204) are used to illustrate the differentiation of the left and right halves of the split screen. The arrows can be considered to represent images which will be displayed to different eyes where the differentiating feature may be polarization (for use with passively polarized glasses), sequential time (for use with shutter glasses), or separation using parallax barrier technology. In this illustration, each half of the screen displays images (items 1206 and 1208 on the left half, and items 1210 and 1212 on the right half) which are further differentiated by use of a color filter. In this embodiment anaglyph or colored glasses that allow light from one color to pass while blocking another color are used to further coordinate which image passes through the properly coordinated lens of the glasses. The colors illustrated are red and blue, but this is not the only possible color combination and any combination of color discrimination that allows passage of one color through one lens while filtering the other may be employed.

Therefore, the eyewear may have lenses that discriminate using two methods. The first method may employ shutter lenses, passively polarized lenses or parallax barrier technology. The second method may employ colored lenses that are also referred to as anaglyph lenses.

Figure 13:
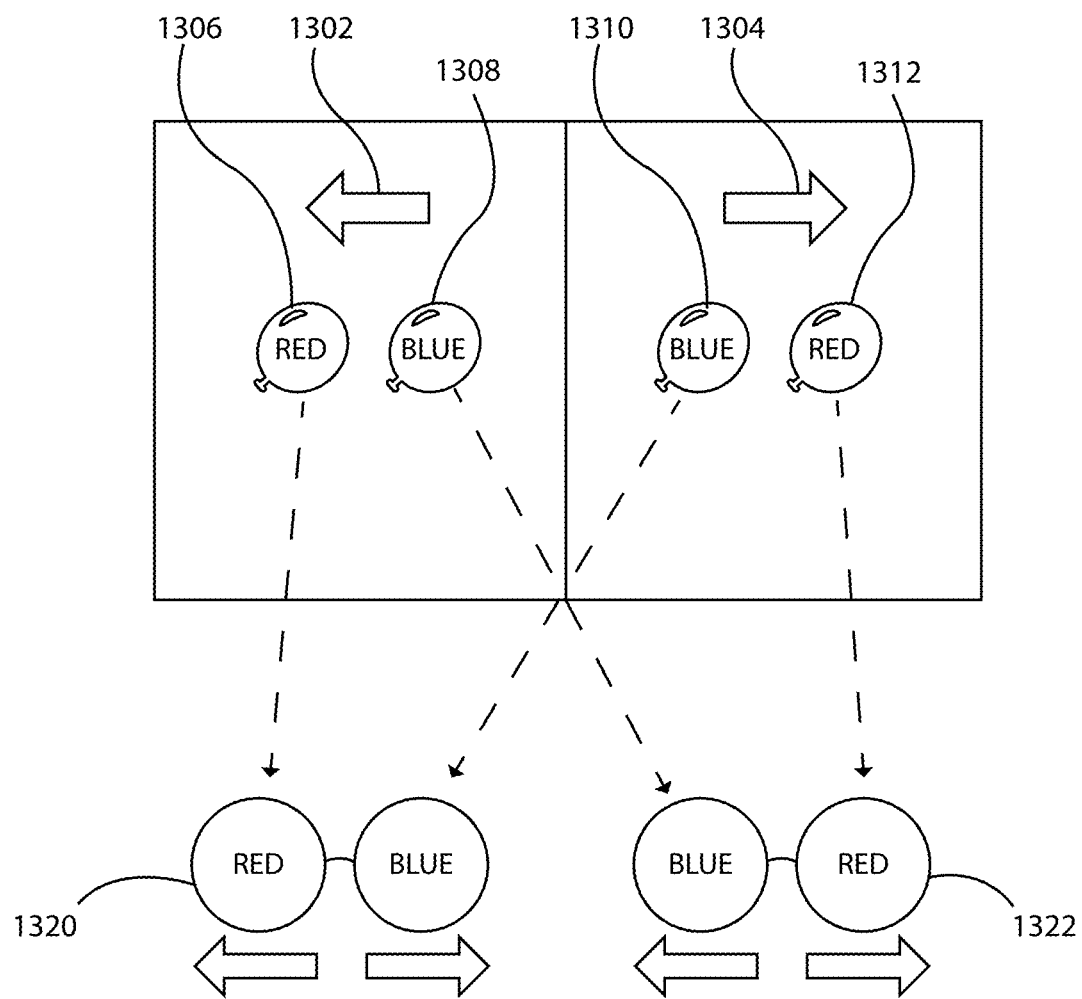
FIG. 13 is a schematic diagram illustrating a glasses arrangement for two-person stereo using side by side and anaglyph methods in combination. This may be used for two-person point of view stereo.

FIG. 13 expands the illustration of FIG. 12 to include the eyewear (items 1320 and 1322). In this illustration, the arrows are used to illustrate coordination with the left and right images of the split screen. The red and blue colors illustrate coordination with the images displayed using red and blue color filters. In this embodiment four distinct images can reach four different eyes by use of two sets of filters. The lenses of the glasses in this embodiment have two stages. A polarization or shutter stage (parallax barriers may also substitute for this stage) and a colored or anaglyph stage. If the images are properly coordinated for point of view then two unique stereoscopic images may be seen by two viewers. Furthermore, if the location of the glasses or head position are tracked then two unique point of view (also referred to as POV) stereoscopic images may be seen.

Such an embodiment has tremendous use. If the images are properly constructed, two individuals may see a 3D stereoscopic image which exists in the same location in space with each of the two viewers seeing the image as it would appear from their point of view. This enables an illustration where the first user may point to a 3D displayed object and the second user sees the location on the object being pointed to from his own viewpoint. This would be useful to educators, doctors explaining an image to a patient or to anyone talking about one image to another. In addition, using POV techniques real world virtual objects may be created that may be interacted with by more than one user. This may be employed in gaming devices and methods. It may also be employed in simulators or simulations.

Figure 14:
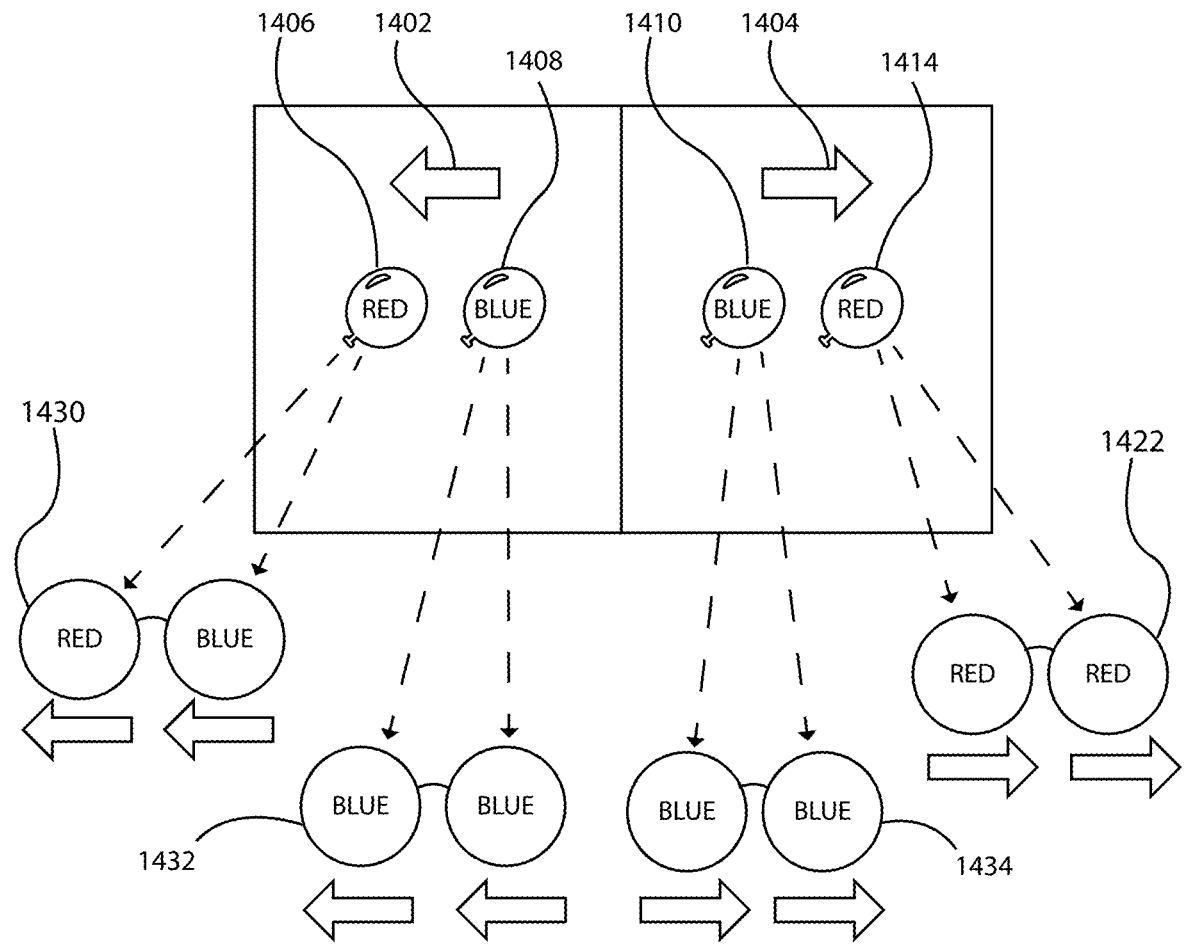
FIG. 14 is a schematic diagram illustrating a display combining side by side and anaglyph stereo methods to produce four unique image view capability.

In FIG. 14 we have an illustration of an embodiment where four viewers each see their own unique display image. In this embodiment, the image presented is not stereoscopic. However, in another embodiment combinations of three or more stereoscopic methods may be employed to allow four or more users to each see unique 3D stereoscopic images. For the embodiment illustrated in FIG. 14 we have four pairs of glasses (items 1430, 1432, 1434, and 1422). Each pair of glasses is implemented so it sees either the first or second image presented by the split screen discriminator (shutter lenses, passively polarized lenses, etc.). In this embodiment, the color discriminator is now the same for each lens of a pair of glasses. In this way, both of the lenses in each pair of glasses only allow passage of one of the four images produced. So, each individual user sees the same one of four images in each eye. This allows gaming devices where four players can play and none see the others' information. An example, but not the only use would be a game of bridge. The glasses of any of the embodiments may be further enhanced by use of side blocking devices so users playing games can't look around the sides of the glasses.

Figure 15:
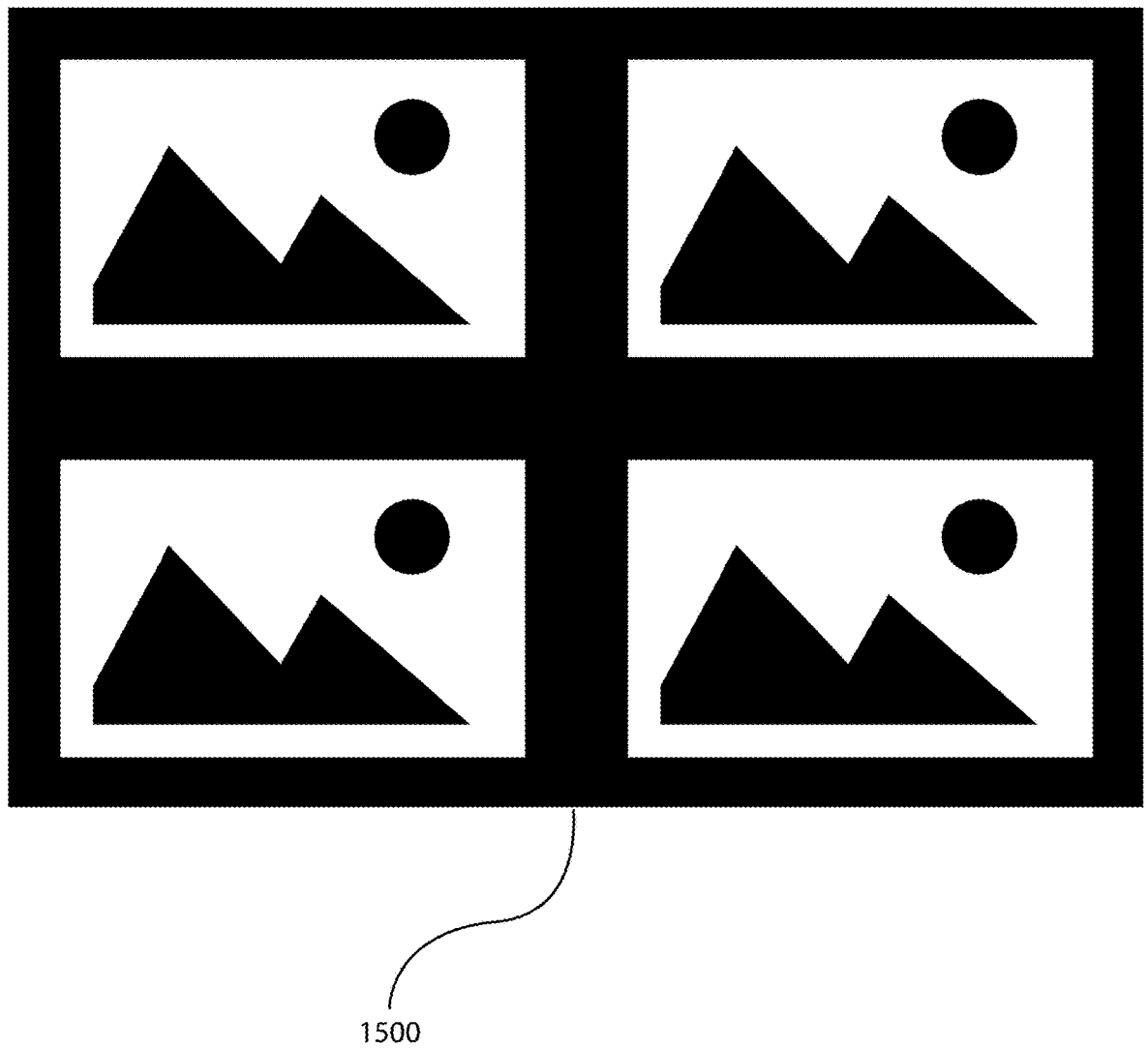
FIG. 15 is a schematic diagram illustrating a display signal that combines side by side and top and bottom combination enabling four views. At least one embodiment of the method combines passive glasses technology with shutter technology. Very fast shutter glasses technology may also be used, but may be more expensive due to the shutter speed required.
Figure 16:
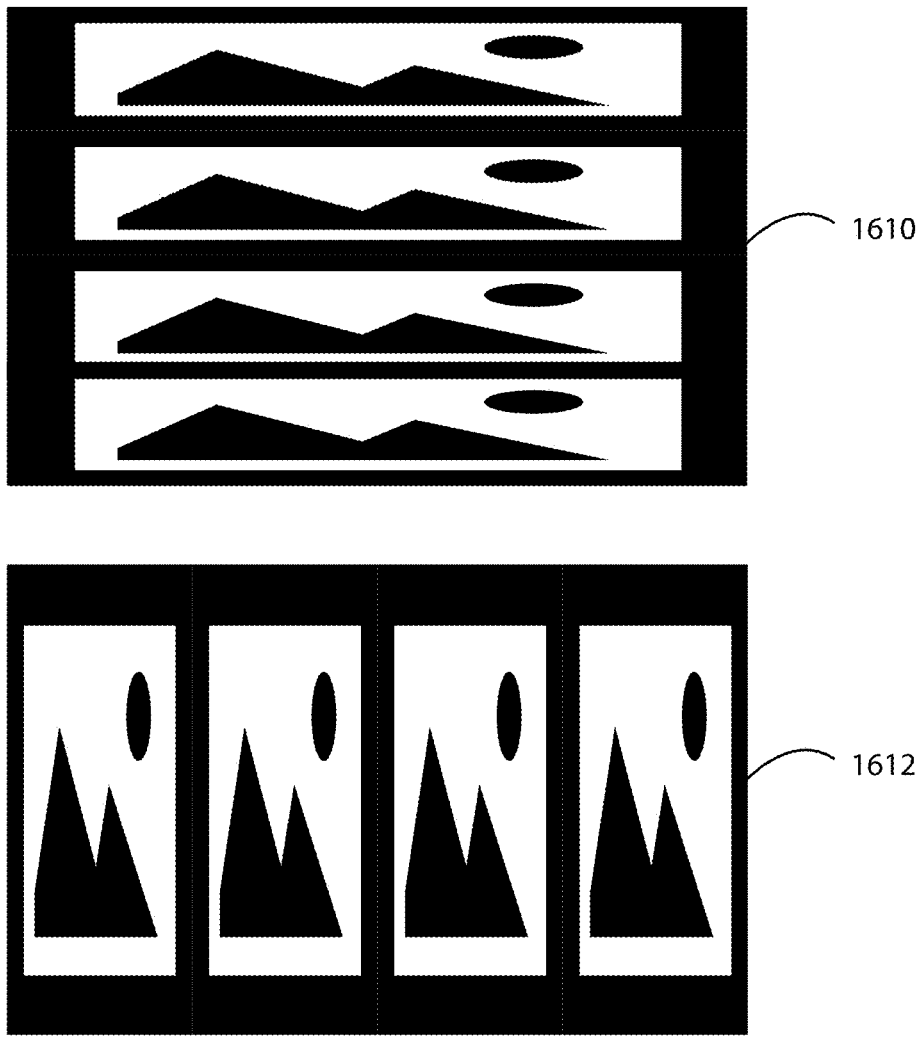
FIG. 16 is a schematic diagram illustrating a signal that is split into four views placed one above the other or placed side by side with each other.

The method of shutter glasses to display more than two images is limited by the speed at which the glasses can cycle and also by the fact that there is a period before and after opening when nothing is displayed to avoid ghosting. Hence shutter technology by itself is of limited use beyond two sequential images. In another embodiment of the instant invention the method of shutter glasses is combined with the method of passively polarized glasses. This requires a display that employs both methods. Such a display requires a means for four images to be sent and decoded. At present the side by side method where each side is expanded to full when displayed in 3D stereo is employed. FIG. 15 is an illustration of a method of compressing four images into one frame. Item 1500 shows the frame split into quarters with each quarter displaying an image. The four images are then displayed full screen with each one having two methods applied. The system may for example combine the methods of shutter glasses and passively polarized glasses or may combine one of these methods with parallax barriers. In another embodiment, each of the four images has the same ratio of length to width as the full screen expansion. Thus, it is compressed by the same ratio in both length and width. FIG. 16 illustrates two other compression methods for four images. Item 1610 is an illustration of four images one placed above the other. Item 1612 is an illustration of four images placed side by side four times.

In summary, the instant invention improves upon the prior art by providing for multiple views of a stereoscopic display panel without relying exclusively on the speed of shutter technology. Secondly, the invention provides displays that work well with polarized glasses, thereby enhancing transportation safety.

Figure 46:
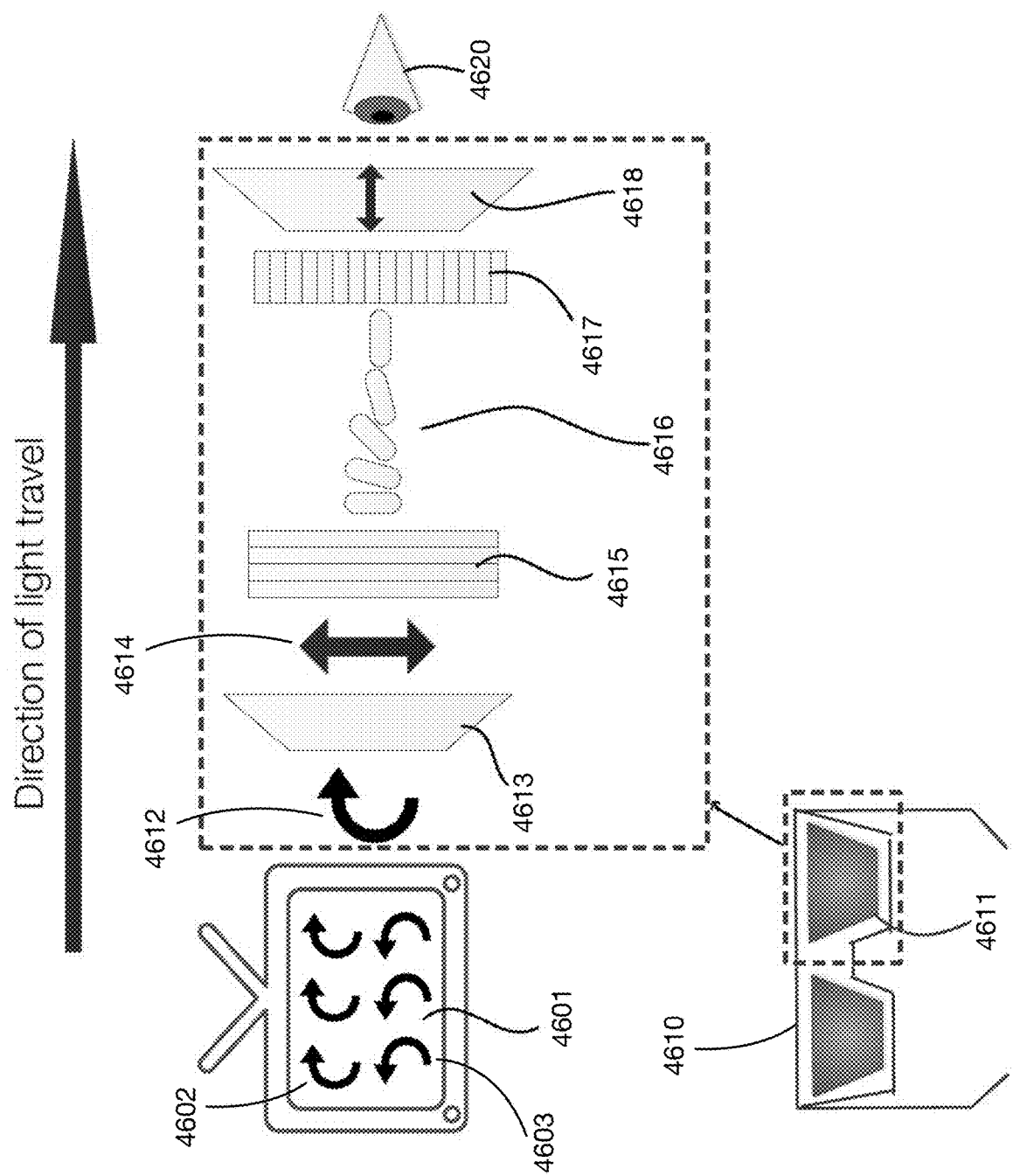
FIG. 46 illustrates an embodiment of a quad view system with viewing glasses that combine a polarizing filter with a liquid crystal shutter to generate four different possible views of a single monitor, thereby supporting for example dual stereoscopic views.

FIG. 46 shows an illustrative embodiment of a system that supports four different views from a single monitor. Using this quad view system for example it is possible for two viewers to be sent different stereoscopic images and this may be applied to point-of view stereoscopic devices or methods. Additionally, four separate 2D images may be presented to four users. This would have value for example as a four-person gaming device. Games such as bridge and scrabble may be played amongst four players with none the wiser as to the other players' cards or pieces. Additionally, in one or more embodiments one stereoscopic view may be combined with up to two two-dimensional views.

A quad view system may for example include a viewing monitor, a computing processor, memory, and wave retarders. The viewing monitor may have a strobe, a timing coordination mechanism, wave retarder plates, and a means to coordinate timing with the viewing glasses of the users.

Existing 3D stereoscopic television/glasses systems known in the art use primarily use one of two methods: time slice methods in which images are displayed sequentially in time and glasses have shutters that open and close in coordination, and passive polarization methods that employ rows or patterns of pixels that produce light patterns of opposite elliptical or circular polarization. In the time slice method liquid crystal shutter glasses are employed. The light passes through a front plate and is given a linear polarization in a direction coordinated so that it may be rotated or not rotated electronically by liquid crystals to pass through a linear polarizer on the further side in order to reach the observers' eyes.

One or more embodiments of the quad view system, such as the system illustrated in FIG. 46, may combine a time slice monitor 4601 with a pattern of wave retarders to produce circularly or elliptically polarized light in patterns. The patterns may be made to be parallel rows. For example, the monitor 4601 may output light 4602 that is circularly polarized in a clockwise orientation, and light 4603 that is circularly polarized in a counterclockwise orientation. The polarization pattern of emitted light, together with a time slice during which the light is emitted, may define a unique combination of one of four outputs. Each of these four outputs may for example show a different view of a scene. In particular, in one or more embodiments two viewers may each view a unique stereoscopic image of a scene, with different left and right images for each viewer (or four views in total).

Glasses 4610 used by a viewer to view the scene may for example combine time slicing filters with a circular or linear retarder on or near the front surface. For example, the right eye lens 4611 of the glasses 4610 may have several layers that combine the selection of the correct polarization with the selection of the correct time slice. By using different polarization or time slice selections for the left and right lenses, and for different glasses for another viewer, the four views needed for dual stereoscopic images may be generated. In the embodiment shown in FIG. 46, a wave retarder or polarizer 4613 is placed at or near the front of the lens 4611 (where "front" is closest to the monitor and furthest from the eye). Different polarizers on the front of the left and right lenses will cause a different direction of circularly polarized light to pass through the left and right polarizers. The front retarders of the glasses may be configured so that after passing through the light is now linearly polarized, so it may be twisted as desired electronically by the liquid crystal material of the lenses that provide the time slice filters. For example, circularly polarized light 4612 passes through wave retarder 4613, and is converted to linearly polarized light 4614. The subsequent layers 4615, 4616, 4617, and 4618 provide a shutter feature to either pass the light 4614 through to the viewing eye 4620, or to block it. Specifically, the liquid crystals 4616 may twist to rotate the polarization 4614 to match the final linear polarizing filter 4618, thereby passing the light through. If the voltage on the liquid crystals is modified, the twisting may not occur or may occur differently, in which case the original polarization 4614 will be blocked by filter 4618. Alternating the twisting and untwisting of the crystals thereby creates a time-sliced shutter filter.

Monitor 4601 may output images that are coordinated with glasses 4610 and with a second pair of glasses. For example during time slice one a first image may appear on odd lines 1, 3, 5, . . . of monitor 4601, and image two may appear on even lines 2, 4, 6, . . . of monitor 4601. These even and odd lines may be output with different polarizations. During time slice two a third image may appear on odd lines 1, 3, 5, . . . and image number 4 may appear on even lines 2, 4, 6 . . . . This process may then be repeated for subsequent images.

The glasses may coordinate with the monitor so that the proper image reaches the correct eye. For example, one set of glasses may have both shutters closed while the other has both shutters open. Or they may be controlled so the left eye shutter of glasses pair number one is closed at the same time slice as the right eye shutter of glasses number two is also closed. The coordination of images with correct lens and eye may be controlled by both passive polarization and time slice working in conjunction.

Figure 47:
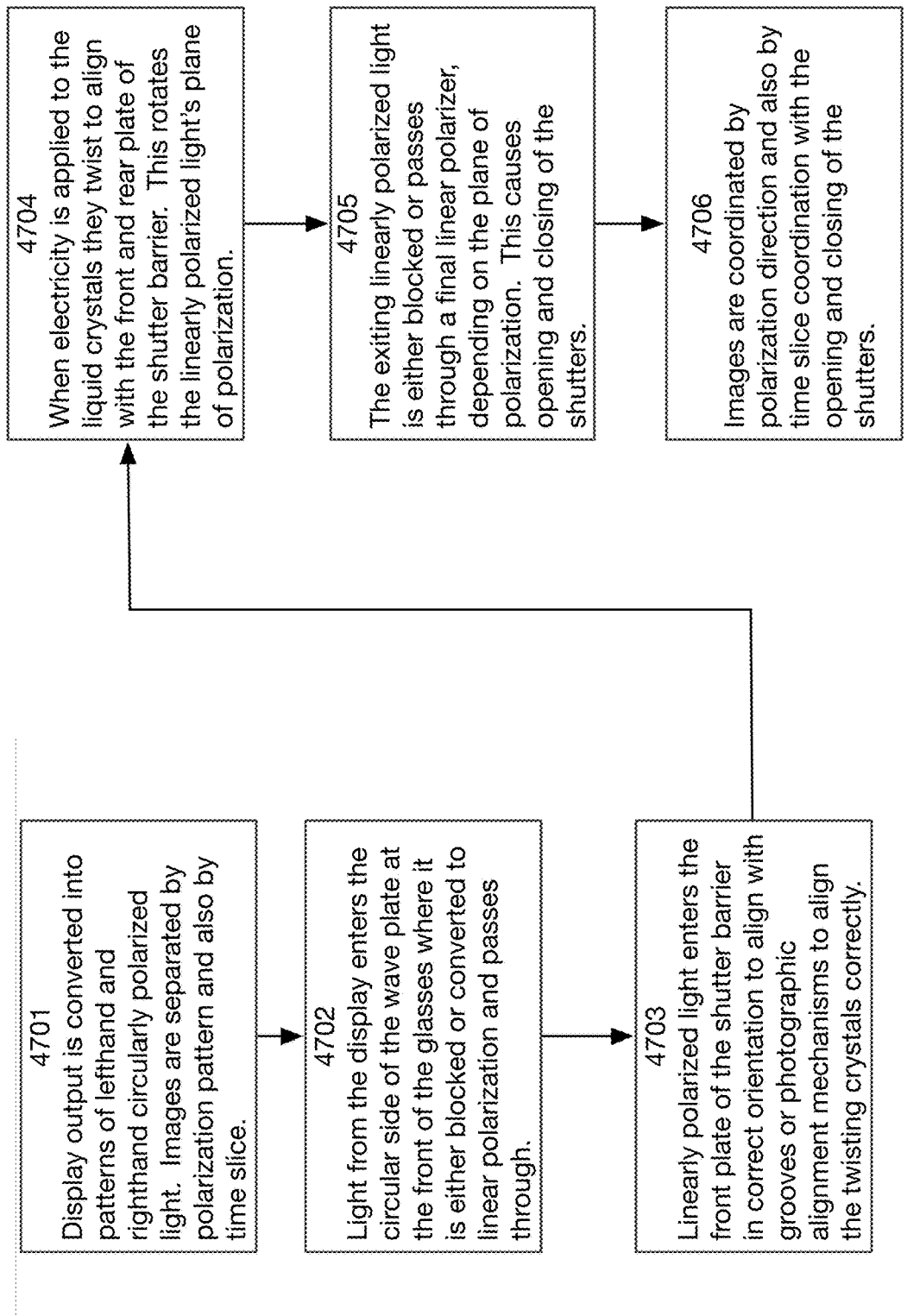
FIG. 47 shows a flowchart of the operation of an embodiment of the quad view system.

FIG. 47 shows an illustrative flowchart of steps that may be used in one or more embodiments to provide four (or more) different views. In step 4701, four different display outputs are generated, each with a unique combination of polarization and time slice. In step 4702, one of these outputs enters the front of a glasses lens, which selects for one type of polarization and blocks the other type. In steps 4703, the linearly polarized light emitted from the front wave retarder of the lens is transmitted to the front of a shutter system. An illustrative shutter system uses rotating crystals to either rotate the linear polarization or leave it unchanged. In step 4704, electricity applied to the liquid crystals causes them to twist, thereby rotating the polarization. In step 4705, the linearly polarized (and possibly rotated) light is transmitted to a final linear polarizer, which either transmits or blocks the light. In step 4706, images are coordinated by polarization and by time slice to match the appropriate lens of the appropriate glasses.

Tracking of Glasses

This disclosure also describes systems and methods for, in some embodiments, tracking a head of a user relative to a display system; this may include a tracking device which couples, during use, to a head of a user. In some embodiments, the tracking device may include eyewear, headwear, arm wear, hand wear, object cover and/or another device that is to correlate to some object to be tracked. The tracking device may include a first side, a second side, and at least one geometric object emitter. The second side may be opposite the first side. The second side may be directed, during use, towards the head of the user. The at least one object emitter may be positioned on the first side of the tracking device. In one or more embodiments, this emitter may be a reflector which reflects ambient light, IR or UV light.

One or more embodiments of the system may track any feature or features, including but not limited to features of eyewear. Tracked features may for example include facial features such as eyes, ears, noses, or mouths. Tracked features may include for example any 2D objects located near or attached to the head (including but not limited to the use of facial features). Tracking may be based for example on locating any feature or features in one or more 2D images (such as for example images captured by one or more cameras), and calculating the 3D position and orientation of a user's head or any parts thereof (such as eyes) from the 2D images of these features. Determining the 3D position and orientation of the user's head or of any other objects may be based for example, without limitation, on the size, orientation, or shape of the features in the 2D images, or on the separation between features in the 2D images.

Figure 17:
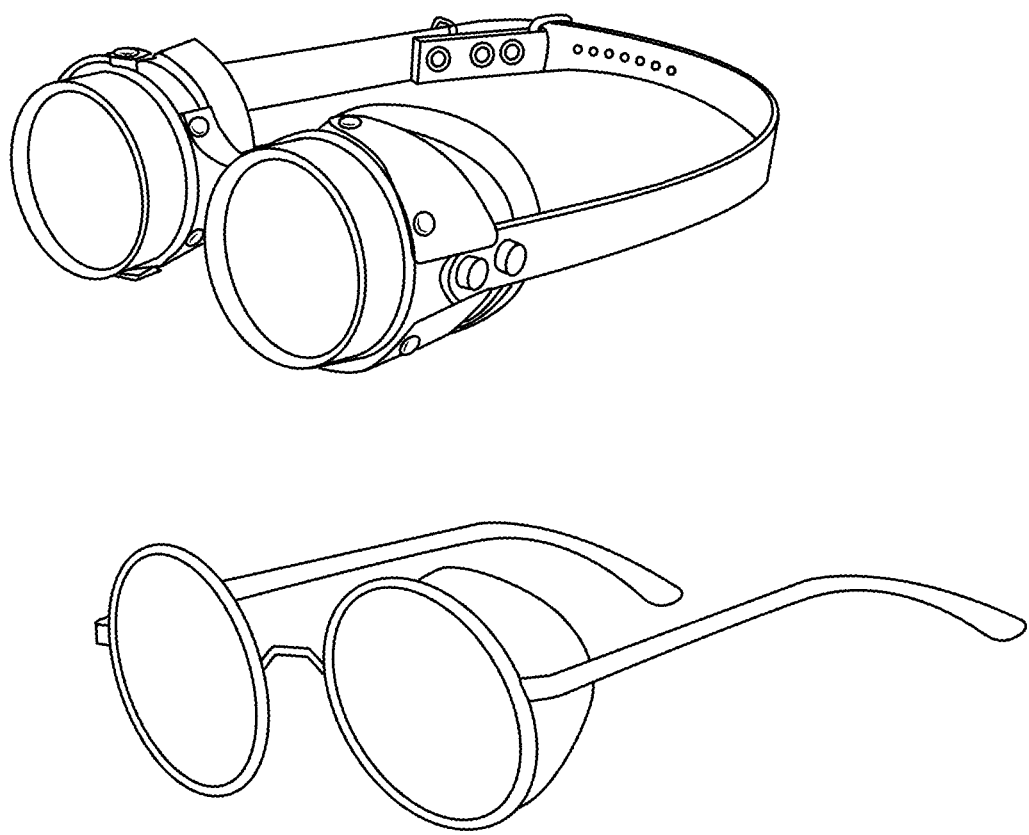
FIG. 17 shows embodiments of trackable glasses with circular lenses.

FIG. 17 shows illustrative embodiments of inexpensive eyewear with circular lenses. Embodiments of glasses and goggles are shown, but the lenses may be mounted in other configurations such as attached to a hat or headband. As FIG. 17 shows, the eyewear with circular lenses can be stylish and there are many frames that support circular lenses. In one or more embodiments, glasses or goggles with sideways shielding materials may be employed to prevent gamers from looking outside the edges of the glasses, preserving fair play.

There has lately been great progress in the field of computer vision. These advances make it possible using sensors or cameras to identify objects in the field of view of the sensors or cameras. Complex objects such as faces may be identified and facial features may be determined. The task of identifying basic geometric shapes is well within the capabilities of modern computer vision software. One such popular computer vision software is called OpenCV and there is much literature regarding how to use it. One reference is the book "Learning OpenCV, Computer Vision with the OpenCV Library," by O'Reilly. The website opencv.org has additional online documentation and tutorials.

An online source for identifying circles using inexpensive cameras coupled with computer software can be found at: http://www.pyimagesearch.com/2014/07/21/detecting-circles-images-using-opencv-hough-circles/. Additionally, methods for identifying ovals in images can be found at: http://scikit-image.org/docs/dev/auto_examples/plot_circular_elliptical_hough_transform.html. Information on faster ellipse detection techniques is available on the Internet. These are just examples of methods for identifying circles and/or ovals and other methods may be used to accomplish the same objective without deviating from the scope of the present disclosure.

Figure 18:
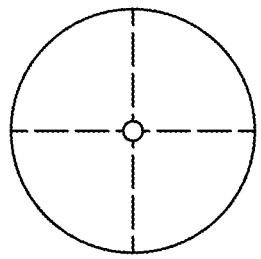
FIG. 18 shows how a circular object may appear when viewed from different angles.
Figure 18:
Figure 18:
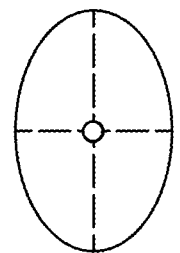
Figure 18:
Figure 18:
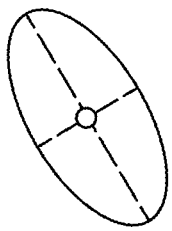
Figure 18:

FIG. 18 shows how a circular object may appear when viewed from different angles. It will generally have an oval shape. Consider a coin in front of the eye. When viewed front on the coin presents a circular shape. As the coin is rotated about an axis the eye sees an ovular shape. When viewed from on edge the coin appears as a line segment would. In this way, a circle generates an oval when viewed from off-center. An oval has a major and minor axis. The center will be the intersection of the major and minor axis. The major axis will always be equal to the diameter of the corresponding circular shape that generated the oval. As an example, consider a coin too large to pass through the top of a soda bottle that will not pass through no matter the angle the coin is paced in relation to the bottle opening.

At the time of this invention shape sensing technology is an established field. Someone skilled in the art is capable of finding circles, ellipses and other geometric shapes in a scene. In addition, determining the major, minor axis and orientation of an ellipse within a scene are well within the capabilities of someone skilled in the art of shape detection. "OpenCV" or Open Computer Vision is the current software language employed for this purpose. Additionally, multiple scenes may be captured by computing devices. One set of software instructions for this is called "DirectShow" or "DShow" for short. So sequential scenes may be captured and analyzed in sequence to provide updated positions of the data for the lenses and by extension the viewpoint locations of the eyes of the observer.

There is always a long axis equal to the diameter of the coin that will prevent the coin from entering the bottle. It is this principal which allows us to calculate the distance of the circle from the camera. We can measure the major axis, which is equal to the diameter of the circle. The length of this in proportion to the viewing angle of the camera is then compared with the known length of the diameter and the proportion to the viewing angle at a known distance from the camera. We do a mathematical comparison of the viewed length at an unknown distance with the known length at a known length.

To further clarify, a penny viewed at a given distance will always have a major axis of the same length no matter how it is rotated about any axis that passes through the center. The same holds true for any circular shaped object. This is what makes this shape of value. If the diameter of the circle is known we can use the length of the major axis as viewed from the sensor combined with trigonometry to determine the circle's distance from the sensor. Therefore, in some of our embodiment examples we employ circular shapes to the lenses or to the lens frames.

In this way, we are able to compute the distance of the circular lens or lens frame from the camera regardless of the tilt or rotation of the circle along any axis in relation to the camera. The key is the circular nature of the lens or lens frame which when seen from any angle presents an ovular shape. It should be noted that a circle is an oval. A line segment is also ovular and represents what would be seen if a circle were viewed along its edge. The length of the major axis of the observed oval is the same length as the circle's diameter would be when viewed from the same distance.

The formula relating camera angle to circle diameter is given by:

$$\operatorname{Tan}(a/2) = \text{Diameter of Circle}/(2 * \text{Distance to Object})$$

where "a" is the angle made by the camera with both ends of the Major axis.

If an assumption is made about the location of the eye in relation to the circular lens then the major and minor axis taken together may be used to assess the location of the eye. One or more additional geometric objects may assist in this assessment.

Figure 19:
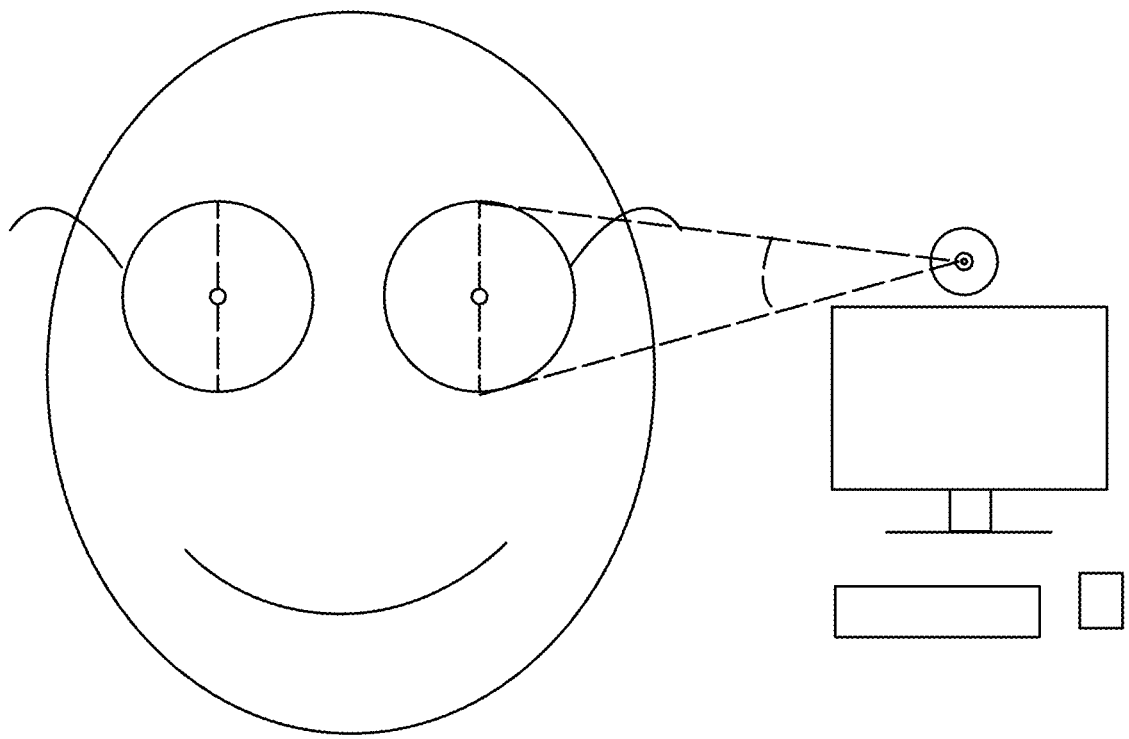
FIG. 19 shows an embodiment of a system that tracks a user wearing glasses with circular lenses.

FIG. 19 shows an embodiment of the system or method in the present invention. A viewer wears glasses of circular lenses. These lenses present ovals to the camera located on or in fixed location with relation to a viewing screen. A computing device takes the information and calculates the location of the viewpoint. Based on the viewpoint an image is created as would be seen from this viewpoint. 3D images may be created for each eye; discriminating lenses then permit the correct image to reach the proper eye. In this way, real world stereoscopic images may be created. These images remain fixed in space within a small margin of error. Calculating the eyes' location behind the lenses and basing the image creation on the approximation of the eyes' location may further reduce this error.

It is also possible to use shape recognition technology to identify the shape of glasses frames without identifying circular features. In one embodiment, the known size and shape of the glasses frames can be compared with the size of the captured image to compute the distance and location of the glasses lenses. However, the method of identifying ellipses uses less computer power and therefore enables more frames per minute to be displayed. In the future, as computing power increases the method of identifying the glasses frames using computer vision may become an advantageous embodiment.

One of the potential issues with shape tracking is unwanted noise. By this is meant tracking of unwanted objects. If these incorrectly sensed objects are mistakenly used as data for computing the viewpoint the image will behave erratically. This will result in viewer displeasure. At least one embodiment of the instant invention may employ filters to remove these unwanted shapes. One means to accomplish this is by a smoothing algorithm similar to a "Kalman filter." Bad data points may be thrown out. In at least one embodiment, the two circles or ovals desired to be tracked are in close proximity to one another and share many traits. The sizes of the tracked shapes are nearly the same. The angles of the major and minor axis are aligned. The ratios of major to minor axes will be the same. Because the rotation of the major axes can be sensed, the ratio of the distance between centers of the lenses to the lengths of the major and minor axis may be computed using trigonometry. These facts and others may be used in at least one embodiment to filter out bad data. Other means to filter out bad data include, but are not limited to distance filters, use of high contrast materials and filtering out low contrast objects. Additionally, plenoptic or "light field" technology may be employed to sense the distance and compare it with expected distance of the lenses from the camera. The plenoptic camera uses software to take several photos of a scene with differing focal distances. It then uses a computing device to examine when objects are in focus. It uses this data to calculate distance to the object. Employing some or all of these methods will ensure mostly good data points for the viewpoint are used. Therefore, the result the images created based on the data will be smooth. This will increase viewing pleasure.

The camera may record visible light as well as UV or IR light. An IR or UV light source may be reflected off of the lens or lens frame of the eyewear. This can be accomplished by using IR or UV reflective materials in the construction of the glasses but reflective tape, paint or other reflective or retro reflective material may be used. In addition, the glasses may contain their own source of circular light around the rim. This light may be visible, IR, UV or other frequency.

Another embodiment employs a plenoptic or "light field" camera. These types of camera take multiple pictures of the same scene with different focal lengths. By examining when objects are in focus the plenoptic camera is able to determine depth. This depth as sensed by the plenoptic camera may be useful for computing the Z distance from the viewing screen. It should be noted that all sensors or cameras described in the embodiments of this document are assumed to be in a fixed location in relation to the viewing screen.

Figure 20:
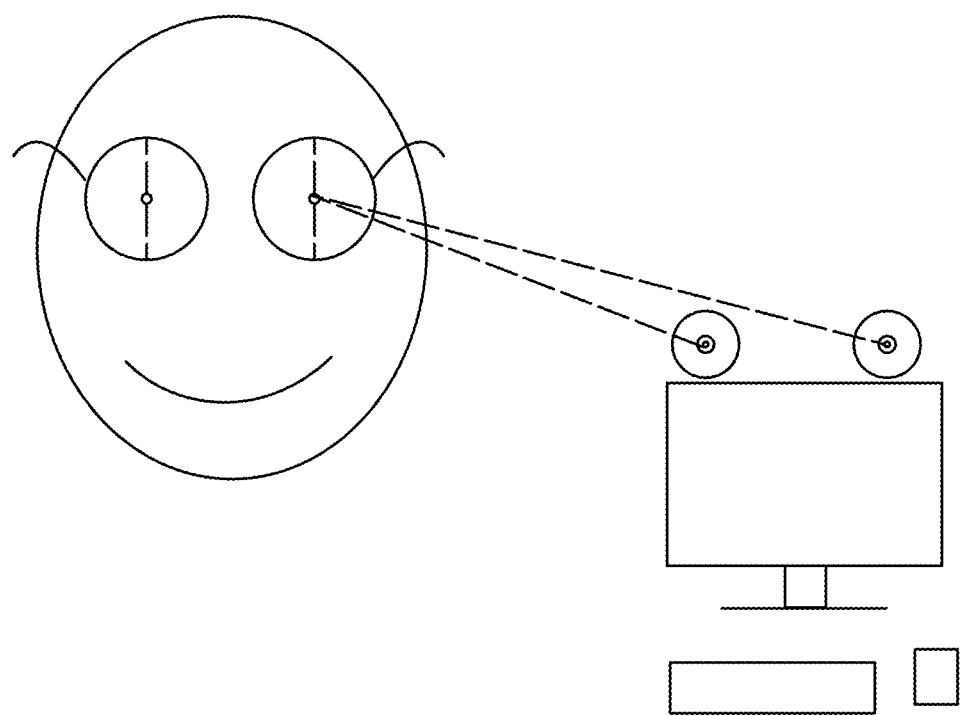
FIG. 20 illustrates an embodiment that tracks glasses using two inexpensive cameras separated by a known distance.

FIG. 20 shows an embodiment that uses two inexpensive cameras a known distance apart from each other. By triangulation, the location and distance of the eyewear may be determined. The circular shaped lenses make the eyeglasses easy to be tracked and eliminates the need for markers blobs or other devices. Markers, blobs or other devices could be employed as differentiators however. In other words, they could be used to differentiate one lens from another in one pair of eyewear. They could also be used to differentiate between sets of eyewear in a multi-user environment. In addition, the circular shape allows the major and minor axis of the lenses to be calculated. This results in an improved ability to locate the eyeball viewpoint behind the lens.

Figure 21:
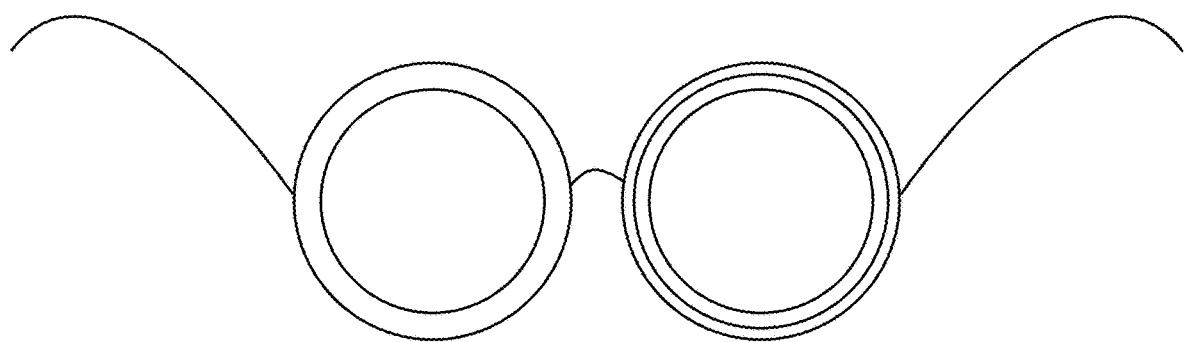
FIG. 21 shows an embodiment of trackable glasses with different features on left and right lenses.

FIG. 21 shows one embodiment of a lens differentiator. One lens is made of concentric circles that will be observed by the image tracker. In this way, a left and right lens may be determined for any orientation or rotation even upside down. In this way, a viewer can get the correct stereoscopic association from any viewing tilt angle. This method may also be used to discriminate between two or more pairs of glasses thus enabling multi-viewer systems.

Other geometric shapes or blobs may be placed at strategic locations of the eyewear to facilitate the differentiation of first and second viewpoints. In additional geometric objects placed on the surface of the eyewear may be useful for systems with more than one viewer. These additional objects may be used to discriminate between several users so each viewer sees the correct stereoscopic image.

Figure 22:
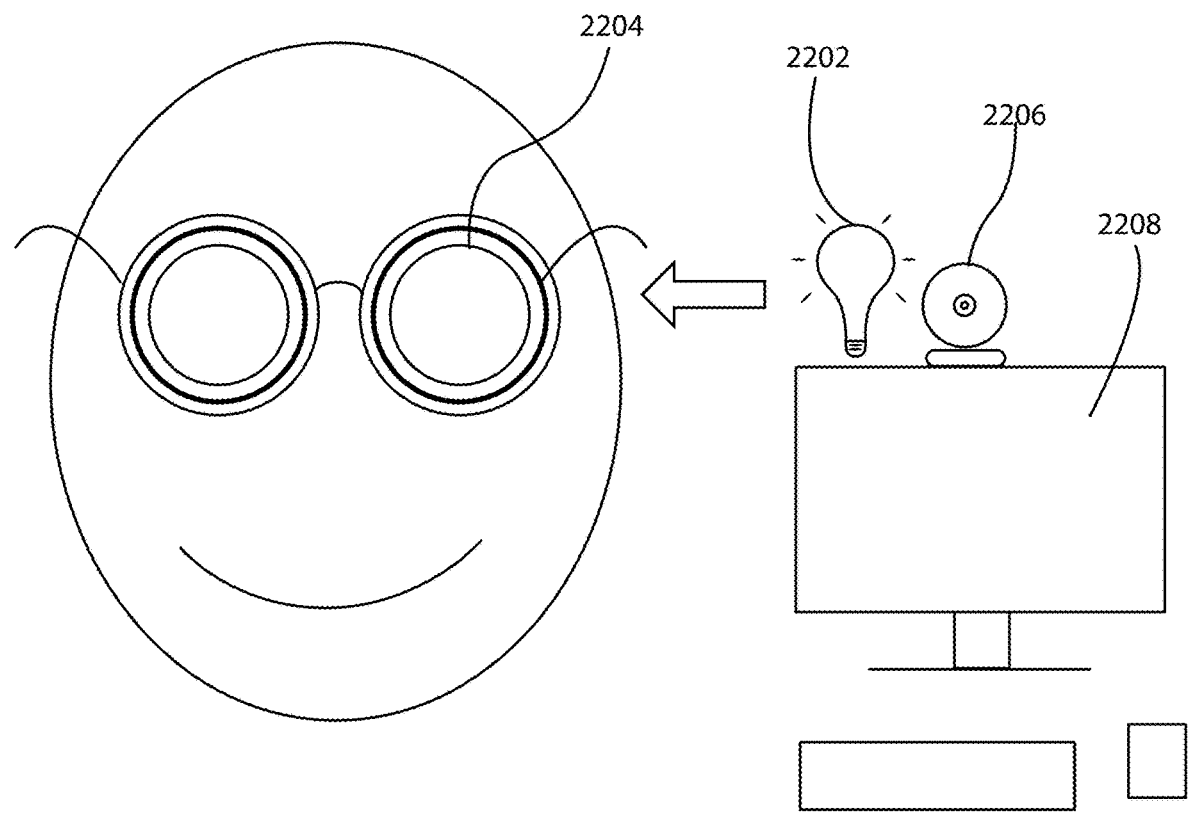
FIG. 22 shows an embodiment of a tracking system that uses a light to illuminate the lenses.

FIG. 22 shows an embodiment of the instant invention that employs a light (item 2202). The light is configured to shine on the lenses of the glasses. In low light or low contrast, it may be difficult for the sensor (item 2206) and tracking system to locate the outline of the circular lenses. In these situations, a light may be employed to enhance the contrast of the lenses of the glasses. In this manner, the light may be employed to enhance the glasses tracking capabilities of the system. The glasses (item 2204) may be further enhanced by fluorescent or day glow coloring along the circular rims. The rims may be painted or molded from colored material. Additionally, a darker circle may be placed around the rim inside of the fluorescent colored material. The color white or any other light color may work in place of or with fluorescent coloring. Additionally, there are materials which when charged by light energy will re-emit the light over a period of time. These materials are referred to as "glow-in-the-dark." Sometimes phosphorescent materials are used to create these "glow-in-the-dark" materials and the technology is well understood. These materials may be used with or without the enhancement of a lighting device.

In another embodiment, the light (item 2202) may be of UV or ultraviolet hue. This enables it to illuminate materials of fluorescent, phosphorescent nature more brilliantly than surrounding materials not made of fluorescent, or phosphorescent nature. Creating or painting the circular rims of the eyewear with fluorescent or "glow-in-the-dark" materials makes them pop-out of the field of view of the sensor enabling them to be tracked more efficiently. This is especially important in low ambient light conditions. Additionally, reflective or retro reflective materials may be used and in one or more embodiments, the light may be placed near the sensing device. In one or more embodiments, infrared (IR) light and IR reflective materials may be employed instead of, or in addition to, UV light and UV materials.

Furthermore, the light (item 2202) may be controlled automatically or manually. A user may manually control the light by means of a physical switch or the light may be connected to the computing device (item 2208). The means of connection may be wired or wireless and may include but not be limited to USB, Firewire, or Bluetooth. In this case, the user may control the light via a signal sent through the computer by means of a keyboard or mouse input to turn the light on or off as needed. The computing device may also be able to detect the ambient lighting conditions from the sensor. When the ambient light is sensed to have fallen below a certain threshold the light turns on illuminating the eyewear. A photoreceptive cell that allows electrical current to flow when it senses light may also be used as a switch to turn the light on and off based on lighting conditions.

A computing device (item 2208) analyses the data obtained from the sensor to calculate a position of the eyewear. This data analysis is discussed in greater detail in another section.

Figure 23:
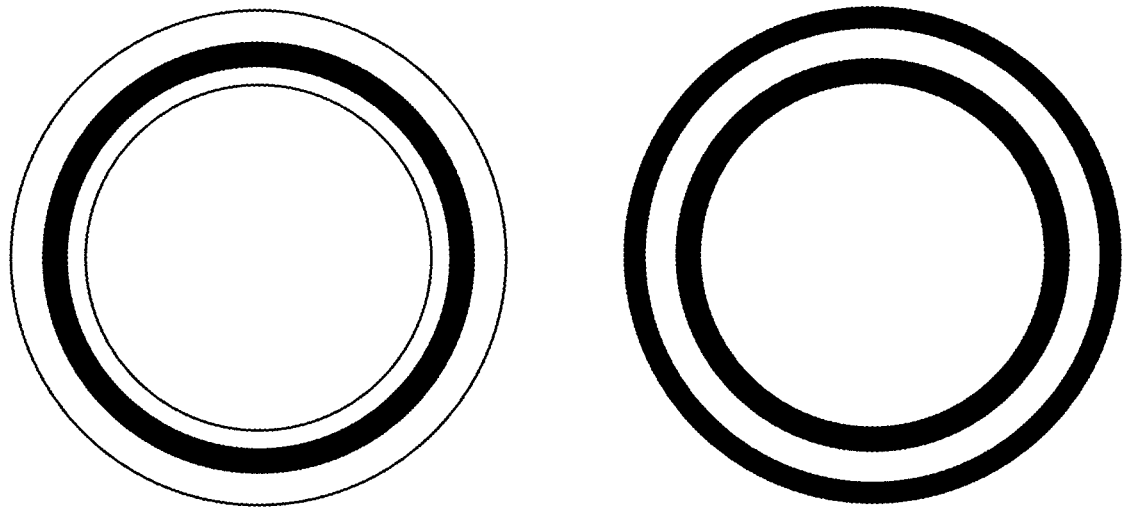
FIG. 23 shows an embodiment that employs circular rings of different contrast around the lenses.

One of the problems faced by geometrical shape tracking systems is finding the shape among many patterns. Enhancing the contrast of the geometric shape is a means to improve the computing system's recognition of shapes within a frame or scene. FIG. 23 shows embodiments of the circular rim of the lens areas of the instant invention. Circular rings of different contrast may be employed around the lenses of the eyewear. A dark colored ring which divides a wider light colored ring into two areas and a light-colored ring which divides a wider dark colored ring into two areas are shown. This makes it easier to track the lenses and when the lenses are of another geometric shape such as a square, these contrasting patterns may be modified for non-circular lens tracking. The contrasting patterns may be adapted in this fashion to follow along the rims of glasses of any shape.

Figure 24:
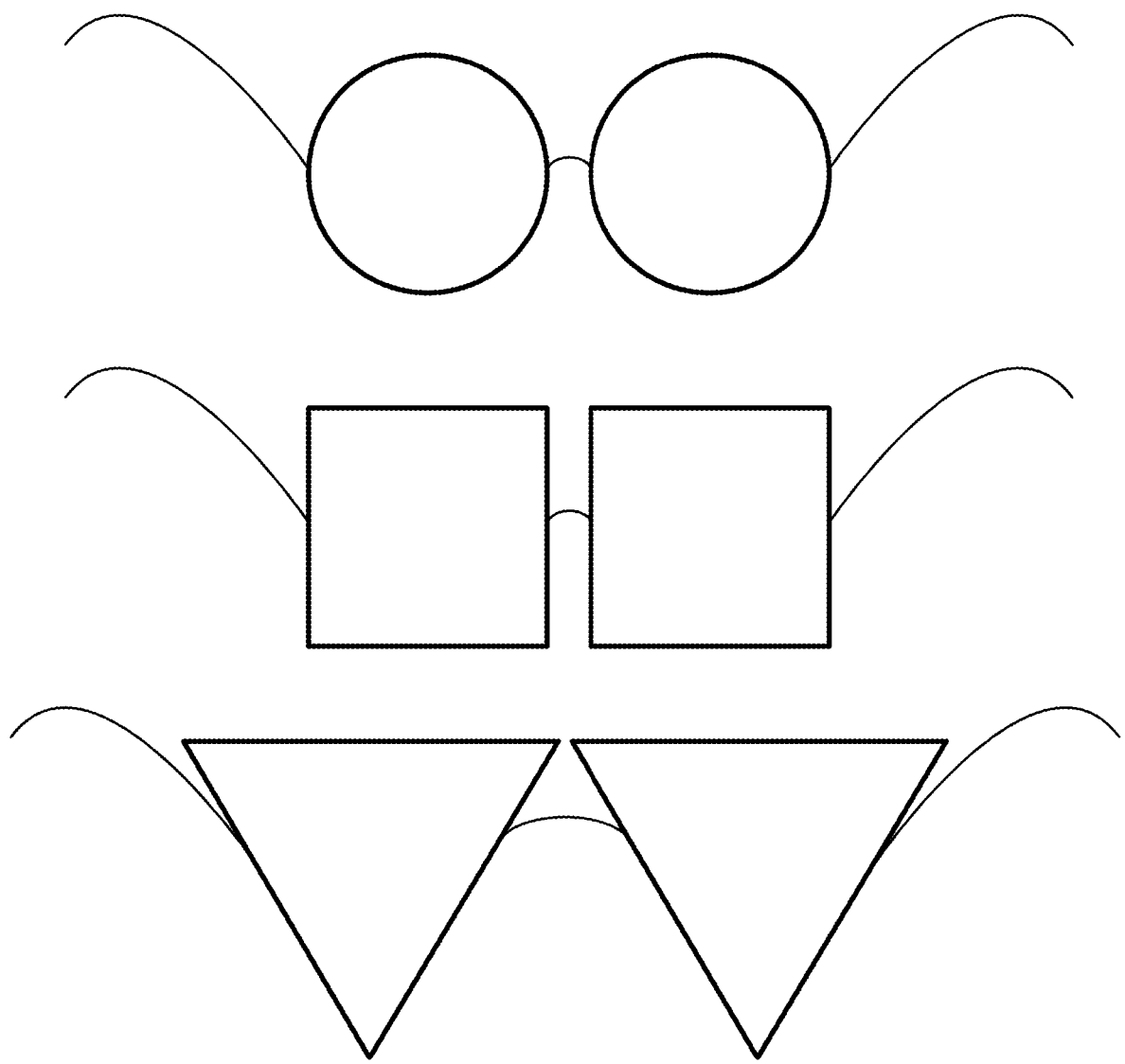
FIG. 24 shows illustrative embodiments of trackable lenses of other geometric shapes.

FIG. 24 shows embodiments of eyewear of other geometric shapes that may be sensed and tracked. The circular lens shape is an embodiment that provides the simplicity of converting the sensed data into real world X-Y-Z coordinates. A circle is after all a special case of an oval. A circle when rotated will always produce an oval and the distance can be computed by comparing the sensed length of the major axis with the sensed length of the major axis at a known distance. Because this is not so for other shapes they require additional steps and more complicated algorithms to convert the sensed position data to real world X-Y-Z data. Other shapes however have the advantage of having sharp edges that can be detected easily. So, there may be circumstances where other geometric shapes may be useful and this will be dependent on the system employed to sense the lenses and the computing device as well as the how the user will use the device. If the observer does not tilt the head in relation to the screen then the square would produce good results without much modification to the algorithms.

In one or more embodiments, lenses or other headwear may have patterns of dots embedded in them to facilitate reconstruction of geometric shapes, such as circles for example. A potential advantage of using dots and then reconstructing a geometric shape from the outline through the dots is that it may be more robust in the presence of blurred images due to motion of the image during image capture.

Figure 48:
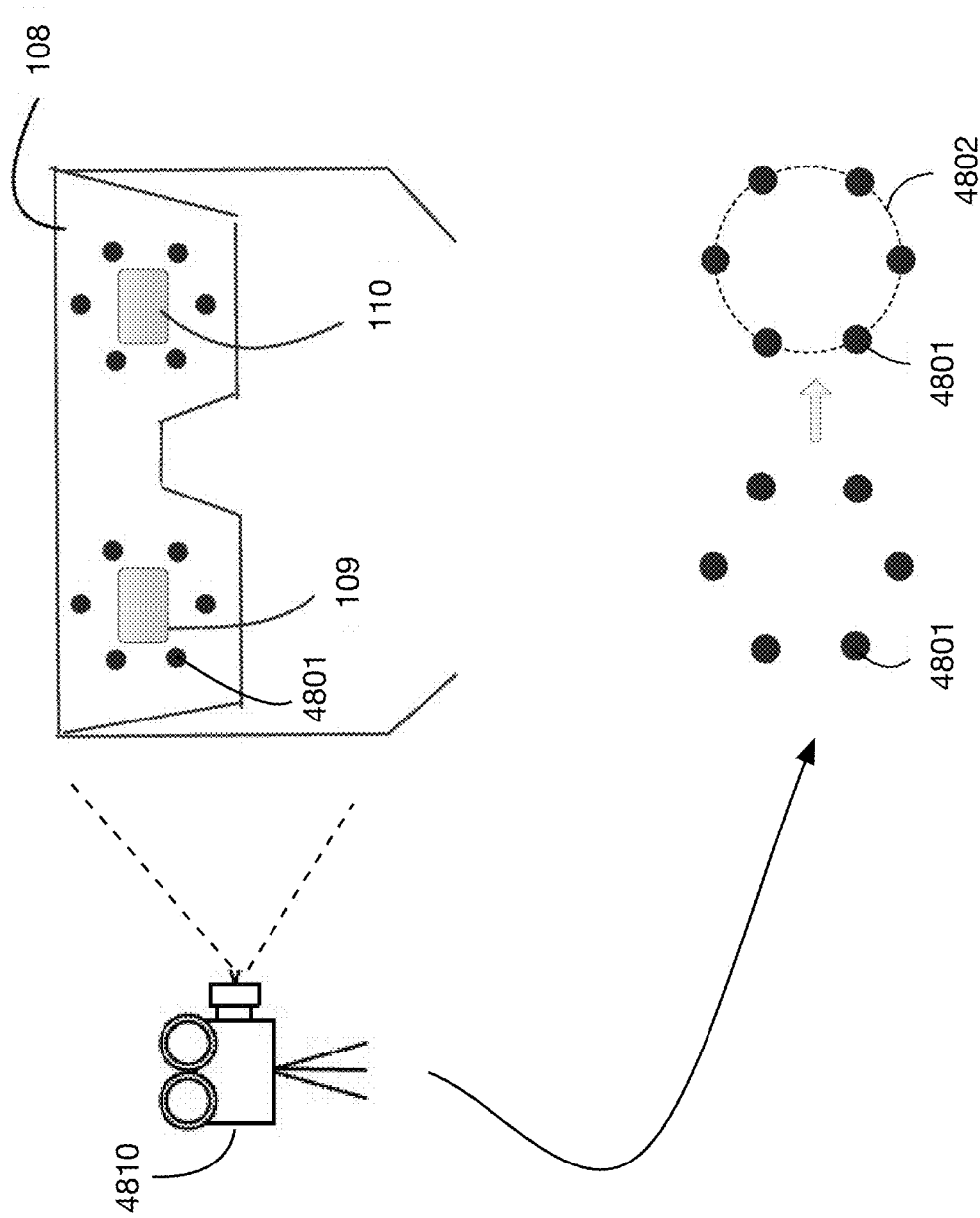
FIG. 48 shows an embodiment of the system that determines the outline of a geometric shape by detecting and analyzing a pattern of dots in the lenses of viewing glasses, in order to determine the 3D location and orientation of the lenses.

FIG. 48 shows an illustrative embodiment that tracks dots and reconstructs a shape (in this case a circle) from the dots. In this illustration the outline of a geometric shaped object (circle 4802) is created using dots (such as dot 4801). There may be three or more dots used to create the outline. In this illustrative embodiment the dots are round, however they may be of any shape. The camera 4810 may capture an image of the dots and a computing device may analyze the dots captured in an image to create a geometric object that contains the dots. In this example the computing device would create a circle from the pattern of dots. The circle is then analyzed to determine location as is described elsewhere in this document.

The pattern of dots (including illustrative dot 4801) may be placed around the lenses 109 and 110 of a pair of glasses 108. In this way the 3D location of the lenses and hence the eyes may be determined.

In this way the problems associated with blurring of images can be overcome. As the user moves his or her head, geometric objects associated with the lenses may become blurred. This makes their location difficult to be accurately determined by a computing device. However, dots, while blurred, may be more easily located in an image. Hence, dots in the shape of a geometric object may be used in lieu of the actual geometric image. A computing device may find the blurred dots in an image. It may then evaluate the locations of the blurred dots and simulate the geometric object. In this way the problems associated with deciphering a blurred image may be overcome.

The dots may be differentiated from the background for example by shading, or by color.

Another method that may be used in one or more embodiments to overcome issues associated with image blurring is the use of a strobe light. The light from the strobe light is reflected off the object image and back to the camera. The strobe light may be placed near the camera and directed towards the image to be captured by the camera. Selectively reflective materials may be used to define the image object. These may include IR or UV reflecting paint or materials. The strobe light may employ infrared or ultraviolet light. The strobe light may be synchronized with the camera to produce short time slice images thereby reducing blurring. A filter may be placed over the camera lens to selectively view the correct frequency of light reflected from the image.

Alternatively, in one or more embodiments the image itself may be made of light emitting materials such as electroluminescent paint. This paint may be made to illuminate on and off very fast using electricity. This paint may emit light in the IR or UV range. Filters may be employed to selectively view the correct frequency of light. This also may reduce the time slice of the image thereby reducing blurring. The method of using strobe lighting or electroluminescent paint may enable the use of the original geometric object.

Figure 25:
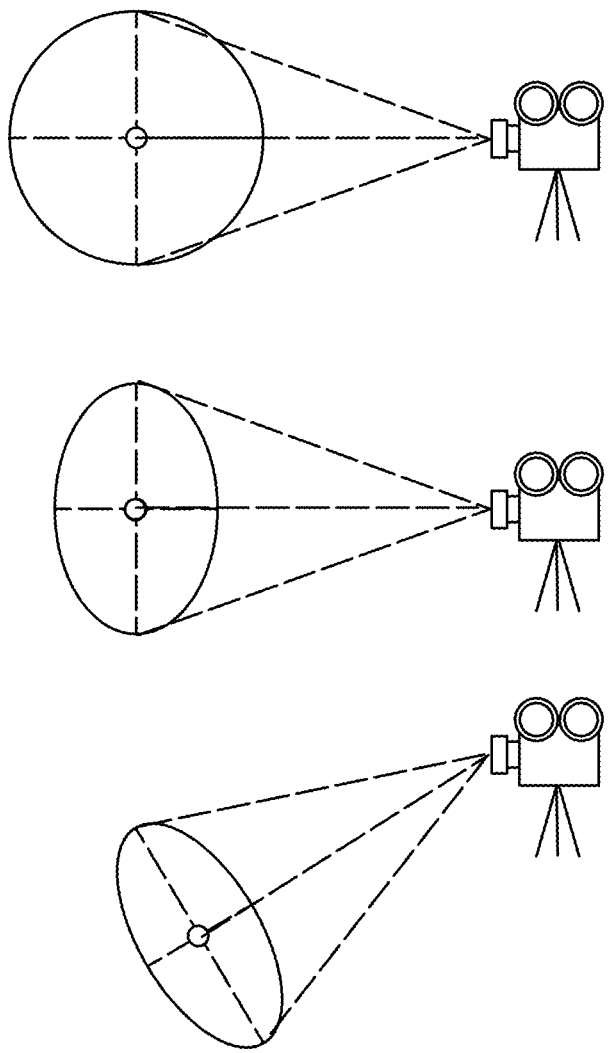
FIG. 25 illustrates tracking a circular lens through various angles as seen by a camera.

FIG. 25 shows circles that have been turned through various angles as seen by a camera. In each case the distance from the camera remains the same. The major axis remains the same length, as does the angle formed between the top of the major axis to the camera and back to the bottom of the major axis. By angle here is meant the absolute value of the angle from the camera in any X-Y-Z direction where the Z-axis is outward from the camera along the line of sight. From this we learn the orientation of the circular shape does not affect the measurement of the major axis.

It is this fact that enables us to compute the length of the vector from the camera to the center of the detected oval. The tangent of one half the camera angle of the major axis is equal to one half of the detected major axis divided by the length of the vector from the camera to the center of the oval. From this we deduce:

Major Axis=Distance from Camera to Center of lens|*(Tangent of camera angle of Major axis)

Because the major axis is a fixed length:

$D2=D1*Tan(angle1)/Tan(angle2)$

Where D2 is the distance we want to find and D1 is a known measured distance from the sensing device. Angle1 is the angle from the camera the circle makes when at D1. Angle2 is the current distance from the camera to the center of the ellipse.

Using these formulas, we are able to compute the distance from the center of the camera to the center of the lenses. If we know in advance the camera's field of view we may compare this with known distances and camera angles and use known measurements for a known camera field of view. This eliminates the need for calibrating each camera. All that is needed is the field of view of the camera. In certain cases, this may be found out from the computing device.

Figure 26:
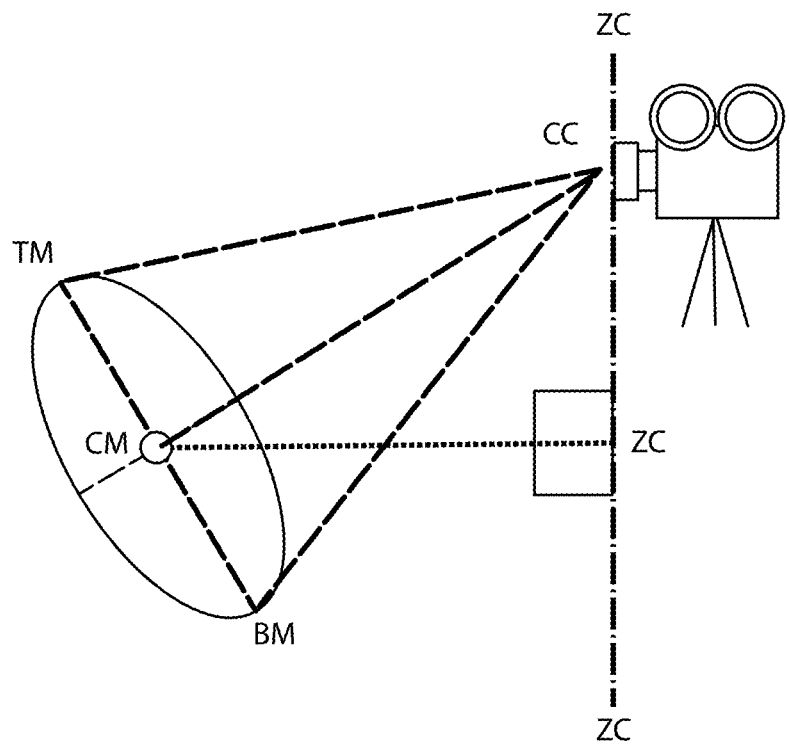
FIG. 26 illustrates how an embodiment of the system calculates the x-y-z location of the lenses.

FIG. 26 shows how an embodiment of the instant invention calculates the X-Y-Z location of the lenses. The Z distance as measured from the screen to the center of the lens is calculated by employing the distance from the camera to the center of the lens that was described in the description of FIG. 25. The angle from the sensor to the center of the lens described by the vector CC>CM is a known quantity. If the sensor's fixed location is perpendicular to the viewing display and at the same Z location, then we have:

Distance from view screen to center of lens=(Distance from camera to center of lens)*Cosine (The angle the vector from camera to center of lens makes with Z-Axis).

Put another way: Z coordinate of eyewear lens=|CC>CM|*Cosine (Angle made by Z-axis and CC>CM)

The last two equations are from the point of view of the camera and minor adjustments must be made if the camera eye is not in the same plane as the viewing screen, or if the camera does not point directly perpendicular to the viewing screen.

Furthermore, we now can calculate the X and Y coordinates by a similar process:

X coordinate of eyewear lens=|CC>CM|*Cosine (Angle made by Z-axis and CC>CM in the X direction)

Y coordinate of eyewear lens=|CC>CM|*Cosine (Angle made by Z-axis and CC>CM in the Y direction)

Now we must take these X and Y coordinates and translate them due to the fact the sensor is not located in the center of the screen, but this is an elementary task.

So, we have now described how to take the sensed images of ellipses and turn these into data for the X-Y-Z location. This is applied to the circles of the lenses of the embodied eyewear to obtain viewpoint information. This is then used to create perspective first and second images for one or more observers to create a pleasant viewing experience. 3D stereoscopic images created from these viewpoints may be seen in stationary locations as described in U.S. Ser. No. 14/106,766 and U.S. Ser. No. 14/547,555 as well as U.S. Pat. No. 8,717,423. By utilizing proper discriminating techniques one or more viewers may achieve 3D stereoscopic object interaction that is described in greater detail in the aforementioned and other patent applications.

Figure 27:
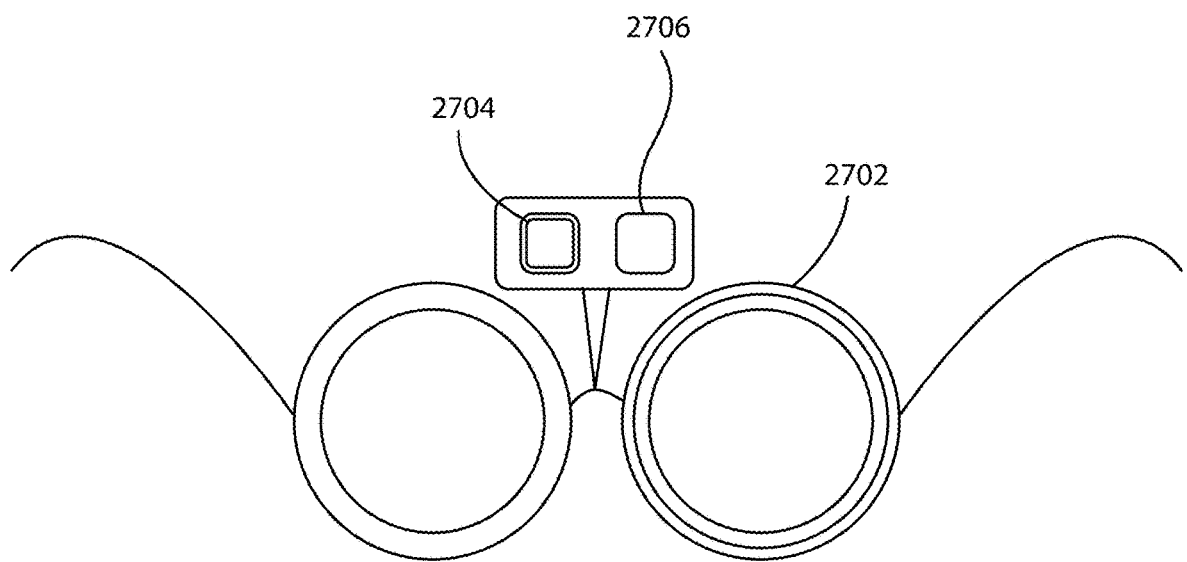
FIG. 27 illustrates another method for determining the z-distance between trackable glasses and a display screen that uses distance measuring equipment attached to the glasses.

FIG. 27 shows an embodiment of a secondary method for determining the Z distance from the screen. Attached to our eyewear (item 2702) is now distance measuring equipment (items 2704 and 2706) or DME for short. There are numerous DME models available today. Some use sound waves and others use IR or other light. Lightweight and inexpensive models are readily available. One ultrasound detector currently available has a range from 10 to 450 centimeters with an accuracy of 0.3 of a centimeter. Sharp also makes an IR DME. The specifications and a description of operation can be found on their web page. For both types of DME a pulsed signal is sent from the DME that reflects off a surface and is measured on its return to the DME. One problem is determining which surface the DME is reflecting off of. If the DME is located at the viewing display to measure the distance to the eyewear there will be many objects for the signal to bounce off of and getting an accurate distance to the eyewear becomes difficult resulting in inaccurate readings which ultimately impact the images and hence the viewing pleasure in a negative way. In this embodiment, the DME is affixed to the glasses. This gives it the broad target of the viewing screen to reflect the signal from. In this way accuracy of the distance from the eyewear to the viewing screen increases. This gives rise to more accurate Z location information and better quality images, hence viewing pleasure is increased. To further increase viewing pleasure, we may examine the angles of major, minor axis and make small corrections to each lens Z distance.

In another embodiment, the DME may send information to the computing device via wireless means such as Bluetooth, however a wired method will also work. A small battery may be employed to power the wireless embodiment. A miniature transmitter along with a small computing device are additional devices which comprise this embodiment.

Figure 28:
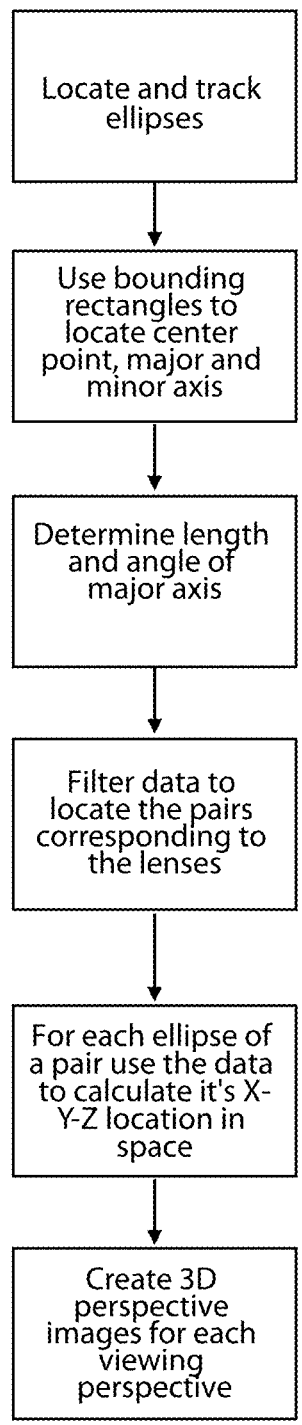
FIG. 28 shows an illustrative flowchart for tracking glasses.

FIG. 28 shows an embodiment of a flow chart for both one and two camera systems. In the one camera system, the circular shape is located and tracked. Then the center point, major axis and minor axis may be determined as desired. Next the length of the major axis is determined. From the length of the major axis the distance from the camera is determined. Using this information and the cameras view of the center of the circle or oval the X-Y-Z location in space can be computed. If desired an approximate location of the eyeball may be determined form the center point, major and minor axis data. This process is repeated for each lens of each user in order to compute the viewing perspective of each lens or eye for one or more observers.

The center of the lens or the actual eyeballs is then used to create real world stereoscopic images. These real world stereoscopic images remain in an approximately fixed location in space as the viewpoint varies. As their location is stabilized in space they may now be mapped and compared with the location of real world physical objects to produce interaction. This interaction may include, but not be limited to touching, moving, rotating, drawing etc.

In one embodiment of the instant invention a circular shape is used. From the X and Y data of the captured image an edge detector finds the circular (elliptical) shape and determines the major axis and center of the circles. Because the circles are of known diameter and when tilted the major axis represents that diameter a comparison may be made which enables the Z distance of the circles center from the camera to be determined. The vector from the center of the circle to the camera is also used in the computation as an off-center circle will be further than a centered circle in the same plane parallel to the camera and perpendicular to the cameras line of sight. So in this way all three, the X, the Y and also the Z distance may be computed from a captured 2D image.

An image captured by the camera may be processed with an edge detector such as a "Canny edge detector." For this reason, it may desirable in one or more embodiments to have contrast between the circles on the glasses frame and the background part of the frame. Now as an angle of the glasses in respect to the camera will cause the circles to look like ellipses, an ellipse detector is used. Several are known to be in use at the time of this writing from "Hough transform", "Akinlar and Topal to name a few. These are described very well on the web. In any captured image there will be several objects detected as ovals in addition to the desired glasses lenses. Therefore, it is necessary to employ a software filter using properties of the ovals that are representative of the glasses lenses. One such filter involves recognizing the two lenses ovals will be similar in tilt and size. In addition, the distance between the ovals may be compared with the size of the ovals for particular orientations. In this way, the data for the correct ovals representing the lenses of the glasses may be filtered out. From the filtered data X and Y image information the actual X-Y-Z location of the lenses may be computed. In one or more embodiments, circular images around the lenses are used, however other images X and Y captured image data may be used to compute real world X-Y-Z information with varying degrees of success. These images may be other geometric shapes but they may also be a series of dots or blobs in a geometric pattern. For example, blobs of contrasting color may represent the four corners of a square.

Another factor is the speed at which the glasses are moving when the image is captured. Too high a rate of speed may result in a blurred image that is not detected. To counteract this blurring, cameras with faster shutter speeds may be employed. Another technique is to use software to deblur the image. In addition, data smoothing algorithms such as a "Kalman filter" may be employed to mitigate the effects of a random image blurred due to motion.

The instant invention allows all three coordinates; the X, Y and Z may be derived from a single two-dimensional camera image. This eliminates the need for complex two camera triangulation techniques as employed by "Zspace" and also eliminates the need for IR distance measuring equipment such as employed with the Microsoft "Kinect." Therefore, the instant invention may be employed on systems with a single basic camera as is common on most computer systems. This allows many more users to experience the pleasure of real world stereoscopy on their personal computers. Cameras with faster shutter speed or IR light for low lighting environments may be employed and a camera switching function is an option. However, the techniques described in the instant invention are not limited to personal computers and may be used on larger and more complex systems such as those described in U.S. Ser. No. 14/106,766 and U.S. Ser. No. 14/547,555.

Figure 29:
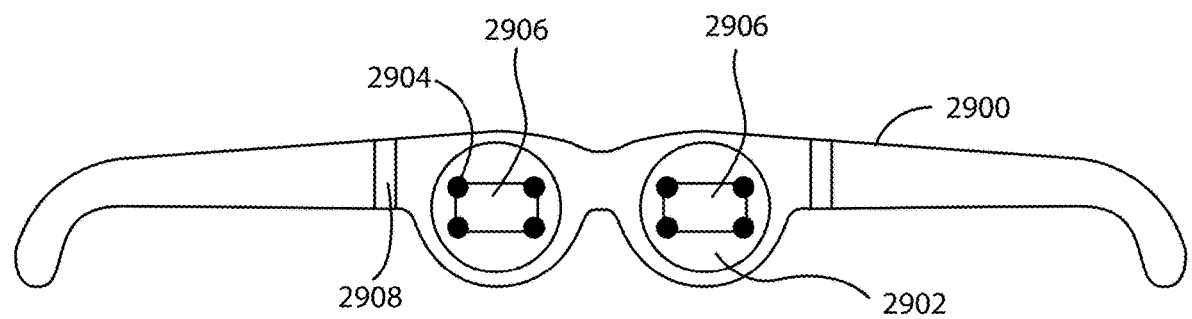
FIG. 29 shows an illustrative template for paper glasses employing a circular shape for tracking.

FIG. 29 shows an embodiment of a template for paper glasses (item 2900) employing a circular shape for tracking. Item 2902 is a white circular shape surrounded by a black frame. This embodiment is advantageous because there is only one circular edge that exists between item 2902 and the frame (item 2900). This eliminates the need to discriminate from other circular objects that might be on other designs of the frame. However, additional small circular or blob shaped objects may be placed at other locations on the frame to enable orientations with greater than 90 degrees of tilt to be recognized and accounted for. Items 2906 are the stereoscopic lenses which are used to discriminate among images reaching the eye. Examples include but are not limited to anaglyph (color discrimination), polarization (linear, circular, elliptical for example), and shutter lenses. Items 2904 are blobs placed on the corners of the stereoscopic lens. Due to the nature of the surfaces of the lenses there will be some reflectivity and hence a variation in colors across the lenses captured image. To reduce the possibility of false ellipses detected along the edges of the lenses these blobs create barriers for the edge detectors. Additional blobs may be placed as desired to reduce incidences of false ellipses being detected. This reduces or eliminates the problem due to the unknown contrast of various reflections from the lenses. In addition, an anti-glare coating may be applied to the lenses to reduce the reflections. In this way tracking is enhanced resulting in better tracking, better data for creating real world 3D images and enhanced viewing pleasure. Item 2908 shows ideal placement for a company logo. The color scheme may be reversed with the darker coloring for item 2902 against a lighter background frame. In addition, other colors may be used provided there is a contrast that may be discerned by an edge detector when viewing the captured image. In another embodiment, the Canny Edge Detector is employed, however other methods of detecting edges from the captured images may be employed as well.

Figure 30:
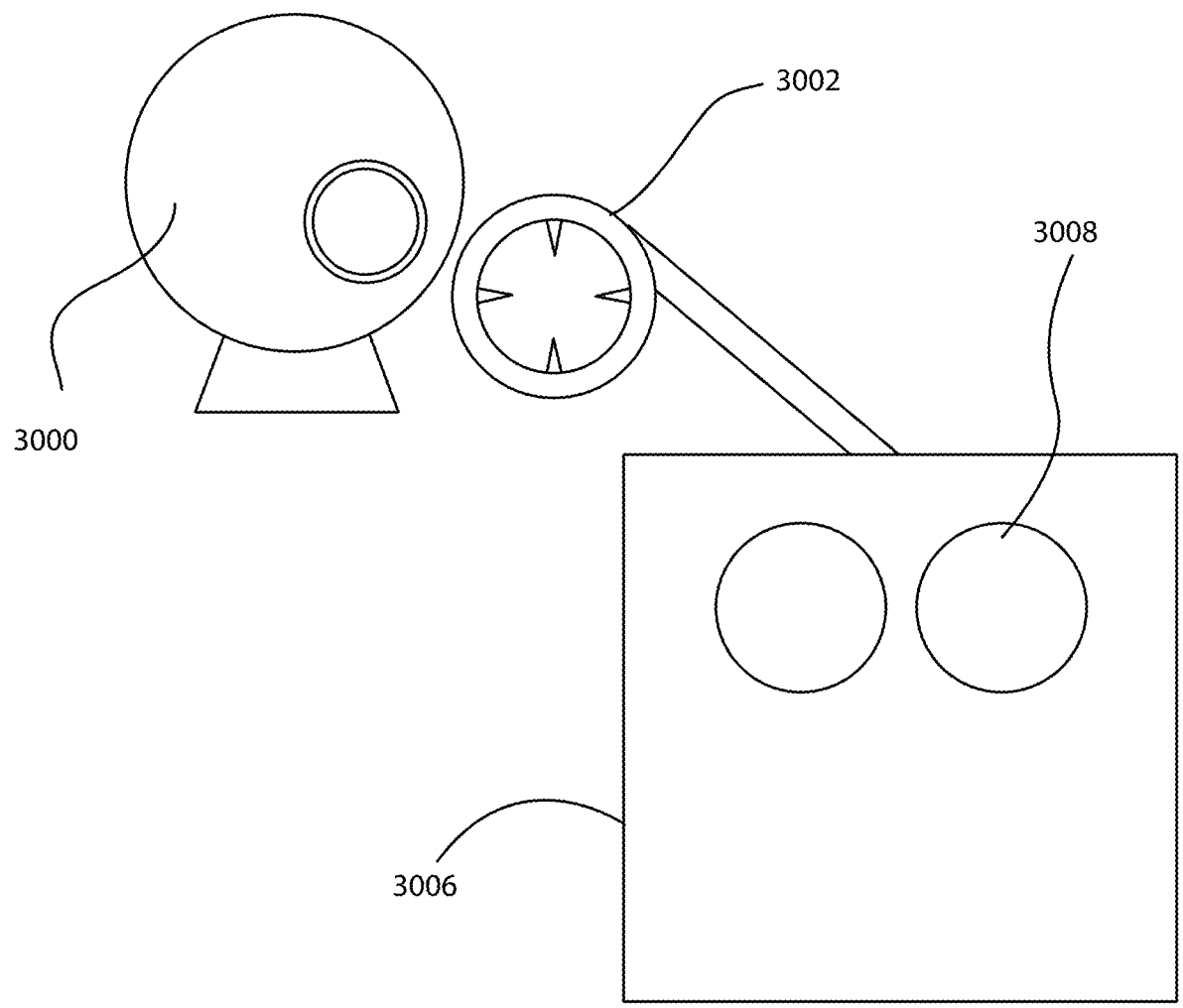
FIG. 30 shows an embodiment of a calibration tool.

FIG. 30 is an illustration of an embodiment of a calibration tool. One of the greatest challenges for a tracking system is calibration. Unless the device employs fixed built in cameras of known location and camera angle then calibrations must be made which take these parameters into account. One method for making these calibrations involves tedious touch locations that require the user to place their fingers in the location of generated 3D objects and press a button when this is accomplished. This often requires multiple steps and often results in inaccurate calibration. Reducing the stress of calibration while increasing accuracy is possible by employing the calibration tool embodied in FIG. 30. The tool consists of an arm (item 3002) and a diagram (item 3006). In another embodiment, two circles of known diameter (items 3008) are placed in a known location on the diagram facing the camera. The mounting arm is placed over the camera lens at a 90-degree angle to the screen. The camera is then made to capture the image presented on the diagram. The mounting arm is a known distance from the camera and the image captured by the camera is analyzed. The filter will identify the two circles on the diagram and then the length of the major axis and the location of the centers can be determined. Based on this information the camera width angle and the camera downward tilt angle can be determined. This information is then used to calibrate the software that determines the location of the glass lenses in X-Y-Z coordinates. Because the distances are fixed and there is no guesswork in the location of the calibration the viewer can quickly and accurately calibrate the glasses tracking for their particular system, thus enhancing the viewing pleasure of the user.

Figure 31:
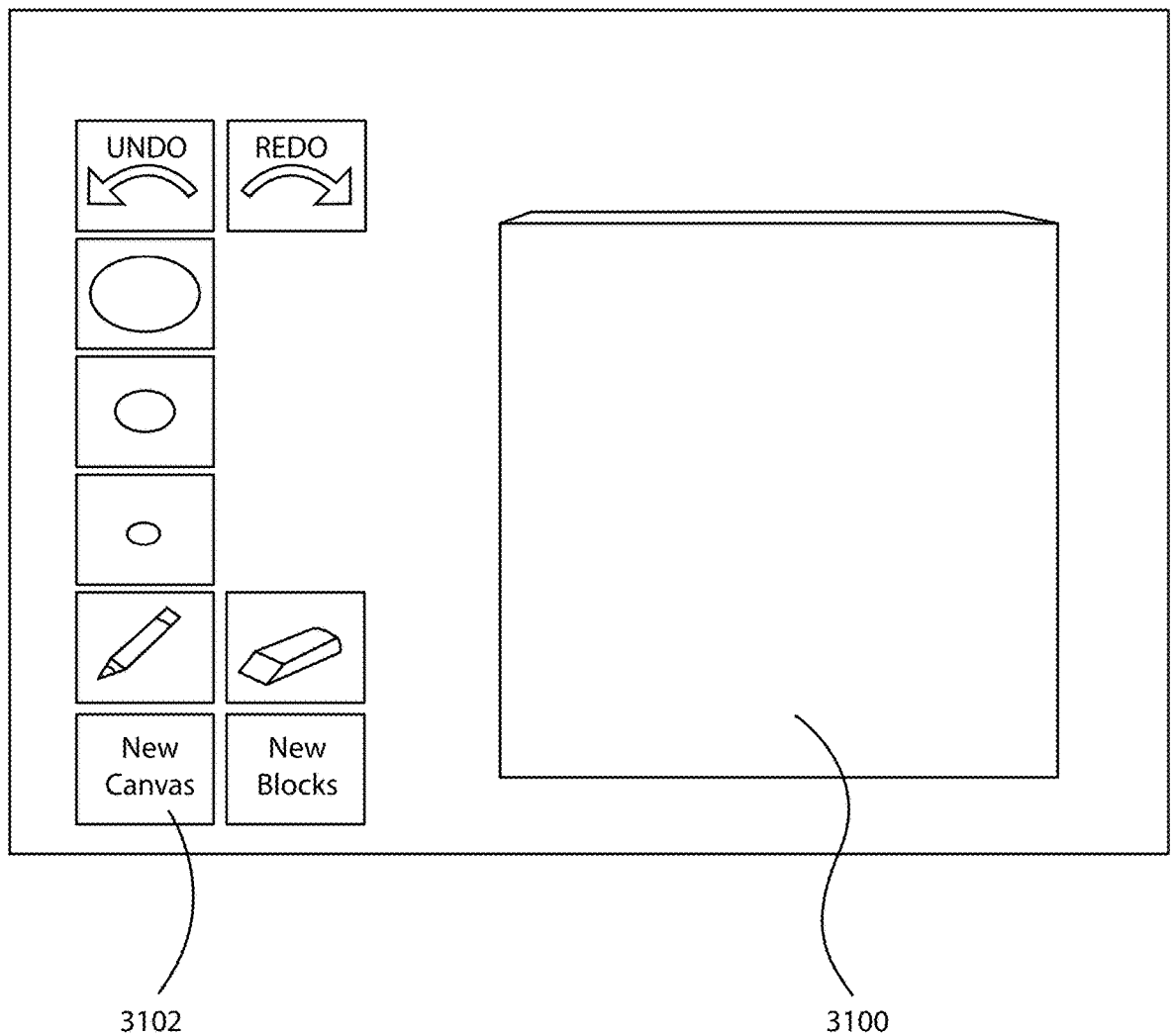
FIG. 31 illustrates a user interface for 3D stereoscopic sculpting using tracking glasses.
Figure 32:
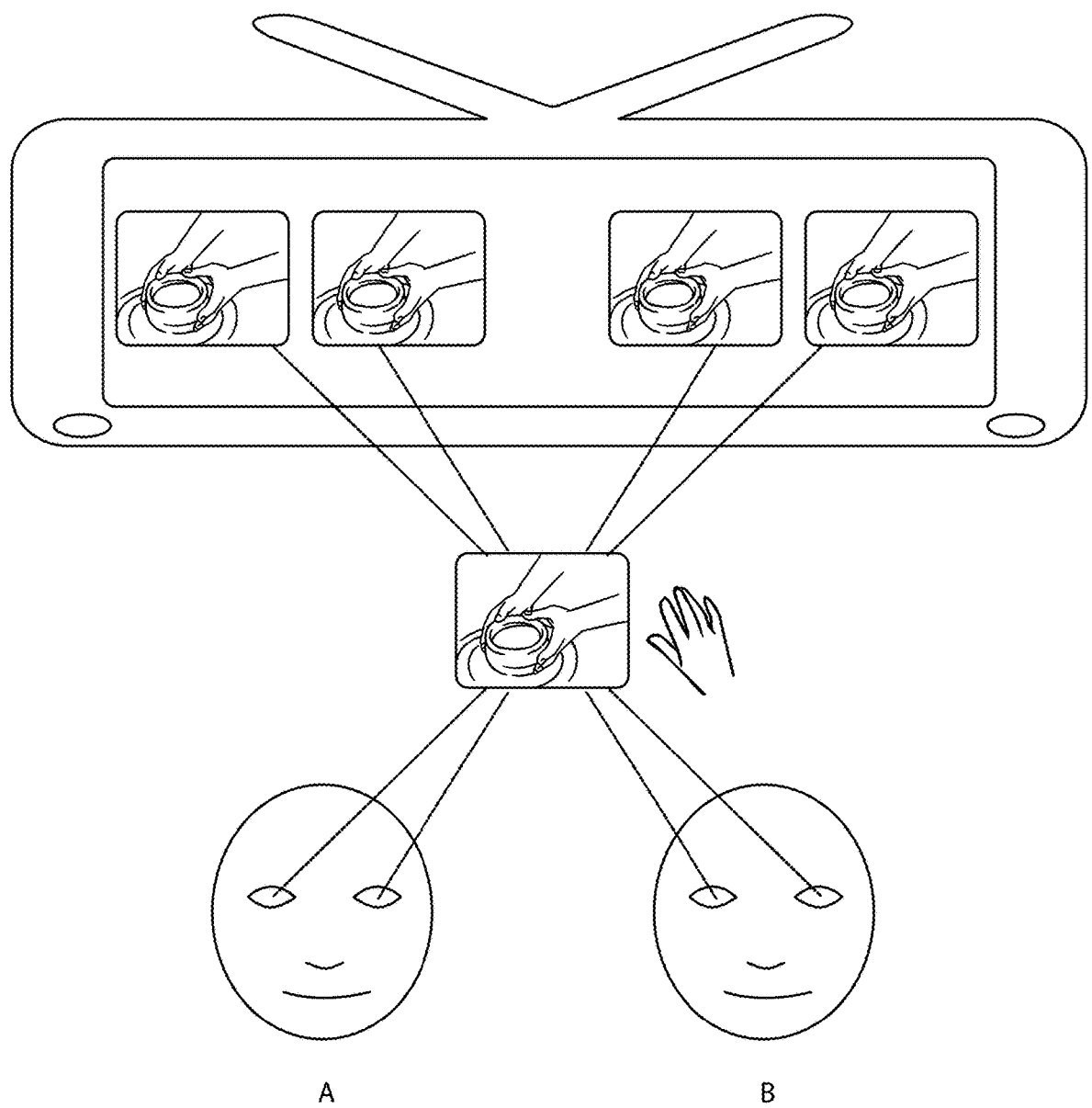
FIG. 32 shows illustrative 3D sculpting using a virtual pottery wheel.

FIG. 31 is an illustration of a method for 3D stereoscopic sculpting that employs the glasses tracking system of the instant invention. Item 3100 is the drawing canvas that may start out with none or one or more 3D drawing pixels. These 3D drawing pixels may be referred to as "sculptels" or "voxels" in this document. As opposed to traditional 2D drawing pixels these sculptels have volume when viewed through stereoscopic glasses. Furthermore, when the glasses tracking methods described in the instant invention are applied the sculptels take on real world locations. These sculptels may be created or erased by moving the hand or an object into their physical location in space. To better see the sculptels in 3D space, a texture may be added to the surfaces of the sculptel. For example, a dot, dots or a checkerboard-patterned texture may be added. Random slight variation of the color of the texture is also an option. The object's location is tracked using a tracking device such as Leapmotions "Leap" device. It is then compared with the real world stereoscopic location of the sculptel. When the object and the sculptel are within a predetermined range interaction takes place. What happens during this interaction may be selected via user control. Item 3102 gives some examples of the types of interactions that may be created. These include but are not limited to: drawing, erasing, coloring, changing transparency, changing the size of the drawing, erasing or other tool. A "color wheel" consisting of a selection of blended colors may be employed. Additionally, the size of the sculptels may be selected to optimize it for the power of the system. The smaller the sculptels the more processing power is need. One way to alleviate the demands on the processor is to only draw the sculptels that will be seen by the user. A way to do this is to see if the sculptel has neighbors drawn. If all six sides are drawn then the sculptel will not be seen by the user and need not be drawn. The desire to do this varies of course when transparency of the sculptels other than opaque is employed. Other features that may be employed include the ability to save, print, and edit created sculptures. Printing may for example print in both 2D and 3D formats and convert between anaglyph and side-by-side (SBS) stereo formats. The side by side is the most common stereo format for 3D television and projectors. Additionally, the sculpture canvas may be rotated about any axis and may also be made to auto-rotate. This allows pottery wheel like sculptures to be made as illustrated in FIG. 32. One or more tracked fingers may be used for drawing or sculpting, either while still or rotating. In addition, drawing may be accomplished using the pointer beam created from the tracked location of the glasses and the glasses pitch, roll, and yaw information. Depth may be changed using roll inputs about the Z-axis or by keyboard; mouse gamepad or other external inputs. Exclusively keyboard, mouse, gamepad, or other external inputs may also accomplish drawing.

Figure 33:
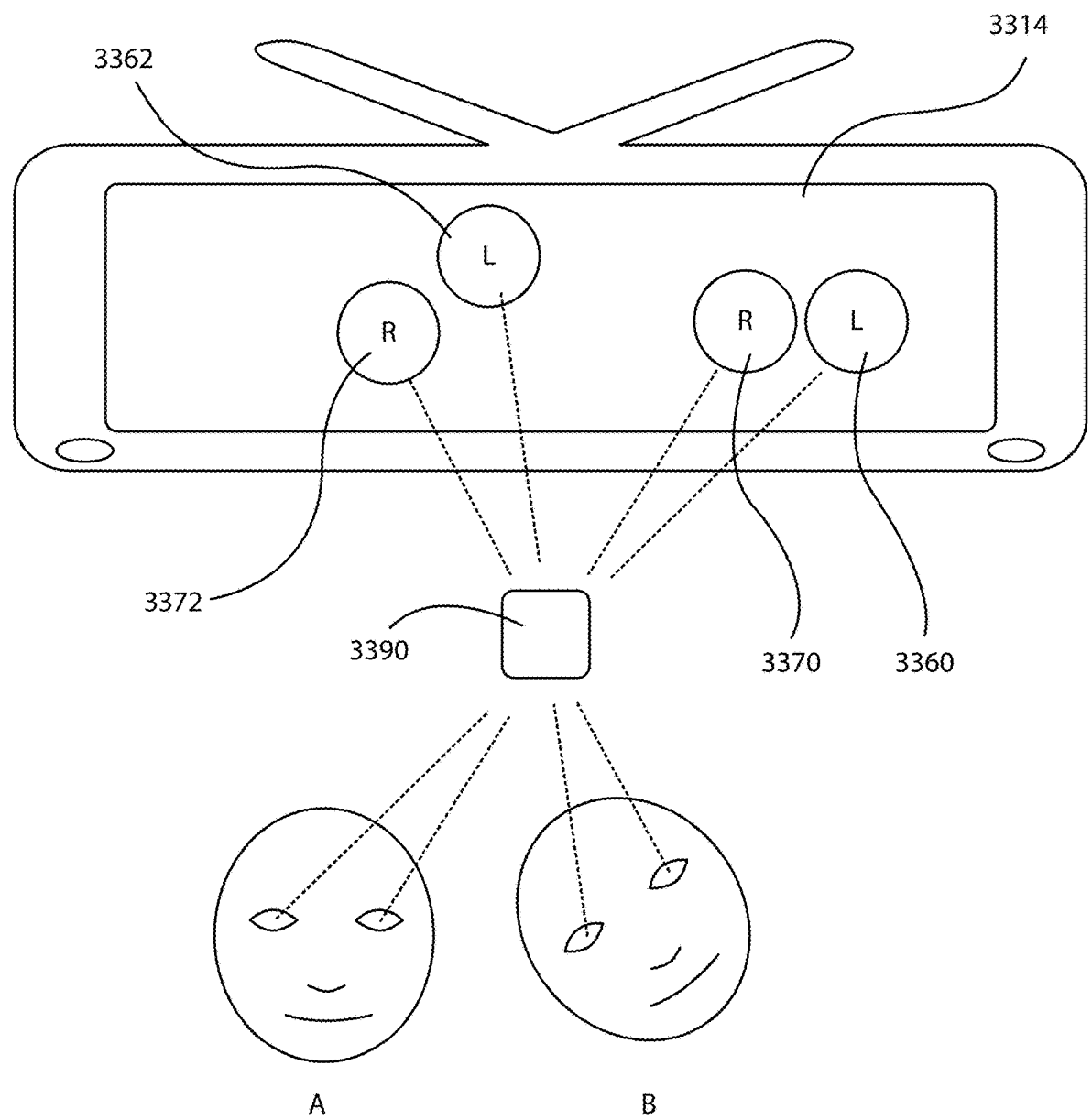
FIG. 33 illustrates display of different 3D images to two different users using multi-view, trackable glasses.

FIG. 33 is an illustration of an embodiment of the instant invention that allows two users to view displayed 3D real world objects from their own individual perspective. Tracking two pairs of glasses and creating images for each of the four lenses that correspond to how the 3D object would be viewed from the perspective viewpoints accomplishes this. The glasses then employ a combination two or more methods of discrimination to ensure the correct image reaches the correct eye of the viewer. For example, each lens would be both circularly polarized and color discriminating. This method is described in great depth in U.S. 62/312,937 "Stereoscopic and Multiple View Glasses," filed Feb. 24, 2016. One of the primary advantages of this embodiment that allows two viewers to see the same 3D real world object according to their unique perspective is as a teaching device. One of the individuals may point to an object and the other will see the same location being pointed to. This is not possible with the prior art in this field where a second observer would see a skewed image bearing little resemblance in form or location to what is seen by the first. This limitation is noted in U.S. Pat. No. 8,717,423 "Modifying Perspective of Stereoscopic Images Based on Changes in User Viewpoint." By removing this limitation, the ability to teach is greatly increased, thereby adding to viewer pleasure. In addition, gaming devices where both players see the object in the same location increases the pleasure of the players.

In one embodiment 3D data from medical imaging devices can be imported into the instant invention and a 3D real world image created using the sculptels of FIG. 31. This image could use different colors or transparencies based upon the densities portrayed in the data from the medical imaging device. Because things such as bones have different density than say blood vessels the sculptels can be grouped according to densities. In this way structures can be represented by sculptels with properties that differentiate them from other structures. From this the sculptels may be grouped according to density that represent the structures of the body. Once grouped they may be removed based on the grouping property enabling structures to be made visible, invisible, transparent or of a certain color. In this way, the structures may be removed by making the sculptels invisible and restored by making the sculptels visible. This allows the viewer to manipulate which structures are seen allowing for greater flexibility. In addition, the structure may be manipulated and made to rotate about any axis enabling a better view of the desired structure to be seen. In addition to use as a teaching aid the instant invention may provide a diagnostic ability as well as a sculpture for a physician to show his patients so they better understand a diagnosis or medical procedure to be employed. Thus, the instant invention can be used to enhance understanding and reduce anxiety of the patient.

This method may be applied to other fields outside of medicine as well.

Figure 34:
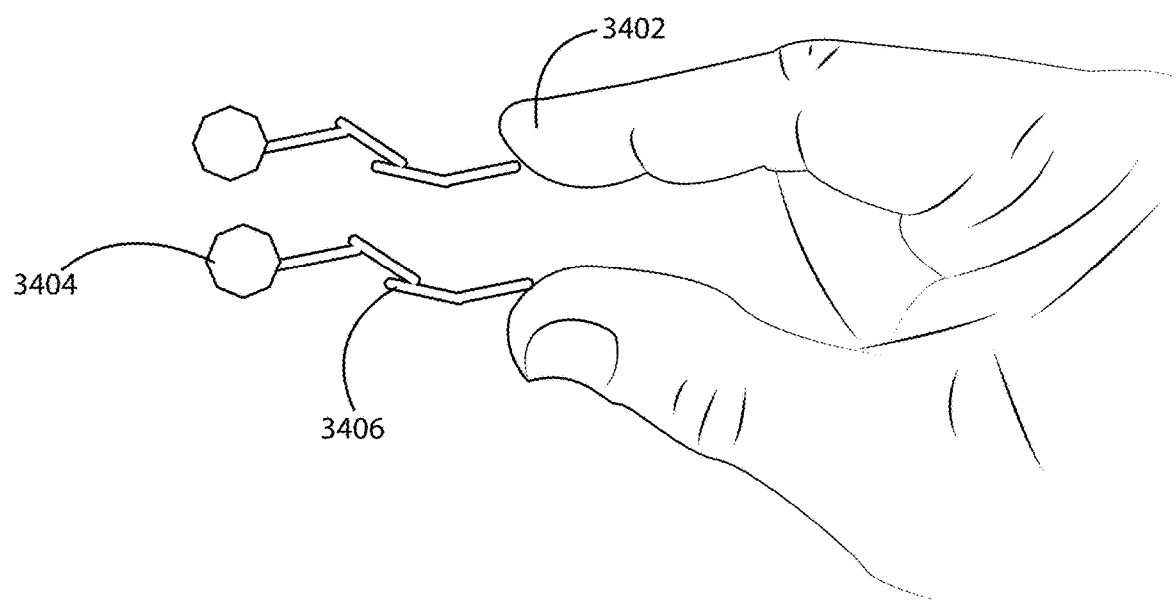
FIG. 34 shows an embodiment where the user interacts with a 3D object at a distance.

FIG. 34 is an illustration of an embodiment of the instant invention where the user interacts with the 3D real world object at a distance. This has several advantages as it eliminates the need to remove objects that are in front of the users fingers or pointing object. To enhance the feeling of connection with the object being interacted with at a distance an imaginary electrostatic image (item 3406) is created between the fingertips (item 3402) and the object (item 3404) being interacted with. In this way the user can instantly tell a connection is made between his hand or fingertips and the object. The object is then interacted with as though the hand or fingertips were in proximity. To enhance the illusion the imaginary static electricity may be made to move or vibrate and also cause a cue sound to be created by the computing device, thus simulating the motion of static electricity. The finger at a distance interaction can be enhanced with finger gestures such as touching two fingers together or moving them apart. This can correlate to grabbing and releasing an object. Other finger or hand gestures may include but not be limited to twisting, turning, stretching, enlarging or shrinking objects. They may also be used to bring up a context menu. The finger at a distance interaction may be enhanced by keyboard, mouse or other inputs in conjunction with pointing.

Figure 35:
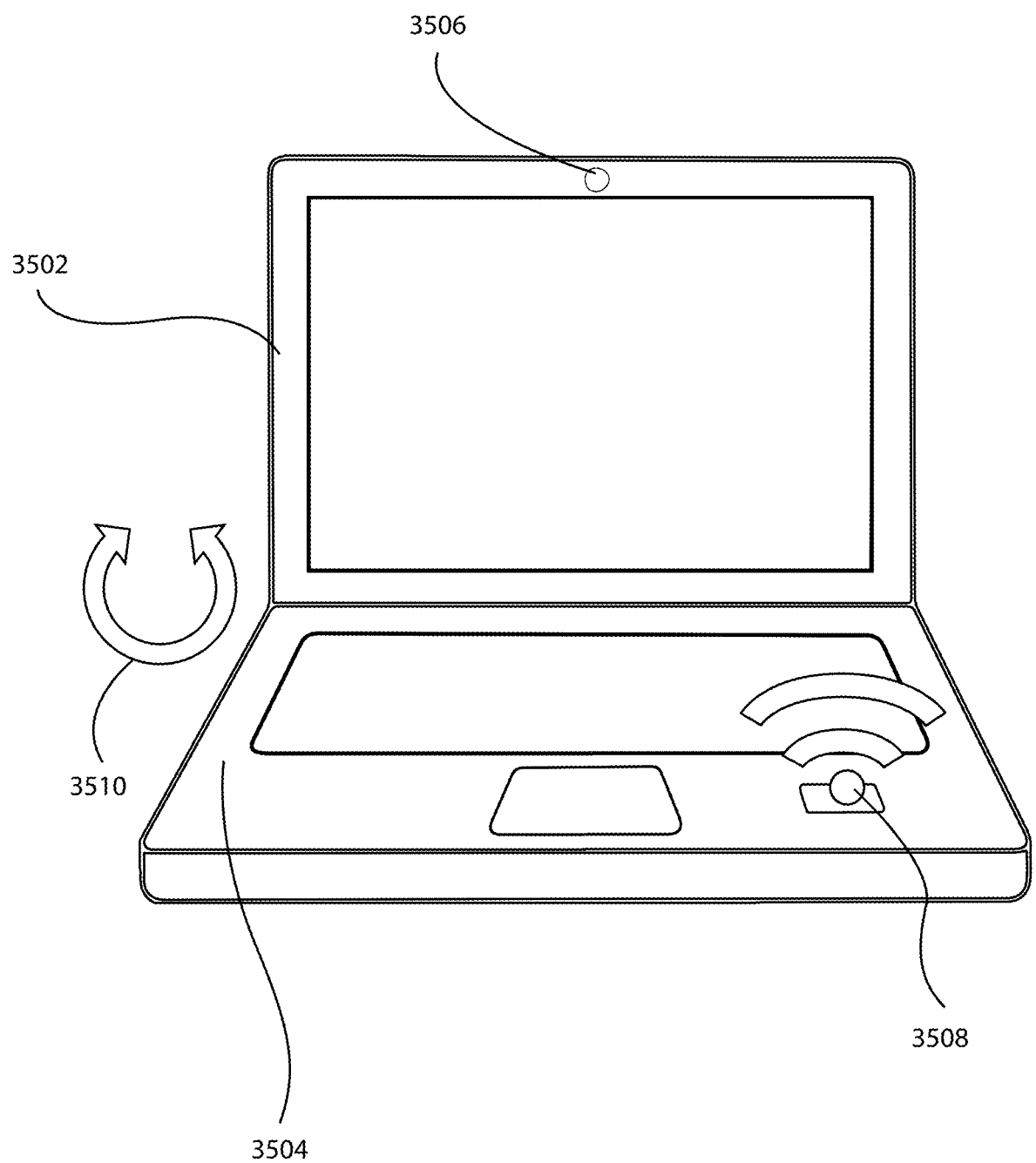
FIG. 35 shows an embodiment of a laptop or folding computer that may be used to create and manipulate 3D stereoscopic images.

FIG. 35 is an illustration of an embodiment of a laptop or folding computer having a camera (item 3506) for eyewear tracking located in the upper portion (item 3502) and a camera or sensor (item 3508) for hand tracking in the lower half (item 3504). The problem inherent in such a configuration is the angle between the face tracking camera (item 3506) and the hand tracker (item 3508) changes with the angle (item 3510) of opening of the laptop-computing device. If the face tracking camera is used to create real world POV images that are to be coordinated with hand tracking to enable hand or pointer manipulations of the real world stereoscopic images then the angular relationship of the two sensing devices must be taken into consideration. So, a means to measure the angle between the top half and lower half of the open laptop must be calculated. In another embodiment, this may be done mechanically or electronically with a sensor placed along the hinge (abeam item 3510) of the laptop wherein the measured angle is then sent to the software of the laptop so it always knows the opening angle. In another embodiment either the image taken from a camera (item 3506) or hand-tracking sensor (item 3508) may be analyzed to give an approximate angle of opening. At the time of this application a company called Leapmotion makes a laptop with a camera (item 3506) in the top half (item 3502) and also the hand or object tracker (item 3508) built into the keyboard half (item 3504). Currently to use POV in combination with the hand tracker to manipulate objects in real world space would require precisely positioning the angle (item 3510) between the top half and lower half of the laptop device. Another technique that may be used in one or more embodiments is to have a laptop hinge angle that locks in known angular positions relating the top and bottom halves. This information may then be employed to relate the angle between the sensor in the lower portion to the sensor in the upper portion. The instant invention eliminates the need for precise angular adjustment thus increasing the user's ability to enjoy 3D stereoscopic POV manipulations.

Figure 36:
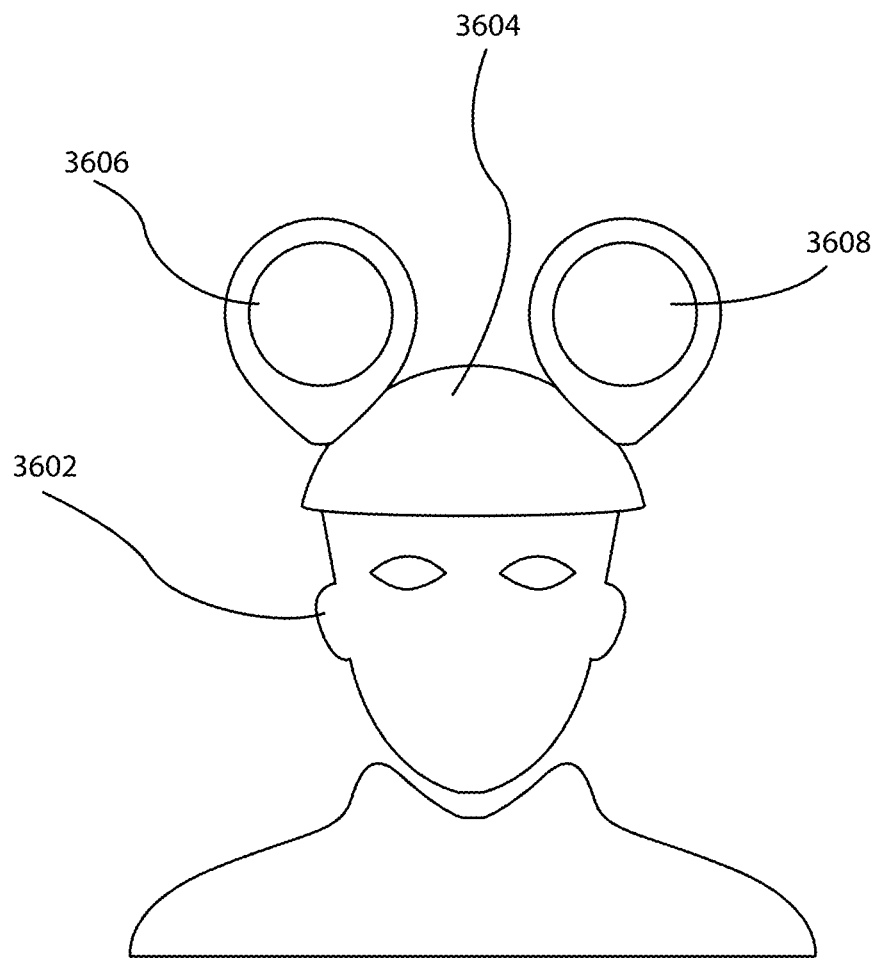
FIG. 36 illustrates an embodiment where the circles used for tracking are attached to a hat or other headgear.

FIG. 36 is an illustration of an embodiment where the circles used for tracking are attached to a hat or other headgear. The size of the circles that are tracked is a limiting factor in how far from the camera they may be tracked accurately. There is a limit to the size of circles which may be employed with eyewear. For greater viewing distances employing POV computations it is beneficial to have larger circles to track. A viewer (item 3602) who wishes to be at a greater distance from the viewing screen may have larger circles (items 3606 and 3608) attached to headgear (item 3604). The headgear may be a hat, band, or any object which is affixed to the head and moves as the head moves. In this embodiment, the location of the circles is determined in much the same manner as for the circles of the eyeglass embodiment described previously. To do this an adjustment is made for the larger size of the circles. Then another adjustment is made which approximates the location of the eyes in relation to the circles. It is true this will vary slightly from user to user because not everyone's head is shaped exactly the same. However, an average location of the eyes in relation to the circles may be used to give a fairly close approximation of where the eyes are for most users.

Figure 37:
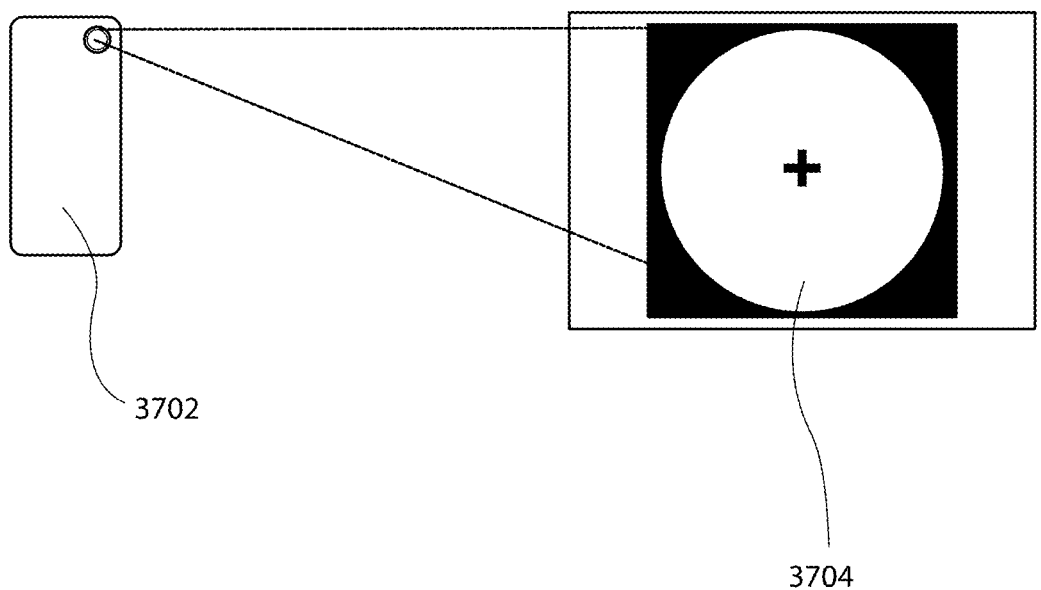
FIG. 37 illustrates an embodiment that uses a circle as a general distance measuring device.

FIG. 37 is an illustration of another embodiment of the instant invention. In this embodiment, the circle is used in a general distance measuring method or device. Most handheld phones (item 3702) today employ both a camera and a computing device or processor. By measuring the size of the oval presented to the camera of the handheld phone and comparing this with a reference size at a known distance the distance to the center of the circle may be computed in the same manner as with the circular glasses described earlier in this application. The measuring device is not limited to a handheld phone. Any device that employs a camera and computing device may be used for the measurements. In addition, most handheld phone devices also include tilt measurement devices. In an exemplary embodiment, the tilt of the camera is used to correct the distance values and may also be used to also calculate the Y or height distance in relation to the handheld device. So, both the distance and height information of the circular illustration in relation to the handheld device may be determined. In an exemplary embodiment this information may be displayed on the display surface of the camera device in real time. Additionally, a zoom feature which is employed with most camera devices may be employed for longer distances. The information regarding the amount of zoom is used to correct the distance for the fact that the zoom feature is employed.

Figure 38:
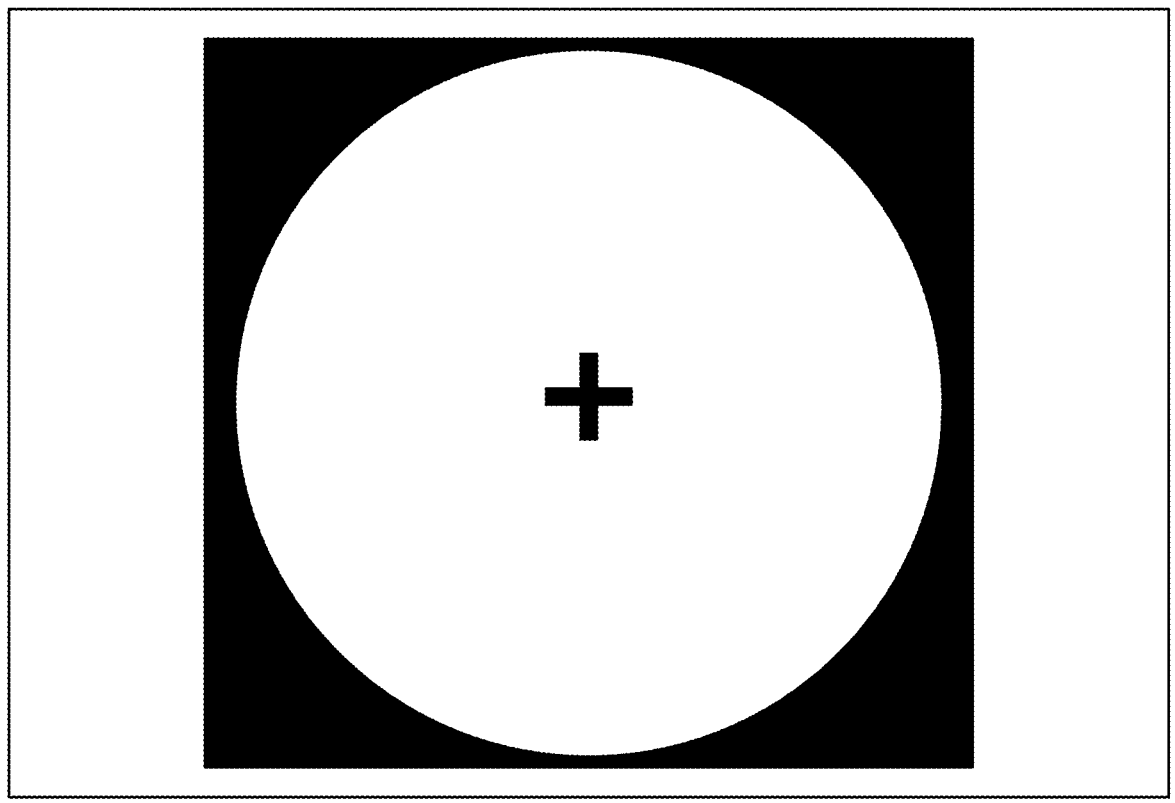
FIG. 38 shows a circular shape that may for example be printed from a computer image file for distance measurement.

In one embodiment, the circular shape (illustrated in FIG. 38) may be printed from a computer image file. In another embodiment, the circles may be part of a pad with sticky material holding the pages of the pad together.

In any given camera field of view there may be several items which are recognized as ellipses by the ellipse detection software. It is important for the computing device to determine which ellipse to use for the distance calculations. In this embodiment, a square object is placed outside the circle and computer vision techniques are used to find both circle and square. A filter is then employed so that the circle inside the square is used for measurement. While this is an exemplary embodiment, the square may be placed inside the circle, other geometric shapes may be used in combination with the circle. In another embodiment objects located inside or outside the circle may be used to discriminate the chosen circle. In one embodiment, a smiley face or series of lines, curves, or blobs may be employed.

Figure 39:
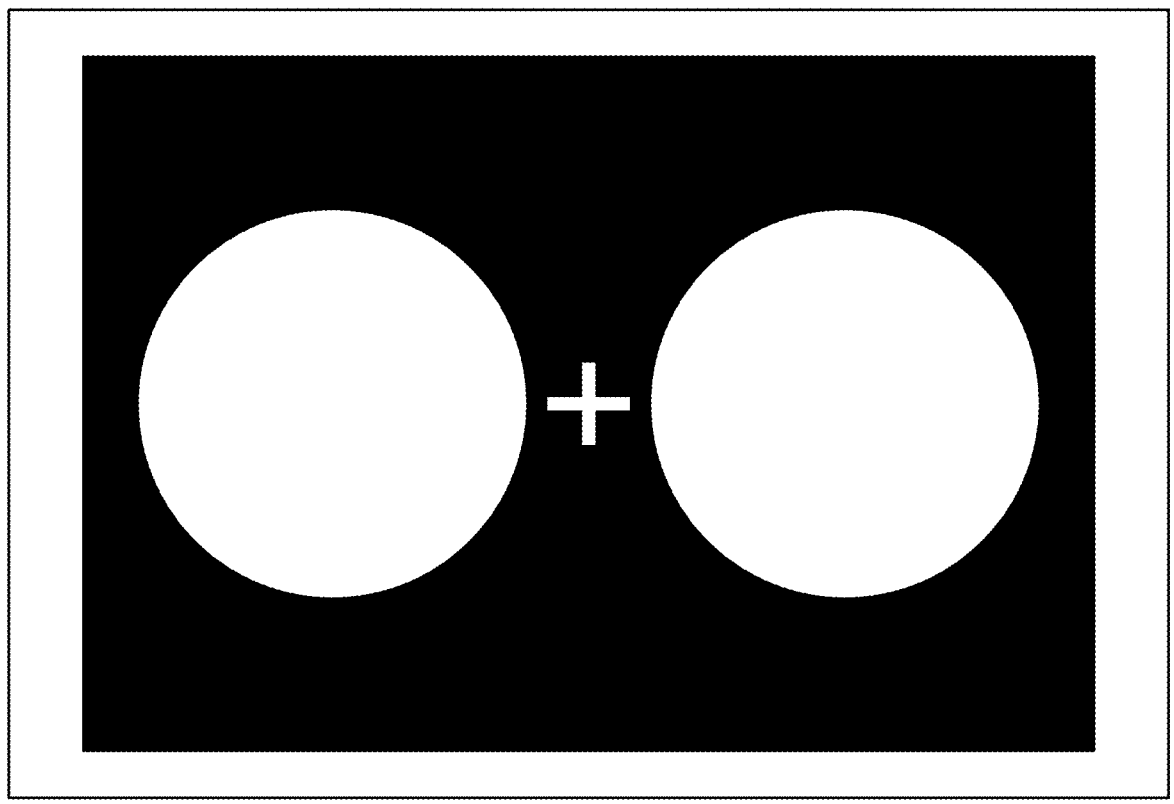
FIG. 39 shows an embodiment that uses two circles as a general distance measuring device.

In FIG. 39 an embodiment is shown with two circles for distance detection. In this embodiment the eccentricity, major and minor axes detected by the handheld camera device will have nearly the same values and may be used to filter the chosen ellipses from other background ellipses. In an exemplary embodiment, the center of two circles is the distance measured to, but other location such as the center of one of the circles may be used.

Figure 40:
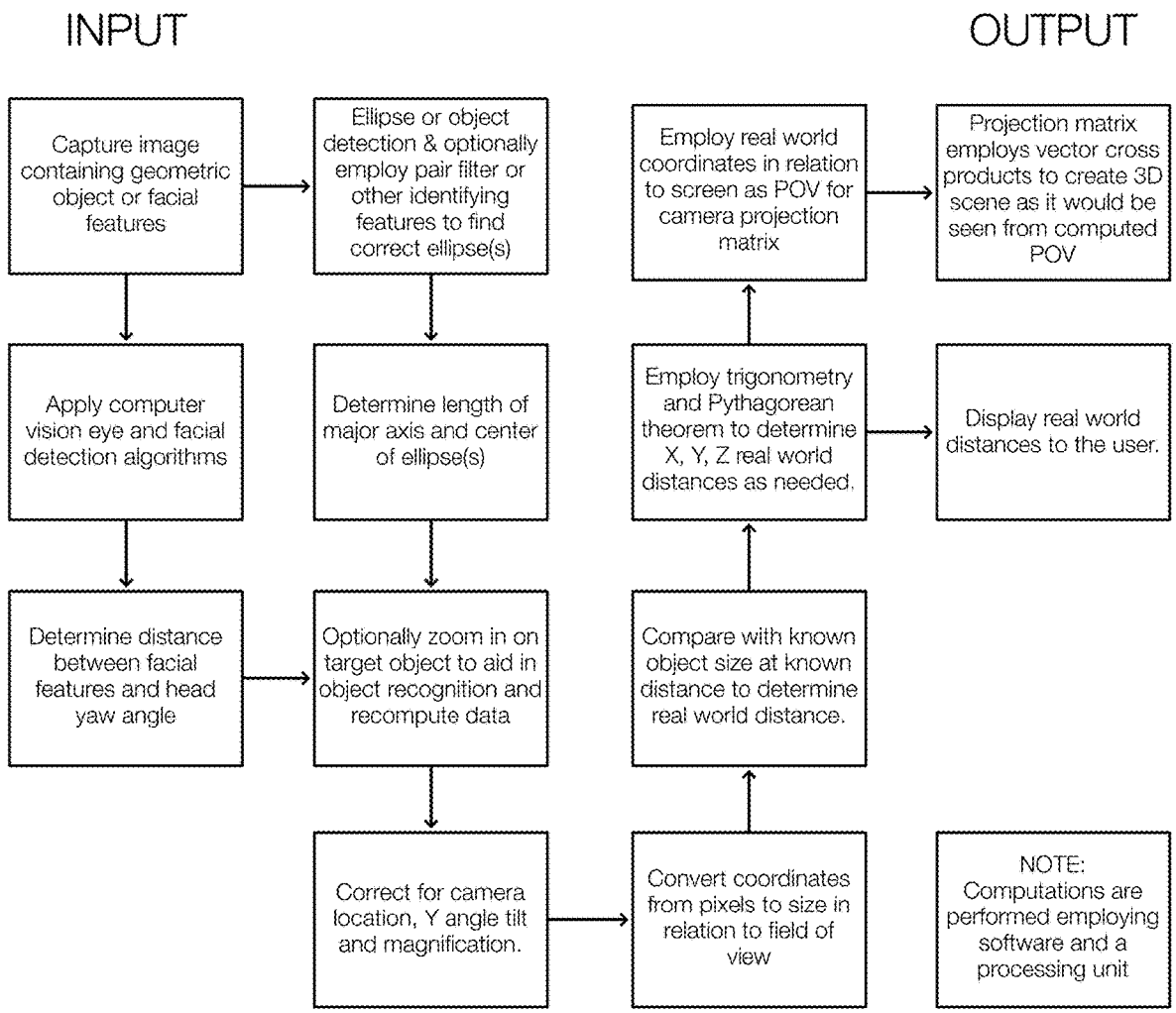
FIG. 40 shows an illustrative flow chart of a process for determining distance to a flat circular object.

FIG. 40 shows a flow diagram illustrating an exemplary embodiment of the process for determining distances to a flat circular object. In other embodiments, other geometric figures or series of figures may be employed. However, the circular figure is advantageous due to the special properties of a circle that make the calculations easier.

First, the ellipses are detected within the field of view of the camera. The camera captures the image. A filter may be used to select the correct ellipse or ellipses to be used for measurement. These may employ ellipse pair filters or other geometric features such as the circle within a square technique.

The major and minor axes are determined in pixels of the camera image. The center of the ellipse(s) is determined in pixels of the camera image. This data is corrected for camera tilt angle and any magnification of the camera. The order of the calculation steps is not important and any order that achieves the end result may be employed.

Alternatively, for auto stereoscopic systems the head and eyes or other facial may be tracked. The distance between the eyes is then used to calculate depth distance in much the same way as the major axis is used when tracking ellipses. However, this presents a problem. When the head is rotated about the yaw (Y-axis) the distance between the eyes in the X-direction needs to be compensated for the yaw. Else the distance between the eyes (or other facial features) is now less than the distance as seen from front on view of the face. The head yaw angle may be determined using computer vision and a trigonometric adjustment to the eye distance may be made. This ensures the correct Z distance to the face and eyes may be computed.

The pixel coordinates are used to determine the size and location in relation to the camera-viewing field.

As the viewer moves further from the camera it becomes more difficult to track objects and extract data. For this reason, an optional camera zoom may be employed. The zoom may be controlled by parameters entered into software and the processor makes adjustments. The area zoomed in on need not be centrally located.

This data is then compared with known size and distance locations. For unfamiliar camera types the calibration tool may be used to calibrate the camera for computations.

First absolute distances to the detected ellipses are determined. Then the angular values are used to compute X, Y, and Z values as desired. The Pythagorean Theorem is useful when applied in three dimensions to obtain these results.

In this way, the real-world distance values may be obtained.

The results are then applied to the specific use. They may be used as 3D imaging camera point of view (POV) coordinates. In this way POV 3D images may be created. By creating 3D POV images for each eye and employing stereoscopic techniques 3D POV stereoscopic images may be created. The stereoscopic techniques which may be employed include, but are not limited to shutter glasses, passively polarized glasses, anaglyph glasses, and auto stereoscopic systems. These are well known and developed at the time of this application.

Another use involves distance measurement equipment. The distance may then be displayed as distance to the target circle or circles and also the height may be computed in this embodiment. This has uses in the construction field, home improvement, golfing and many other fields. The truly remarkable feature of this distance measurement method is it does not require any tools other than a handheld camera attached to a computing device. Most people these days carry such a device in the form of a cellular phone so they will usually have it when it is needed. The circular object can be printed from a file on their phone, computer, or from the web. Therefore, this embodiment is convenient and easy to use.

Figure 41:
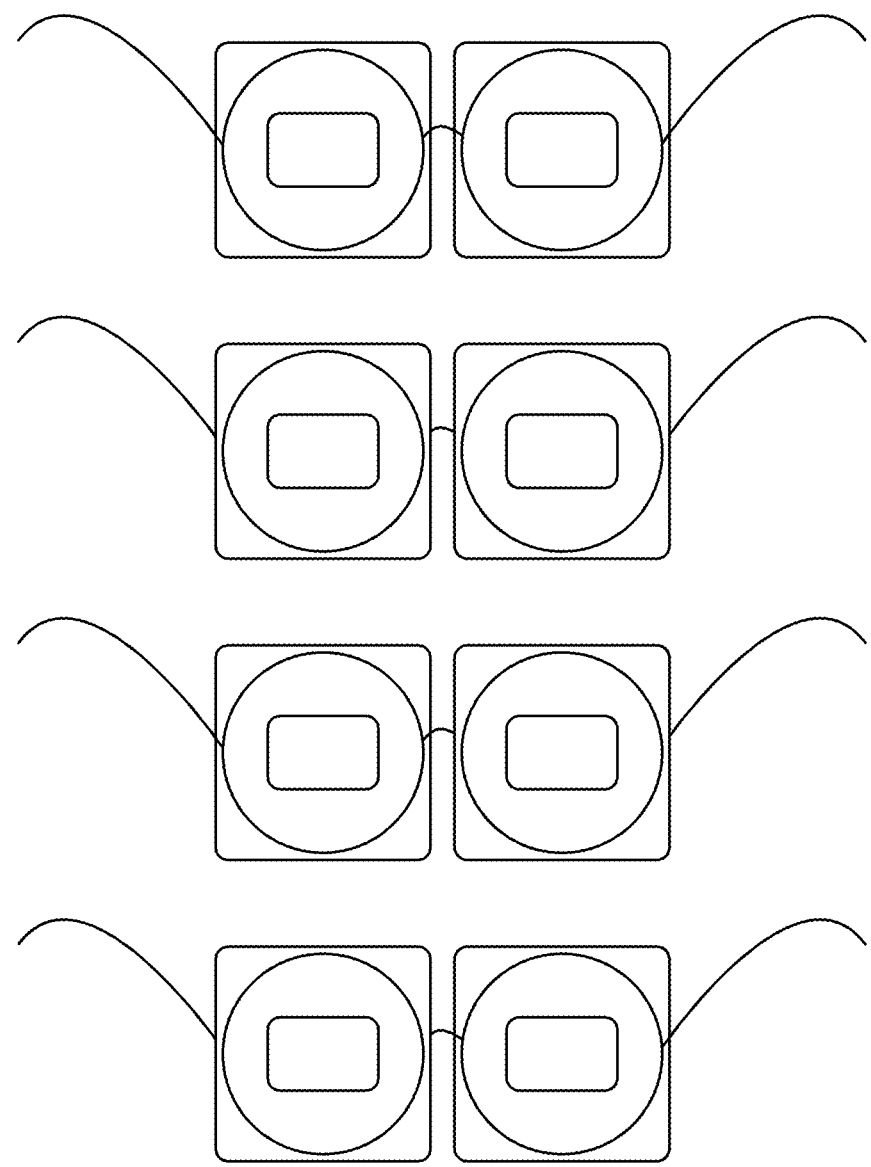
FIG. 41 shows an embodiment with multiple glasses having different features to support tracking in a multi-user viewing environment.

With reference now to FIG. 41 an exemplary embodiment shows how the glasses may be employed in a multi-user viewing environment. To differentiate between users the geometric object (in this embodiment a circle) and its background alternate between light and dark. In this illustration four different combinations are shown, however there are other patterns and combinations of patterns that may be employed. So, for example using computer vision one pair would be recognized as having light objects on dark backgrounds. A second pair may have dark objects on light backgrounds. Third and fourth pairs if desired may have alternating light and dark foregrounds and backgrounds. The software and processor may employ filtering techniques to determine which images are to be prepared for viewing by each coordinated lens. The lenses have multiple discriminating features as described elsewhere in this application to ensure only the coordinated image for the lens passes through to the viewers' eye(s).

Figure 42:
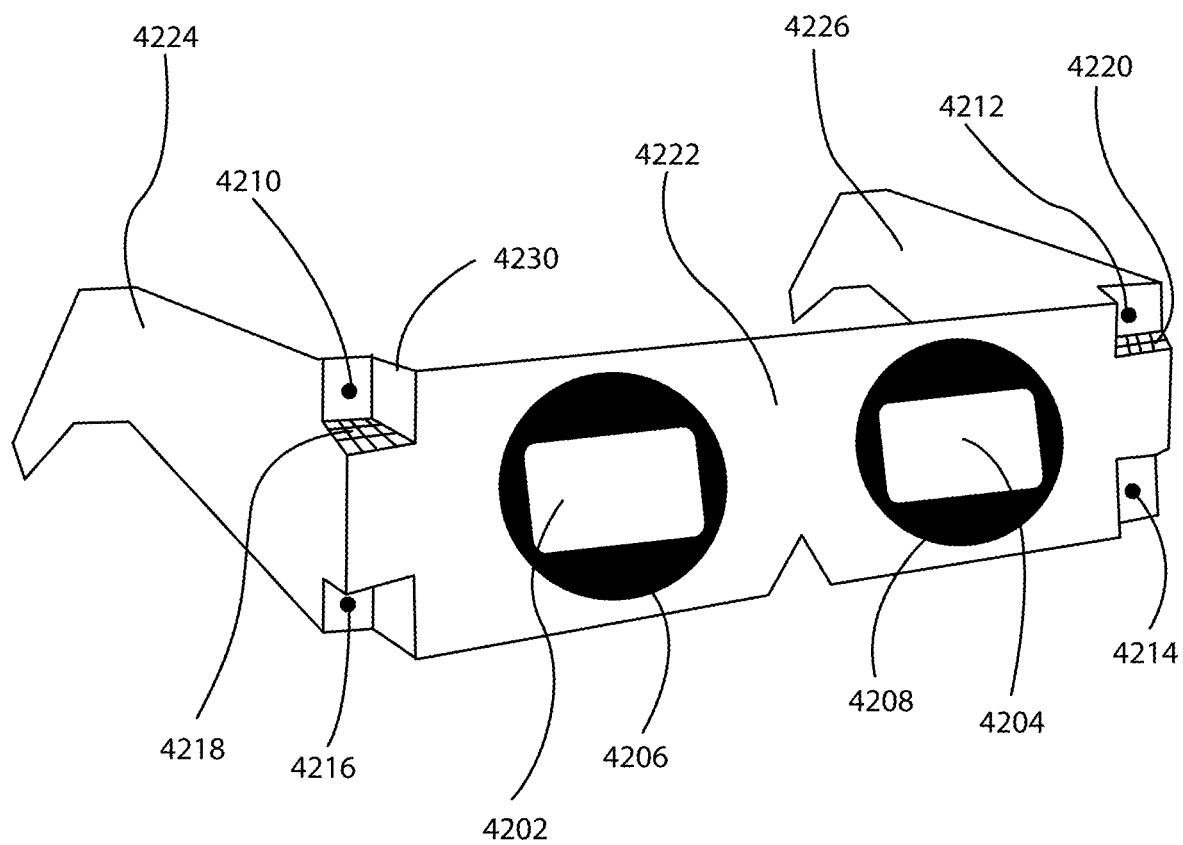
FIG. 42 shows an embodiment of glasses with added tracking dots or blobs in the four corners of the front facing surface.

With reference now to FIG. 42 is an illustration of an exemplary embodiment of glasses with added tracking dots or blobs (items 4210, 4212, 4214, and 4216) in the four corners of the front facing surface. These dots may also be referred to as blobs within this document. The dots are located in the four corners and may be located either in front of or behind the plane that has the circular tracking objects (items 4206 and 4208). They may be employed together with the circular objects to determine the angular components of the glasses. In particular, the tilt, roll, and yaw may be computed. This shall be further explained later in this document.

In another embodiment illustrated in FIG. 42 the dots are part of a fold made from the front surface (item 4222) and the template surfaces (items 4226 and 4224). In this embodiment, a cut is made that allows the surface the dots are on to be pushed backwards towards the user. This leaves a gap or hole (item 4218 and 4220) where the cuts were made. Part of the surface of the front plate (item 4230) is pushed backwards at approximately a 90 degree angle in such a manner so that part of the template containing the dot (item 4210) is now parallel and behind the front plate. This may be repeated for all four corners. However, only one tracked dot is needed in addition to the circular tracked objects to perform the roll, yaw, and tilt calculations.

In this embodiment items 4206 and 4204 contain light filtering material used to discriminate between left and right images so each eye receives the coordinated stereoscopic image created for its point of view (POV).

Figure 43:
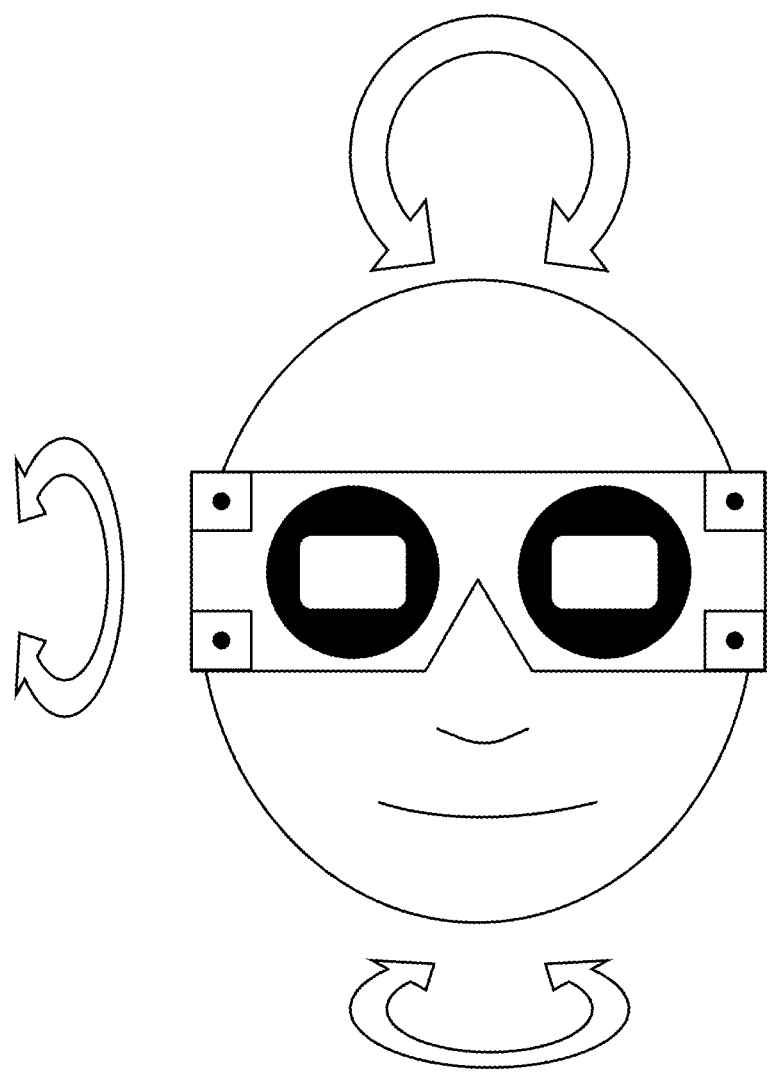
FIG. 43 illustrates possible rotational movements of the user's head when wearing tracking glasses.

With reference now to FIG. 43 an illustration of the rotational movements the head can make is shown. Being affixed to the head the glasses rotate as well. In an axis system for the head the up and down direction from the body to the head would be the Y-axis, from ear to ear the X-axis and from in front of, to behind the head the Z-axis.

The head may move to the right and left in similar movement to one indicating a "no" response. In this case, the head rotates along the Y-axis and this may also be referred to as "yaw." Head movement tilting up and down similar to someone nodding yes is rotation about the X-axis and may also be referred to as "tilt." Head movement from shoulder to shoulder is rotation about the Z-axis and may also be referred to as "roll."

Figure 44A:
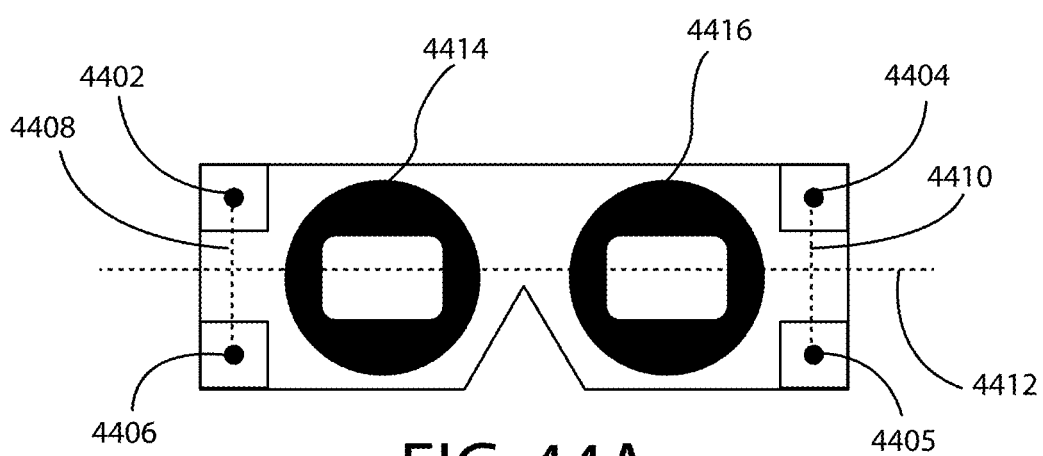
FIGS. 44A, 44B, and 44C illustrate a method for using the tracked dots together with tracked circular objects to calculate pitch, roll, and yaw.
Figure 44B:
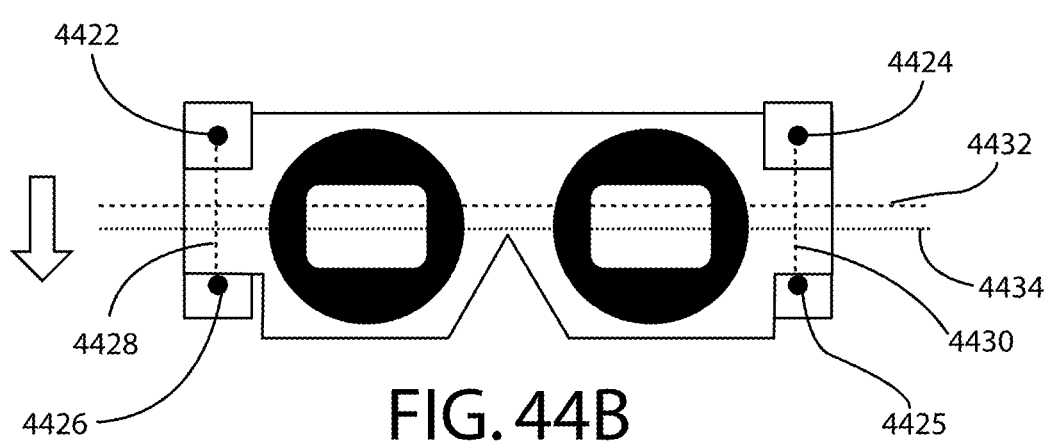
Figure 44C:
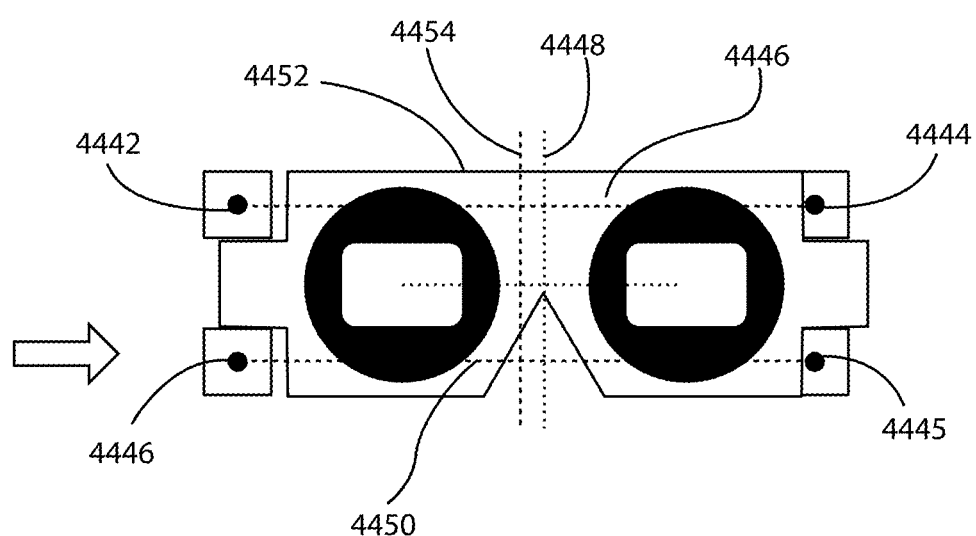

FIGS. 44A, 44B, and 44C illustrate a method for using the tracked dots together with tracked circular objects to calculate pitch, roll, and yaw. These figures illustrate glasses in different orientations as seen from the point of view of the tracking camera. FIG. 44A is an illustration of glasses facing directly at the camera wherein the front plate of the glasses is approximately perpendicular to a line drawn from the camera to the center of the front plate. FIG. 44B is an illustration of glasses affixed to a head that is tilted downward about the X-axis. FIG. 44C is an illustration of glasses affixed to the head that is rotated or yawed about the Y-axis to the user's left (or the tracking cameras right).

Before we begin the explanation of calculations for yaw, roll, and tilt it should be noted that the methods described elsewhere in this document explain how the circular objects are employed to calculate the distance from the camera of the glasses. This is an important step in the calculation of the angular positioning of the glasses of this embodiment. It is possible and within the scope of the invention to use dots, blobs or other shapes in place the circles that combined with the dots located on another plane enable the same calculations of distance, location, tilt, roll, and yaw. These require more complicated trigonometric calculations, but a skilled mathematician can make them and therefore they are within the scope of this invention. The same is true in a glasses free system. Facial recognition technology enables tracking of eye location as well as pitch, roll, and, yaw of the head. By combining standard or entered values for the distance between the eyes along with yaw about the Y-axis the distance to the user's head or eyes can be determined. Thus, all of the required information for the computations of a glasses free system are available and similar methods for glasses free 3D POV systems with or without a pointer or controller as described herein are within the scope of this invention.

With reference to FIG. 44A we see an illustration of an embodiment for head tracking glasses that have the circular tracking markers (items 4414 and 4416), additionally there are four added tracking dots or blobs (items 4402, 4404, 4405, and 4406) in the corners of the faceplate (item 4410). The corner dots are located either in front of or behind the planar surface (item 4410) where the circular tracking markers are. One or more imaginary line(s) or line segment (s) (items 4408, 4410) are constructed between the dots or blobs. An additional imaginary line (item 4412) is created between the center axis of the circular tracked objects. Any or all of these line segments may be mathematically bisected and perpendicular lines may be constructed along the point of bisection. These lines and line segments are then used for comparison among each other.

To accomplish this the captured image of the glasses is analyzed using computer vision software such as OpenCV. The location of the circles (or captured ovals) and dots are then computed using software and a processor. Then trigonometry is used to create equations for the line(s) and/and or line segments. Distance from the camera may be computed using the circular method described in this application or trigonometry may be directly applied to dots or other shapes by comparing distances between objects in the captured images with the known distances between objects on the glasses. These methods may also be applied to a tracked glasses free head or to other objects with tracking markers affixed to the head and these systems fall within the scope of this application but should not be considered limiting.

There are new glasses free auto stereoscopic systems which have been developed. One such system has been created by 3DTau. Their system employs filters that direct the light to discrete locations in the X direction. They are all presented at once through a filtering technique. They also emphasize that head/POV tracking is not needed nor employed. They take multiple camera angle images and present them all at once through various viewing angles.

However, their system is limited in that views above or below are not taken into account. In addition, it does not take the distance from the viewer into account.

Due to these limitations, it cannot be used as a real world stereoscopic system that allows a user to interact with the stereoscopic images. However, one or more embodiments of the invention presented here may be employed to modify the system of 3DTau and others like it to overcome these limitations.

Computer vision techniques enable eye tracking as well as finding pitch, roll and yaw orientation of the head. An example of this is found in "FacetrackNoIR." The eyes and other facial features can be found easily using openCV. The distance between the eyes or other facial features can be used to calculate the distance from the sensor. By adding this information and image generation on the fly to the system of 3DTau or other auto stereoscopic systems, one or more embodiments of the system may create real world images that can be interacted with. The hands-free controller of FIG. 42 can be employed in a similar fashion by replacing glasses X-Y-Z location and orientation information with head X-Y-Z location and orientation to create a head oriented controller. Hence one or more embodiments of the system may include the use of face tracking to enhance glasses free auto stereoscopic systems.

In the orientation shown in FIG. 44A the glasses are presented to the camera with no tilt, roll, or yaw. It can be seen that the line through the centers of the circles (item 4412) bisects the vertical line segments (items 4408 and 4410) and from this we can deduce there is no tilt about the X-axis. We can also compare the perpendicular bisector of the circles with the perpendicular bisectors of the horizontal line segments (not shown) connecting the dots. This will give us yaw information about the Y-axis.

Moving on to FIG. 44B we see an illustration of an embodiment of the instant invention where the head and/or glasses are tilted downward in relation to the tracking camera. Now the bisector of the vertical line segment between the dots (item 4432) is above the line (or line segment) connecting the circular objects. This separation between the line segments may then be measured. Distance from the camera is known and trigonometry may be applied to calculate amount of tilt about the X-axis.

With reference now to FIG. 44C, the glasses are shown yawed about the Y-axis. Horizontal line segments between the dots may be computed and their perpendicular bisectors may then be compared with the perpendicular bisector of the line between the centers of the circular objects. By applying trigonometry, the amount of yaw about the Z-axis may be computed.

The computations for roll about the Z-axis are simpler to compute as they only involve comparison of the center points of the circular objects.

It should be noted that there are many ways of applying trigonometry to solve equations for pitch roll and yaw and the methods described in the exemplary embodiment are not intended to be limiting. In addition, the computations may be performed using as few as one dot out of the plane of the surface of the glasses. It is even possible to obtain the information from a single dot located on the plane of the glasses by analyzing the major and minor axis of the camera-captured ellipses. By comparing previous location with current location, the information may be obtained with just the circular tracked objects or two or more dots. So, there are many ways to extract the information. They all fall within the scope of this invention and the embodiments shown while exemplary are not intended to be limiting.

Figure 45:
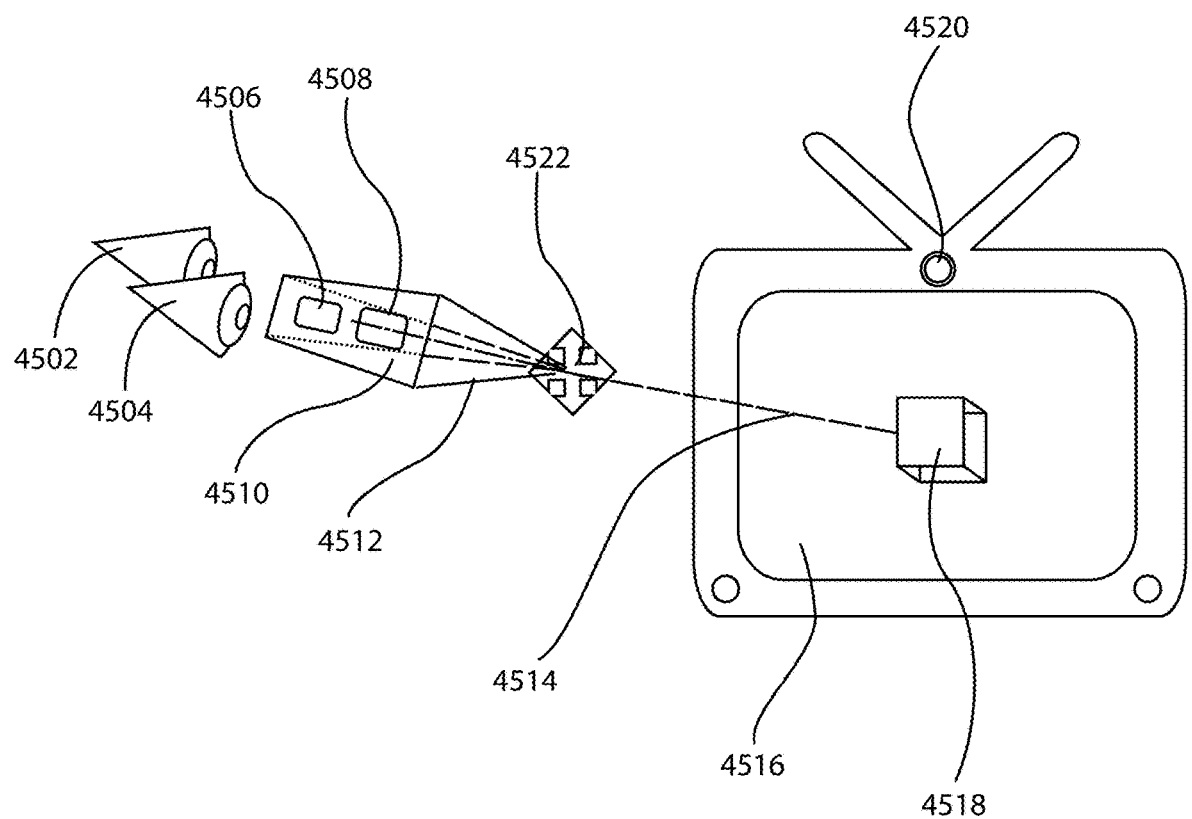
FIG. 45 illustrates an embodiment of a pointing system that uses tracked glasses to control a 3D pointer.

With reference now to FIG. 45 an illustration of an embodiment of a pointing system or method is shown. This pointing system employs the distance, pitch, yaw, and roll information to enable a 3D pointer controlled by the glasses, the head, or other tracked object affixed to the head. An image capture device (item 4520) is located in fixed relationship or with a known relationship to the display unit (item 4516). In the exemplary embodiment portrayed a 3D stereoscopic line is drawn on the display (item 4516) so the user(s) eyes (items 4502 and 4504) see a line emanating from the center of the glasses (item 4510). In embodiments that employ glasses the lenses (items 4506, and 4508) are made in such a way as to ensure the correct stereoscopic image reaches the coordinated eye. Stereoscopic methods employed may include passively polarized glasses, shutter glasses, anaglyph glasses, combinations of these methods and auto-stereoscopy. In this embodiment, the line is drawn from the center of and perpendicular to the front plane of said glasses. The line is continually updated to reflect the current state of pitch or yaw of the glasses and remain perpendicular to front plane. By rotating the head about its axis, the user can control the direction of the line. As the location of the line in real world space is known its location can be compared with the 3D POV real world stereoscopic objects (item 4518). When the line intersects, or is near the 3D real world object interaction may occur. Additionally, other controlling devices such as keyboards, computer mice, trackballs, and gamepads may be used to enhance the interaction capabilities of the line and object. The object may be captured and made to translate location, rotate, expand or contract, change transparency or texture or be made to perform other tasks. The software writer only decides the limitations. They may also be used to control external devices. Examples might include hands free controlling flow and temperature of water in a restroom. Other uses may involve places where germ transmission is a consideration, such as a hospital.

Other additional features include a pointer reference marker (item 4522). This is drawn in front of the glasses along the line drawn perpendicular to the glasses. It may be employed for several functions. One function is as a calibration device. The location of the marker is drawn in relation to the glasses. This may then be compared with the location of 3D stereoscopic objects with known location in relation to the display. By movement of the head, the user can place the marker (item 4522) in the same real world location as the stereoscopic object (item 4518). The processor can use this information to calculate a correction to be applied to correct for any difference in users perceived location with the currently computed location.

Additionally, the marker may be moved in relation to the glasses using keyboard or other commands to adjust for any calibration errors. The marker (item 4522) may be made to move towards or away from the user's glasses by rolling the head along the Z-axis or external keyboard or mouse inputs.

The marker (item 4522) may be any shape and may be made to emulate an airplane, gun, slingshot, projectile firing device, flying animal, fish or other animal, car or other vehicle or just about anything that can be imagined. It has applications in medical imaging devices as well as gaming devices and drawing or sculpting device. In the case of a gaming device projectiles may be made to project outwardly along or near the line emanating from the glasses (item 4514) towards the display (item 4516). These 3D stereoscopic projectiles may then interact with 3D targets created by said display. The descriptions of these embodiments are not meant to be limiting in any way and the scope of the methods and devices is what is in the claims.

Additional line segments (items 4512) may be drawn to help with user distance judgment regarding the location of the marker.

To summarize, four methods were presented for determining the distance from a sensor to eyewear with geometric lenses. One embodiment employs circularly shaped lenses and a single camera or sensor. Other embodiments include, but are not limited to two-sensor triangulation to the eyewear, plenoptic cameras or sensors, and distance measuring equipment mounted to the eyewear.

In another embodiment, the eyewear employs circular features on contrasting backgrounds. These features are exterior to the actual lenses in one or more embodiments. The features may include other shapes such as a square and/or multiple objects. Blob patterns of contrasting colors may also be employed.

Electroluminescent materials may be used to create the image contrasts for object tracking. This may be especially useful for dark viewing conditions. In addition, a fast strobe pattern may be synchronized with the speed of camera capture to reduce blurring of the captured images.

The use of circular objects for distance measuring may be employed by itself for applications used on tablets, cell phones or handheld computers. Additionally, telephoto lenses may be employed to increase the range of distances that may be measured. These telephoto lenses are currently readily available to attach to most common cell phones or to the cell phone case.

For autostereoscopic systems, facial recognition software may measure the location of eyes and other facial features. Additionally, facial recognition software is capable of calculating pitch, roll and yaw of the head. By employing trigonometry and an entered or assumed value for the distance between the eyes the distance to the head may be computed. Yaw and the distance between the eyes in the captured image provide the necessary information to make these computations. In this way, all of the features described for the head tracking eyewear and eyewear pointing device may be employed in an auto stereoscopic system.

In another embodiment, the perimeter of the lens employs methods to enhance contrast. It has been explained how to employ UV or other illuminating source to enhance contrast in order to enhance tracking by a sensor.

Properties of circles and ovals have been taught. Once these concepts were explained it became possible to teach the trigonometric algorithms that enable X-Y-Z data to be determined by means of tracking the circular lenses with a single sensor. As explained in this description, the ability to use a 2D captured image to compute X-Y-Z coordinates may be extended to other geometric objects or group of objects. The scope of the instant invention includes applying the principles described in this description to any 2D captured image of objects of known separation, width or height that may be used to determine the X-Y-Z data for lens or eye tracking as is required for creating correct perspective images and without the need for dual camera triangulation methods.

The advantages of distance measuring equipment attached to the eyewear rather than the viewing display has been explained.

One big advantage of the instant invention is all three axis X, Y, and Z of the user's approximate eye location may be obtained from a single camera of the type currently employed in most computing systems. Extraction of 3D Z depth information from a 2D flat object is applied to the method of 3D POV stereoscopy to produce superior results at a small fraction of the cost of current systems. This will enable many more people to afford and derive pleasure from POV 3D stereoscopic applications. In addition, this may also be applied to non-stereoscopic 3D POV devices as well. This has application to the 3D gaming industry. It also has application to 3D drawing programs such as Vectorworks® and Autocad®. Additionally, it may be applied as a teaching device and for medical imaging. Two viewers would be able to see the same 3D objects (stereoscopically or not) from vantage points created for their POV. This prevents the image from appearing skewed to the second user as is the case with other devices at employed at the time of this application.

Another advantage of the instant invention is pitch, roll and yaw information of the users may also be obtained from a single camera of the type currently employed in most computing systems. This information may be employed to create a 3D stereoscopic "beam" emanating from the glasses that may be employed to interact with other 3D stereoscopic objects. In addition, the processor may create 3D stereoscopic objects to be displayed in front of the user's head. These objects may follow the user's head movements. For example, an airplane's pitch, roll and yaw may be made to follow the pitch roll and yaw of the user's headgear. Headgear may be glasses, hats or any other object affixed to the head that moves as the head moves. Guns may be aimed naturally by tilting the head in various directions. The target image in front of the glasses may be made to vary forwards and backwards by rolling the head from side to side about the head's Z-axis. Other commands and interactions may be created depending on the desires of the software writer and this list is not intended to be limiting in any way.

While the invention herein disclosed has been described by means of specific embodiments and applications thereof, numerous modifications and variations could be made thereto by those skilled in the art without departing from the scope of the invention set forth in the claims.

The headings used herein are for organizational purposes only and are not meant to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not precludes scenarios in which a "fourth die electrically connected to the module substrate" is connected prior to the third die, unless otherwise specified. Similarly, a "second"

feature does not require that a "first" feature be implemented prior to the "second" feature, unless otherwise specified. As used in this specification and the appended claims, the singular forms "a", "an", and "the" include singular and plural referents unless the content clearly dictates otherwise. Thus, for example, reference to "a linker" includes one or more linkers.

Various components may be described as performing a task or tasks, for convenience in the description. Such descriptions may use the phrase "configured to." Reciting a component that is configured to perform one or more tasks is expressly intended not to invoke 35 U.S.C. § 112, paragraph six, interpretation for that component.

What is claimed is:

1. A trackable glasses system that provides one or more views of a shared display, comprising: eyeglasses comprising a pair of lenses configured to be placed in front of user's eyes when user is viewing a display; wherein said display emits one or more images for each frame of a video stream; a camera configured to capture camera images of said eyeglasses; and, an image analysis system coupled to said camera and configured to calculate a position and an orientation of said eyeglasses from said camera images; wherein the region of each lens of said pair of lenses of said eyeglasses is comprised of regions of a distinctive shape; where said distinctive shape is an elliptical shape; and software to locate elliptical shapes from said camera image; where said elliptical shapes within said camera image have two or more axes of unequal lengths; and a filter to locate two or more of said elliptical shapes within said camera image based on similar characteristics of said two or more shapes; and identify one or more of major and minor axes lengths and angles of said elliptical shapes in said camera image; where said major and minor axis are not equal; and said calculate a position and an orientation of said eyeglasses comprises locate a two-dimensional projection of said distinctive shape in said camera images; and software to compare size characteristics of said distinctive shapes in captured images with known size characteristics of distinctive region of said glasses; wherein said size characteristics of said distinctive shapes in captured images include one or more of major axis length, minor axis length, and distance between centers of regions; and by said comparison calculate the distance of the glasses lenses from said camera; calculate a three-dimensional position and orientation of said lens comprises software to analyze said two-dimensional projection and said calculated distance from said camera.

2. The trackable glasses system that provides one or more views of a shared display of claim 1, wherein said similar characteristics of said filter include one or more of major axis length, minor axis length, angle of axis with vertical or horizontal, and distance between centers of said distinctive regions.

3. The trackable glasses system that provides one or more views of a shared display of claim 1, wherein each lens of said pair of lenses comprises one or more selective barriers; said one or more selective barriers for a lens are oriented such that an image from said shared display must pass through all of said one or more selective barriers to reach a corresponding eye of said user behind said lens; each barrier of said one or more selective barriers is associated with a characteristic of said one or more characteristics and with a selected value for said characteristic; and, each said barrier transmits an image through said barrier only when said image comprises a value for said characteristic that matches said selected value for said characteristic associated with said barrier; and, wherein each lens of said eyeglasses is associated with selected values for said one or more selected barriers of said lens; and, a combination of selected values is different from a corresponding combination of selected values for each lens of any other lens of said eyeglasses.

4. The trackable glasses system that provides one or more views of a stared display of claim 1, wherein said plurality of images for each frame of a video stream correspond to different viewpoints of a scene associated with said frame.

5. The trackable glasses system that provides one or more views of a shared display of claim 1, wherein said one or more characteristics comprise one or more of a range of colors in said image; a light polarization of said image; and a time slice during which said image is emitted from said shared display.

6. The trackable glasses system that provides one or more views of a shared display of claim 1, wherein said one or more selective barriers comprise one or more of an anaglyph filter that transmits only light in a specific range of colors; a polarized filter that transmits only light having a specific polarization; and a shutter lens that is open to transmit light only during a specific time slice.

7. The trackable glasses system that provides one or more views of a shared display of claim 1, wherein a left lens of said eyeglasses is associated with a combination of selected values that is different from a corresponding combination of selected values for a right lens of said eyeglasses; a left image transmitted through said one or more selective barriers of said left lens is a left eye view of a stereoscopic image pair transmitted from said shared display; and, a right image transmitted through said one or more selective barriers of said right lens a right eye view of said stereoscopic image pair.

8. The trackable glasses system that provides one or more views of a shared display of claim 1, wherein a rim of each lens comprises a reflective material.

9. The trackable glasses system that provides one or more views of a shared display of claim 1, wherein a rim of each lens emits light.

10. The trackable glasses system that provides one or more views of a shared display of claim 9, wherein the source of emitted light is from an LED.

11. The trackable glasses system that provides one or more views of a shared display of claim 9, wherein the source of emitted light is from electroluminescent material.

12. The trackable glasses system that provides one or more views of a shared display of claim 1, further comprising a light source that illuminates said eyeglasses.

13. The trackable glasses system that provides one or more views of a shared display of claim 12, wherein said light source is an infrared or ultraviolet light; and, a rim of each lens comprises a reflective material that reflects said infrared or ultraviolet light.

14. The trackable glasses system that provides one or more views of a shared display of claim 13, wherein said light source is coupled to a sensor that detects a level of ambient light; and, said light source is configured to turn on only when said level of ambient light is below a said level.

15. The trackable glasses system that provides one or more views of a shared display of claim 1, Wherein said plurality of images for each frame of a video stream correspond to different viewpoints of a scene associated with said frame; and, said different viewpoints are calculated based on said position and orientation of said eyeglasses.

16. The trackable glasses system that provides one or more views of a shared display of claim 1, wherein said images for each frame of a video stream correspond to different viewpoints of a scene associated with said frame; and, said different viewpoints are calculated based on said position and orientation of each eye of user associated with said eyeglasses.

17. The trackable classes system that provides one or more views of a shared display of claim 16, wherein a left lens of said eyeglasses is associated with one or more selected values that is different from a corresponding combination of selected values for a right lens of said eyeglasses; a left image transmitted through said one or more selective barriers of said left lens is a left eye view of a stereoscopic image pair transmitted from said shared display; a right image transmitted through said one or more selective barriers of said right lens a right eye view of said stereoscopic image pair; said left eye view of said stereoscopic image pair is based on said position and orientation of said left eye of said user; and, said right eye view of said stereoscopic image pair is based on said position and orientation of said right eye of said user.

\* \* \* \* \*